(12) United States Patent
Okamoto

(10) Patent No.: US 10,984,757 B2
(45) Date of Patent: Apr. 20, 2021

(54) MACHINE LEARNING METHOD, MACHINE LEARNING SYSTEM, AND DISPLAY SYSTEM

(71) Applicant: Semiconductor Energy Laboratory Co., Ltd., Atsugi (JP)

(72) Inventor: Yuki Okamoto, Isehara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 16/607,815

(22) PCT Filed: May 7, 2018

(86) PCT No.: PCT/IB2018/053140
§ 371 (c)(1),
(2) Date: Oct. 24, 2019

(87) PCT Pub. No.: WO2018/211350
PCT Pub. Date: Nov. 22, 2018

(65) Prior Publication Data
US 2020/0219467 A1 Jul. 9, 2020

(30) Foreign Application Priority Data

May 19, 2017 (JP) .............................. JP2017-099397

(51) Int. Cl.
*G09G 5/37* (2006.01)
*G06F 3/14* (2006.01)
(Continued)

(52) U.S. Cl.
CPC ............ *G09G 5/37* (2013.01); *G06F 3/1446* (2013.01); *G06N 3/0454* (2013.01); *G06N 3/08* (2013.01);
(Continued)

(58) Field of Classification Search
CPC ...... G06F 3/1446; G06N 3/0454; G06N 3/08; G06N 3/084; G06T 5/008; G09G 3/20;
(Continued)

(56) References Cited

U.S. PATENT DOCUMENTS 7,457,458 B1    11/2008   Daniel et al.
7,952,651 B2 *   5/2011   Kimura ............. G02F 1/136286
                                                                                                                               349/39
(Continued)

FOREIGN PATENT DOCUMENTS

CN            106409249 A      2/2017
EP              1104180 A      5/2001
(Continued)

OTHER PUBLICATIONS

International Search Report (Application No. PCT/IB2018/053140) dated Aug. 14, 2018.

(Continued)

*Primary Examiner* — Liliana Cerullo
(74) *Attorney, Agent, or Firm* — Robinson Intellectual Property Law Office; Eric J. Robinson

(57) ABSTRACT

To improve the display quality of a display device. To provide a method of correcting image data input to the display device. To provide a novel image correction method or an image correction system. Machine learning for a neural network correcting image data input to the display device is performed by the following method: second image data based on an image that is displayed on the display device by input of first image data to the display device is obtained; third image data is generated by obtaining a difference between the first image data and the second image data; fourth image data is generated by adding the first image data and the third image data; and a weight coefficient is updated (Continued)

so that output data obtained by input of the first image data to the neural network is close to the fourth image data.

16 Claims, 28 Drawing Sheets

(51) Int. Cl.
*G06N 3/08* (2006.01)
*G06N 3/04* (2006.01)
(52) U.S. Cl.
CPC ....... *G06N 3/084* (2013.01); *G09G 2300/026* (2013.01); *G09G 2320/0233* (2013.01); *G09G 2320/06* (2013.01); *G09G 2320/066* (2013.01); *G09G 2320/103* (2013.01)
(58) Field of Classification Search
CPC ...... G09G 3/3225; G09G 3/3648; G09G 5/37; G09G 2300/026; G09G 2320/0233; G09G 2320/06; G09G 2320/066; G09G 2320/103; G09G 2340/0435
See application file for complete search history.

(56) References Cited

U.S. PATENT DOCUMENTS

| | | | |
|---|---|---|---|
| 9,614,022 | B2 | 4/2017 | Miyake et al. |
| 9,858,028 | B2 | 1/2018 | Ikeda et al. |
| 10,141,069 | B2 | 11/2018 | Ikeda et al. |
| 10,159,135 | B2 | 12/2018 | Ikeda et al. |
| 2007/0291047 | A1* | 12/2007 | Harville ................ G06F 3/1446 345/589 |
| 2009/0096804 | A1 | 4/2009 | Gerets et al. |
| 2013/0147860 | A1* | 6/2013 | Ishida ...................... G09G 5/10 345/690 |
| 2014/0118558 | A1* | 5/2014 | Imoto .................. G09G 3/3208 348/181 |
| 2015/0332126 | A1 | 11/2015 | Hikida |
| 2016/0358574 | A1 | 12/2016 | Hohjoh |
| 2017/0031643 | A1 | 2/2017 | Jeong |
| 2017/0063351 | A1 | 3/2017 | Kurokawa |
| 2017/0116512 | A1 | 4/2017 | Kurokawa |
| 2017/0118479 | A1 | 4/2017 | Kurokawa |

FOREIGN PATENT DOCUMENTS

| | | |
|---|---|---|
| EP | 2048642 A | 4/2009 |
| EP | 2945102 A | 11/2015 |
| JP | 2001-197332 A | 7/2001 |
| JP | 2009-093181 A | 4/2009 |
| JP | 2016-033806 A | 3/2016 |
| JP | 2018-146648 A | 9/2018 |
| KR | 2017-0015773 A | 2/2017 |
| WO | WO-2018/134701 | 7/2018 |

OTHER PUBLICATIONS

Written Opinion (Application No. PCT/IB2018/053140) dated Aug. 14, 2018.
Kawashima.S et al., "13.3-in. 8K×4K 664-ppi OLED Display Using CAAC-OS FETs", SID Digest '14 : SID International Symposium Digest of Technical Papers, Jun. 3, 2014, pp. 627-630.

\* cited by examiner $a = x_1 w_1 + x_2 w_2 + b$

MACHINE LEARNING METHOD, MACHINE LEARNING SYSTEM, AND DISPLAY SYSTEM

TECHNICAL FIELD

One embodiment of the present invention relates to a display device. One embodiment of the present invention relates to an image correction technique. One embodiment of the present invention relates to a machine learning method and a system using the method.

Note that one embodiment of the present invention is not limited to the above technical field. Examples of the technical field of one embodiment of the present invention disclosed in this specification and the like include a semiconductor device, a display device, a light-emitting device, a power storage device, a memory device, an electronic device, a lighting device, an input device, an input/output device, a driving method thereof, and a manufacturing method thereof.

In this specification and the like, a semiconductor device means all devices that can operate by utilizing semiconductor characteristics. A transistor, a semiconductor circuit, an arithmetic device, a memory device, and the like are each an embodiment of the semiconductor device. In addition, an imaging device, an electro-optical device, a power generation device (e.g., a thin film solar cell and an organic thin film solar cell), and an electronic device may each include a semiconductor device.

BACKGROUND ART

In recent years, an electronic device including a high-resolution display device has been required. For example, full high-definition (the number of pixels is 1920×1080) has been in the mainstream of home-use television devices (also referred to as televisions or television receivers), while high-resolution display devices such as a 4K2K (the number of pixels is 3840×2160) display and an 8K4K (the number of pixels is 7680×4320) display have been developed. Non-Patent Document 1 reports an organic EL display with an 8K4K resolution.

PATENT DOCUMENT

Non-Patent Document

[Non-Patent Document 1] S. Kawashima, et al., "13.3-In. 8K×4K 664-ppi OLED Display Using CAAC-OS FETs," SID 2014 DIGEST, pp. 627-630.

DISCLOSURE OF INVENTION

Larger display devices have been required. For example, the screen size of the mainstream home-use televisions has been 50 inches or more diagonally. Furthermore, in digital signage and the like, a larger screen size allows a larger amount of information to be displayed, and a further increase in screen size has been demanded.

However, an increase in the display region of a display device produces the following problem: the influence of variation in the characteristics of transistors included in pixels, variation in the characteristics of display elements, or the like is increased, which results in noticeable display unevenness. Particularly in the case where a display device includes a plurality of display panels arranged to have a large display region, the problem is a noticeable boundary between the panels due to variation in the characteristics of the display panels.

An object of one embodiment of the present invention is to improve the display quality of a display device. Another object of one embodiment of the present invention is to provide a method of correcting image data input to the display device. Another object of one embodiment of the present invention is to provide a novel image correction method or an image correction system.

Note that the descriptions of these objects do not disturb the existence of other objects. In one embodiment of the present invention, there is no need to achieve all the objects. Note that other objects can be derived from the description of the specification, the drawings, the claims, and the like.

One embodiment of the present invention is image correction using artificial intelligence (AI). As the artificial intelligence, a neural network, particularly an artificial neural network (ANN) can be used. One embodiment of the present invention further relates to a learning method for a neural network.

One embodiment of the present invention is a machine learning method for a neural network correcting image data input to a display device. The method includes the steps of: obtaining second image data based on an image that is displayed on the display device by input of first image data to the display device; generating third image data by obtaining a difference between the first image data and the second image data; generating fourth image data by adding the first image data and the third image data; and updating a weight coefficient so that output data obtained by input of the first image data to the neural network is close to the fourth image data.

Another embodiment of the present invention is a machine learning method for a neural network correcting image data input to a display device. The method includes the steps of: obtaining second image data based on an image that is displayed on the display device by input of first image data to the display device; generating third image data by obtaining a difference between the first image data and the second image data; generating fifth image data by inverting gray levels in the third image data using the maximum value of all the gray levels in the third image data as the reference value; generating sixth image data by obtaining a difference between the first image data and the fifth image data; and updating a weight coefficient so that output data obtained by input of the first image data to the neural network is close to the sixth image data.

Another embodiment of the present invention is a machine learning method for a neural network correcting image data input to a display device including a plurality of display panels. The method includes the steps of: dividing first image data into pieces the number of which is the same as the number of the display panels and obtaining second image data based on an image that is displayed on the display device by input of the pieces of the first image data to the display panels; generating third image data by obtaining a difference between the first image data and the second image data; generating fourth image data by adding the first image data and the third image data; and updating a weight coefficient so that output data obtained by input of the first image data to the neural network is close to the fourth image data.

Another embodiment of the present invention is a machine learning method for a neural network correcting image data input to a display device including a plurality of display panels. The method includes the steps of: dividing first image data into pieces the number of which is the same as the number of the display panels and obtaining second image data based on an image that is displayed on the display device by input of the pieces of the first image data to the display panels; generating third image data by obtaining a difference between the first image data and the second image data; generating fifth image data by inverting gray levels in the third image data using the maximum value of all the gray levels in the third image data as the reference value; generating sixth image data by obtaining a difference between the first image data and the fifth image data; and updating a weight coefficient so that output data obtained by input of the first image data to the neural network is close to the sixth image data.

In any of the above, the neural network preferably includes one or more convolutional layers between an input layer and an output layer. In this case, data obtained by performing padding processing on the first image data is preferably used as data input to the input layer.

Another embodiment of the present invention is a machine learning system for a neural network correcting image data input to a display device. The system includes a processing device and an imaging device. The processing device includes an arithmetic portion including the neural network, a control portion, and a data generation portion. The control portion has a function of outputting first image data to the display device and a function of controlling an operation of the imaging device. The imaging device has a function of capturing an image displayed by input of the first image data to the display device and outputting the image as second image data to the processing device. The data generation portion has a function of generating third image data by obtaining a difference between the first image data and the second image data and a function of generating fourth image data by adding the first image data and the third image data. The arithmetic portion has a function of updating a weight coefficient so that output data obtained by input of the first image data to the neural network is close to the fourth image data.

Another embodiment of the present invention is a machine learning system for a neural network correcting image data input to a display device. The system includes a processing device and an imaging device. The processing device includes an arithmetic portion including the neural network, a control portion, and a data generation portion. The control portion has a function of outputting first image data to the display device and a function of controlling an operation of the imaging device. The imaging device has a function of capturing an image displayed by input of the first image data to the display device and outputting the image as second image data to the processing device. The data generation portion has a function of generating third image data by obtaining a difference between the first image data and the second image data, a function of generating fifth image data by inverting gray levels in the third image data using the maximum value of all the gray levels in the third image data as the reference value, and a function of generating sixth image data by obtaining a difference between the first image data and the fifth image data. The arithmetic portion has a function of updating a weight coefficient so that output data obtained by input of the first image data to the neural network is close to the sixth image data.

In any of the above, the control portion preferably includes an image divider portion. In this case, preferably, the display device includes a plurality of display panels, and the image divider portion has a function of dividing the first image data output by the control portion into pieces the number of which is the same as the number of the plurality of display panels.

In any of the above, the neural network preferably includes one or more convolutional layers between an input layer and an output layer. In this case, the data generation portion preferably has a function of performing padding processing on the first image data input to the neural network.

Another embodiment of the present invention is a display system including a display device and a signal generation portion. The display device includes a plurality of display panels. The signal generation portion includes a correction circuit and a divider circuit. The correction circuit has a function of correcting image data input to the correction circuit and outputting the image data to the divider circuit. The divider circuit has a function of dividing the image data corrected by the correction circuit into pieces the number of which is the same as the number of the display panels and outputting the pieces of the image data.

In any of the above, the correction circuit preferably has a function of correcting the image data so that a picture continuous at a boundary between the plurality of display panels is displayed.

In any of the above, the correction circuit preferably corrects the image data with a neural network.

The above display system preferably includes a receiver portion having a function of receiving a weight coefficient of the neural network. In this case, the signal generation portion preferably has a function of reflecting the weight coefficient input from the receiver portion in the neural network.

According to one embodiment of the present invention, the display quality of the display device can be improved. A method of correcting image data input to the display device can be provided. A novel image correction method or an image correction system can be provided.

Note that the description of these effects does not preclude the existence of other effects. One embodiment of the present invention does not necessarily achieve all the effects listed above. Other effects can be derived from the description of the specification, the drawings, the claims, and the like.

BRIEF DESCRIPTION OF DRAWINGS

FIGS. 4A, 4B-1, 4B-2, and 4C illustrate operation examples of a display device.

BEST MODE FOR CARRYING OUT THE INVENTION

Figure 1:
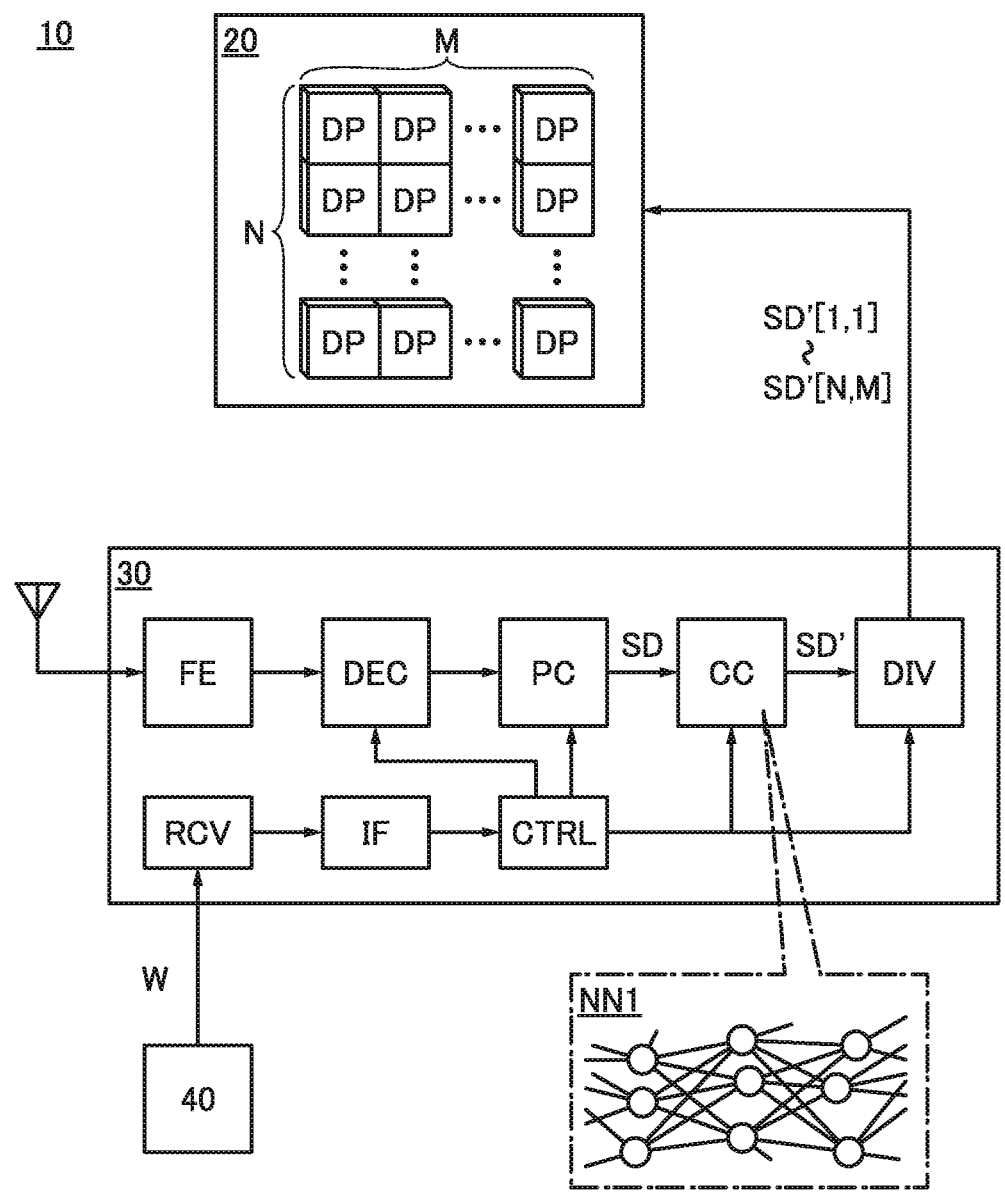
FIG. 1 illustrates a structure example of a display system.

Embodiments will be described in detail with reference to the drawings. Note that the present invention is not limited to the following description. It will be readily understood by those skilled in the art that modes and details of the present invention can be modified in various ways without departing from the spirit and scope of the present invention. Thus, the present invention should not be construed as being limited to the description in the following embodiments.

Note that in the structures of the present invention described below, the same portions or portions having similar functions are denoted by the same reference numerals in different drawings, and description thereof is not repeated. The same hatching pattern is applied to portions having similar functions, and the portions are not especially denoted by reference numerals in some cases.

Note that in each drawing described in this specification, the size, the layer thickness, or the region of each component is exaggerated for clarity in some cases. Therefore, the size, the layer thickness, or the region is not limited to the illustrated scale.

Note that in this specification and the like, ordinal numbers such as "first," "second," and the like are used in order to avoid confusion among components and do not limit the number.

A transistor is a kind of semiconductor elements and can achieve amplification of current or voltage, switching operation for controlling conduction or non-conduction, or the like. A transistor in this specification includes an insulated-gate field effect transistor (IGFET) and a thin film transistor (TFT) in its category.

Note that in this specification and the like, a display panel as one embodiment of the display device has a function of displaying (outputting) an image or the like on (to) a display surface; hence, the display panel is one embodiment of an output device. Thus, the display panel is one embodiment of an output device.

In this specification and the like, a structure in which a connector such as a flexible printed circuit (FPC) or a tape carrier package (TCP) is attached to a substrate of a display panel, or a structure in which an integrated circuit (IC) is mounted on a substrate by a chip on glass (COG) method or the like is referred to as a display panel module or a display module, or simply referred to as a display panel or the like in some cases.

In this specification and the like, a touch sensor has a function of sensing the contact, press, approach, or the like of an object such as a finger or a stylus. In addition, the touch sensor may have a function of sensing the positional information. Therefore, the touch sensor is one embodiment of an input device. For example, the touch sensor can include one or more sensor elements.

Furthermore, in this specification and the like, a structure in which a connector such as an FPC or a TCP is attached to a substrate of a touch sensor panel, or a structure in which an IC is mounted on a substrate by a COG method or the like is referred to as a touch sensor panel module, a touch sensor module, or a sensor module, or simply referred to as a touch sensor or the like in some cases Note that in this specification and the like, a touch panel which is one embodiment of the display device has a function of displaying (outputting) an image or the like on (to) a display surface and a function as a touch sensor capable of sensing contact, press, approach, or the like of an object such as a finger or a stylus on or to the display surface. Therefore, the touch panel is an embodiment of an input/output device.

A touch panel can be referred to, for example, a display panel (or a display device) with a touch sensor or a display panel (or a display device) having a touch sensor function.

A touch panel can include a display panel and a touch sensor panel. Alternatively, a touch panel can have a function of a touch sensor inside a display panel or on a surface of the display panel.

In this specification and the like, a structure in which a connector such as an FPC or a TCP is attached to a substrate of a touch panel, or a structure in which an IC is mounted on a substrate by a COG method or the like is referred to as a touch panel module or a display module, or simply referred to as a touch panel or the like in some cases.

Embodiment 1

In this embodiment, structure examples of a display system and a machine learning system and a machine learning method of one embodiment of the present invention and the like are described.

Structure Example of Display System

An example in which a display device included in the display system includes a plurality of display panels is given in the following description. Note that the display device may be formed of one display panel.

FIG. 1 illustrates a structure example of a display system 10. The display system 10 has a function of generating a signal for displaying a predetermined picture on the basis of data received from the outside and displaying the picture using the signal. The display system 10 includes a display device 20 and a signal generation portion 30.

Note that the display device 20 and the signal generation portion 30 can each be formed using a semiconductor device. Circuits included in the signal generation portion 30 can be integrated into one integrated circuit. Thus, the display device 20 can be referred to as a semiconductor device. The signal generation portion can be referred to as a semiconductor device or an integrated circuit.

Structure Example of Display Device

The display device 20 includes a plurality of display panels DP. The display panels DP each have a function of displaying a picture based on a signal for displaying a predetermined picture (hereinafter also referred to as a video signal) which is input from the signal generation portion 30. FIG. 1 illustrates the display device 20 including the display panels DP arranged in N rows and M columns (N and M are natural numbers). Note that the display panels DP can control display independent of each other.

One picture is divided into a plurality of pictures and the pictures are displayed on the plurality of respective display panels DP included in the display device 20; thus, a picture display region can be expanded and the display device 20 may be increased in size. For example, the display device 20 with a screen diagonal of 30 inches or more, 40 inches or more, 50 inches or more, or 60 inches or more can be fabricated. A high-resolution display device with at least full high definition, for example, at least a resolution of 4K2K or 8K4K can also be achieved.

The plurality of display panels DP are arranged in a matrix of N rows and M columns in the example illustrated in FIG. 1; however, the method of arranging the display panels DP is not limited to the example and a variety of arrangement methods can be employed in accordance with the intended use.

Moreover, in the case where a picture is displayed using the plurality of display panels DP, each of the display panels DP is not required to be large. An apparatus for manufacturing the display panels therefore does not need to be increased in size. In addition, since an apparatus for manufacturing small- and medium-size display panels can be used, there is no need to prepare equipment for large-size display devices, which leads to a reduction in manufacturing cost. In addition, a decrease in yield due to an increase in the size of a display panel can be avoided.

Figure 2A:
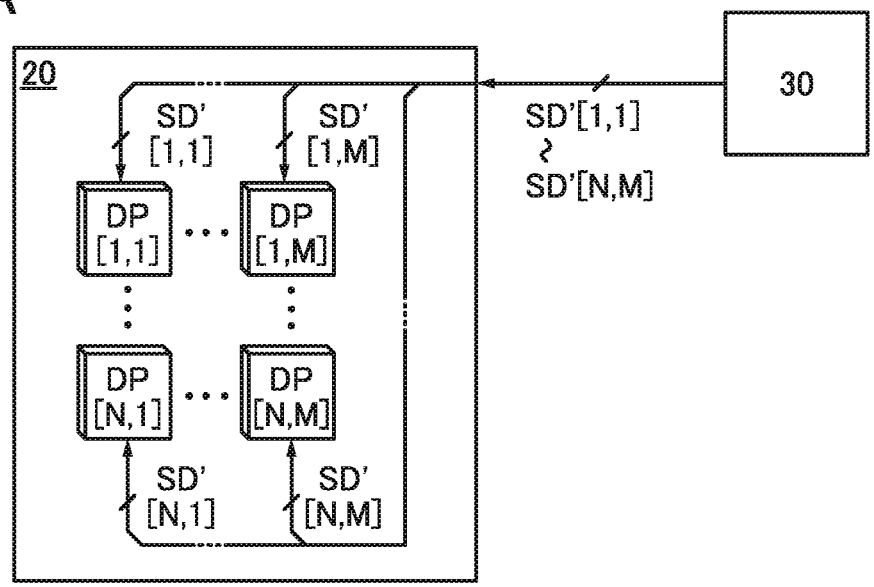
FIGS. 2A and 2B illustrate a structure example of a display device.

Video signals (data SD'[1, 1] to SD'[N, M], which may hereinafter be collectively referred to as SD') supplied from the signal generation portion 30 are input to the respective display panels DP. FIG. 2A illustrates the state in which the video signals are supplied to display panels DP[1, 1] to DP[N, M]. To the display device 20, N×M pieces of data SD' (SD'[1, 1] to SD'[N, M]) are input, and data SD'[i, j] is input to a display panel DP[i, j] (i is an integer greater than or equal to 1 and less than or equal to N and j is an integer greater than or equal to 1 and less than or equal to M).

Figure 2B:
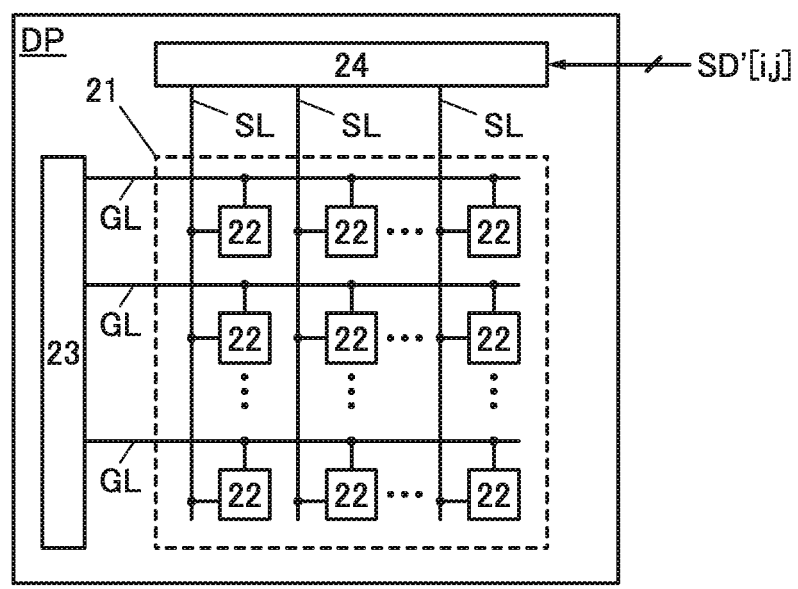

FIG. 2B illustrates a structure example of one display panel DP. The display panel DP includes a pixel portion 21 including a plurality of pixels 22, a driver circuit 23, and a driver circuit 24.

The pixels 22 each include a display element and have a function of expressing predetermined gradations. In addition, the gradations of the pixels 22 are controlled with the signals output from the driver circuit 23 and the driver circuit 24, so that the pixel portion 21 expresses a predetermined picture.

Examples of the display element in the pixels 22 include a liquid crystal element and a light-emitting element. As the liquid crystal element, a transmissive liquid crystal element, a reflective liquid crystal element, a transflective liquid crystal element, or the like can be used. Alternatively, for example, a micro electro mechanical systems (MEMS) shutter element, an optical interference type MEMS element, or a display element using a microcapsule method, an electrophoretic method, an electrowetting method, an Electronic Liquid Powder (registered trademark) method, or the like can be used as the display element. Examples of the light-emitting element include self-luminous light-emitting elements such as an organic light-emitting diode (OLED), a light-emitting diode (LED), a quantum-dot light-emitting diode (QLED), and a semiconductor laser.

The number of pixels 22 provided in the pixel portion 21 can be set freely. For example, the total number of pixels provided in the N×M display panels DP is preferably greater than or equal to 3840×2160 or greater than or equal to 4096×2160 in the case where the display device 20 displays a 4K2K picture. Moreover, the total number of provided pixels is preferably greater than or equal to 7680×4320 in the case where an 8K4K picture is displayed. Moreover, a larger number of pixels 22 can be provided in the pixel portion 21.

The pixels 22 are connected to wirings SL and wirings GL. Furthermore, the wirings GL are connected to the driver circuit 23, and the wirings SL are connected to the driver circuit 24.

The driver circuit 23 has a function of supplying a signal for selecting the pixel 22 (hereinafter also referred to as a selection signal) to the pixel 22. Specifically, the driver circuit 23 has a function of supplying the selection signal to the wirings GL, and the wirings GL each have a function of transmitting the selection signal output from the driver circuit 23 to the pixel 22. Note that the wirings GL can also be referred to as selection signal lines, gate lines, or the like.

The driver circuit 24 has a function of supplying the video signal to the pixel 22. Specifically, the driver circuit 24 has a function of supplying the video signal to the wirings SL, and the wirings SL each have a function of transmitting the video signal output from the driver circuit 24 to the pixel 22. Note that the wirings SL may also be referred to as video signal lines, source lines, or the like. When the video signal is supplied to the pixel 22 to which the selection signal is supplied, the video signal is written to the pixel 22 and a predetermined gradation is expressed.

Figure 3A:
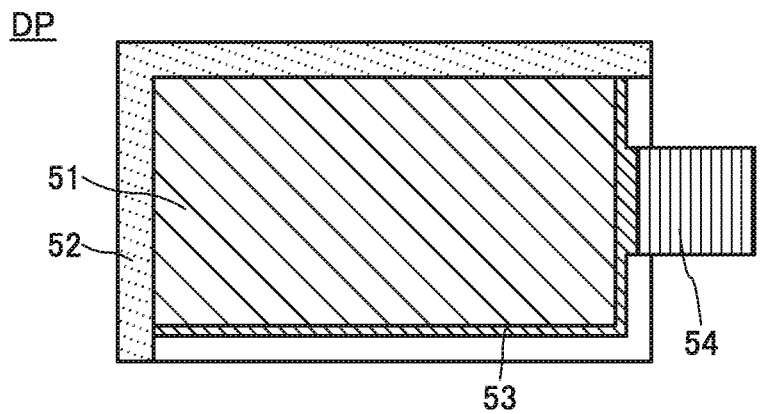
FIGS. 3A to 3C illustrate a structure example of a display device.
Figure 3B:
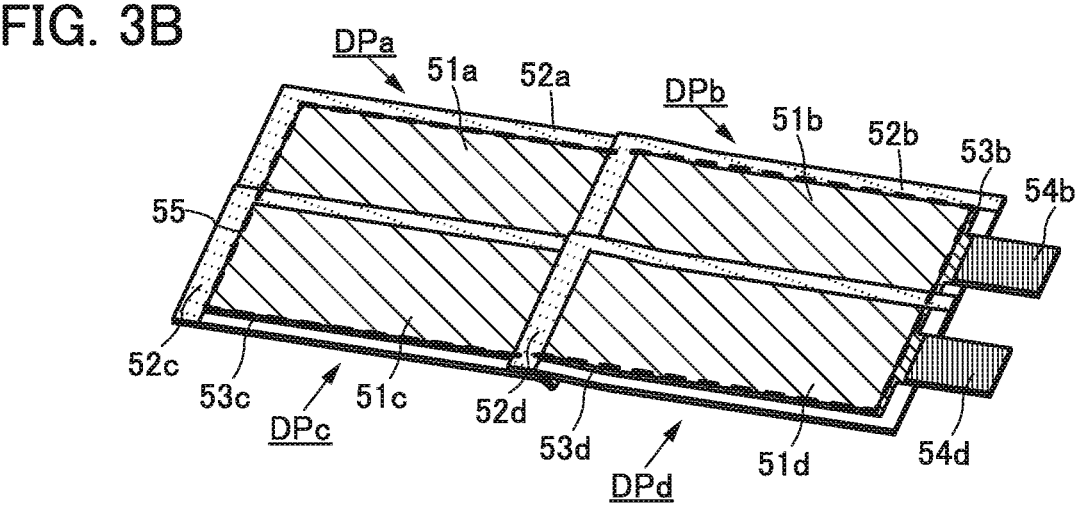
Figure 3C:
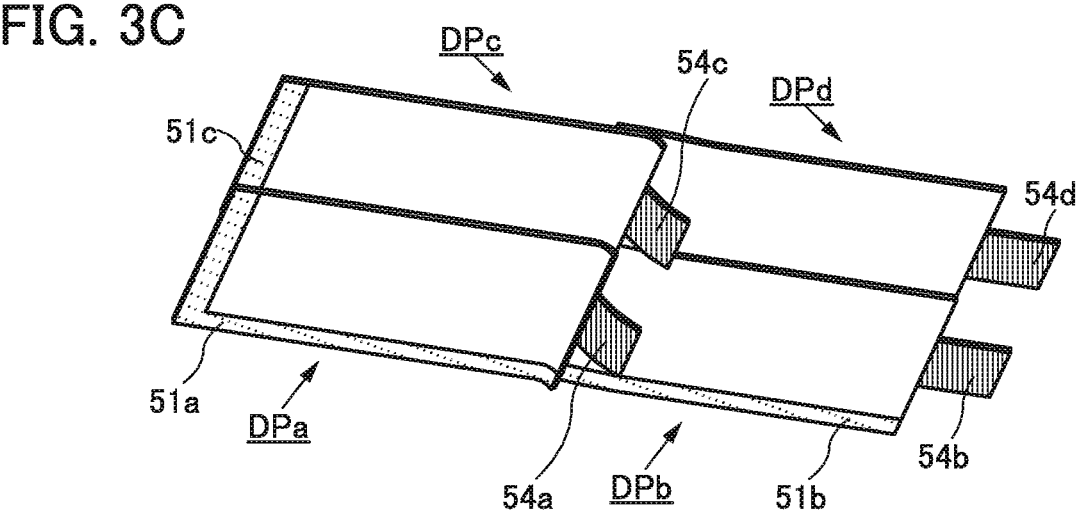

In the case where the plurality of display panels DP are provided in the display device 20, the plurality of display panels DP are preferably arranged such that the display region is continuous over adjacent display panels DP. FIGS. 3A to 3C illustrate a structure example and an arrangement example of the display panels DP.

The display panel DP illustrated in FIG. 3A includes a display region 51, and a region 52 transmitting visible light and a region 53 blocking visible light which are adjacent to the display region 51. FIG. 3A illustrates an example in which the display panel DP is also provided with a flexible printed circuit (FPC) 54.

The display region 51 includes the plurality of pixels 22 (not illustrated). In the region 52, for example, a pair of substrates included in the display panel DP, a sealant for sealing the display elements interposed between the pair of substrates, and the like may be provided. Here, for a member provided in the region 52, a material that transmits visible light is used. In the region 53, for example, a wiring electrically connected to the pixel 22 included in the display region 51 or the like can be provided. In addition, the driver circuit 23 or the driver circuit 24 may be provided in the region 53. Furthermore, a terminal electrically connected to the FPC 54, a wiring electrically connected to the terminal, or the like may be provided in the region 53.

FIG. 3B illustrates the arrangement example of the display panels DP illustrated in FIG. 3A. As an example, four adjacent display panels DPa, DPb, DPc, and DPd are illustrated. In addition, FIG. 3C is a schematic perspective view of the four display panels seen from the side opposite to the display surface side.

The display panels DP are arranged to have a region overlapping with each other. Specifically, the display panels DPa, DPb, DPc, and DPd are arranged such that the region 52 transmitting visible light which is included in one display panel DP has a region overlapping with and located over the display region 51 (on the display surface side) of another display panel DP. The display panels DPa, DPb, DPc, and DPd are arranged also such that the region 53 blocking visible light which is included in one display panel DP is prevented from overlapping with and being located over the display region 51 of another display panel DP.

More specifically, a region along a short side of a display region 51a of the display panel DPa and part of a region 52b of the display panel DPb are provided to overlap with each other. In addition, a region along a long side of a display region 51a of the display panel DPa and part of a region 52c of the display panel DPc are provided to overlap with each other. Moreover, a region 52d of the display panel DPd is provided to overlap with both a region along a long side of a display region 51b of the display panel DPb and a region along a short side of a display region 51c of the display panel DPc.

The region 52 transmitting visible light of one display panel overlaps with and is located over the display region 51 of another display panel; thus, the whole display region 51 can be viewed from the display surface side. Thus, a region where the display regions 51a, 51b, 51c, and 51d are arranged continuously without seams can be used as a display region 55 of the display device 20.

Preferably, the pair of substrates used for the display panels DP has flexibility and the display panels DP have flexibility. In such a case, as illustrated in FIGS. 3B and 3C, for example, part of the display panel DPa on the FPC 54a side is curved, whereby the FPC 54a can underlap the display region 51b of the adjacent display panel DPb. As a result, the FPC 54a can be placed without physical interference with the rear surface of the display panel DPb. Furthermore, when the display panel DPa and the display panel DPb overlap with and are bonded to each other, it is not necessary to consider the thickness of the FPC 54a; thus, the difference in height between the top surface of the region 52b of the display panel DPb and the top surface of the display region 51a of the display panel DPa is reduced. As a result, the end portion of the display panel DPb over the display region 51a is prevented from being viewed.

When each display panel DP has flexibility, the display panel DPb can be curved gently so that the top surface of the display region 51b of the display panel DPb and the top surface of the display region 51a of the display panel DPa are level with each other, for example. Thus, the display regions can be level with each other except in the vicinity of the region where the display panel DPa and the display panel DPb overlap with each other, so that the display quality of an image displayed on the display region 55 is improved.

Note that to reduce the step between two adjacent display panels DP, the thickness of the display panel DP is preferably small. For example, the thickness of the display panel DP is preferably less than or equal to 1 mm, further preferably less than or equal to 300 μm, still further preferably less than or equal to 100 μm.

As described above, the display device 20 can display a picture using the plurality of display panels DP.

Structure Example of Signal Generation Portion

The signal generation portion 30 illustrated in FIG. 1 has a function of generating a video signal on the basis of the data input from the outside. The signal generation portion 30 includes a front end portion FE, a decoder DEC, a processing circuit PC, a receiving portion RCV, an interface IF, a control circuit CTRL, a divider circuit DIV, and a correction circuit CC.

The front end portion FE has a function of performing signal processing as appropriate in response to a signal input from the outside. For example, a broadcast signal encoded by a predetermined method and modulated, or the like is input to the front end portion FE. The front end portion FE can have a function of demodulating a received video signal, performing analog-digital conversion, or the like. Furthermore, the front end portion FE may also have a function of correcting an error. Data that is received by the front end portion FE and subjected to the signal processing is output to the decoder DEC.

The decoder DEC has a function of decoding the encoded signal. In the case where image data included in the broadcast signal input to the front end portion FE has been compressed, the image data is decompressed by the decoder DEC. For example, the decoder DEC can have a function of performing entropy decoding, inverse quantization, inverse orthogonal transform such as inverse discrete cosine transform (IDCT) or inverse discrete sine transform (IDST), intra-frame prediction, inter-frame prediction, and the like.

As a coding standard in 8K4K television broadcast, a standard of H.265/MPEG-H high efficiency video coding (hereinafter referred to as HEVC) is employed. In the case where the image data included in the broadcast signal input to the front end portion FE is encoded according to HEVC, decoding according to HEVC is performed by the decoder DEC.

Image data is generated by the decoding process by the decoder DEC and is output to the processing circuit PC.

The processing circuit PC has a function of performing image processing on the image data input from the decoder DEC, generating data SD, and outputting the data SD to the correction circuit CC.

Examples of the image processing are noise removal processing, gray level transformation processing, tone correction processing, luminance correction processing, and the like. The tone correction processing or the luminance correction processing can be performed with the use of gamma correction or the like. Furthermore, the processing circuit PC may have a function of pixel interpolation processing accompanying up-conversion of the resolution, a function of frame interpolation processing accompanying up-conversion of the frame frequency, or the like.

The noise removing processing is removal of various noise, such as mosquito noise which appears near outline of texts and the like, block noise which appears in high-speed moving images, random noise which causes flicker, and dot noise caused by up-conversion of the resolution.

The gray level transformation processing is processing in which the gray levels of the data SD are transformed into gray levels corresponding to output characteristics of the display device 20. For example, in the case where the number of gray levels is increased, gray levels corresponding to pixels are interpolated to input image data with a small number of gray levels and assigned to the pixels, so that processing of histogram smoothing can be performed. In addition, high-dynamic range (HDR) processing which increases the dynamic range is also included in the gray level transformation processing.

The tone correction processing is processing in which the tone of a picture is corrected. The luminance correction processing corrects the brightness (luminance contrast) of a picture. The luminance and tone of a picture displayed on the display device 20 are corrected to be optimal, in accordance with the kind, luminance, or color purity of lighting of a room in which the display device 20 is provided, for example.

The pixel interpolation processing is processing in which data that does not originally exist is interpolated when resolution up-conversion is performed. For example, as data of the colors of a pixel that is newly interpolated (e.g., the gray levels corresponding to the colors, red (R), green (G), and blue (B)), data is interpolated to be data of the color intermediate between the colors of pixels around the pixel with reference to data of the colors of the pixels around the pixel.

The frame interpolation processing is processing in which an image for a frame that does not exist originally (an interpolation frame) is generated in the case where the frame frequency of a picture to be displayed is increased. For example, an image for an interpolation frame which is interposed between two images is generated from a difference between the two images. Alternatively, images for a plurality of interpolation frames can be generated between two images. For example, when the frame frequency of image data is 60 Hz, a plurality of interpolation frames are generated, so that the frame frequency of a video signal output to the display device 20 can be increased twofold (120 Hz), fourfold (240 Hz), eightfold (480 Hz), or the like.

Note that it is also possible to perform the above image processing by an image processing circuit that is provided separately from the processing circuit PC.

The correction circuit CC includes a neural network NN1. The correction circuit CC has a function of correcting data SD input from the processing circuit PC with the use of the neural network to output corrected data SD'.

The divider circuit DIV has a function of dividing the data SD' input from the correction circuit CC into the plurality of pieces of data SD' [1, 1] to SD' [N, M]. The data SD' [i, j] is image data corresponding to an image displayed on the display panel DP[i, j]. The data SD' is divided into the pieces of data the number of which is the same as the number of the display panels DP provided in the display device 20. In FIG. 1, the data SD' is divided into the N×M pieces of data and output to the display device 20.

The receiving portion RCV has a function of receiving data or a control signal input from the outside. The input of the data or control signal to the receiving portion RCV can be performed with a remote controller, a portable information terminal (e.g., a smartphone or a tablet), an operation button provided on the display device 20, or the like as well as an arithmetic processing device 40.

A weight coefficient W of the neural network NN1 described later can be received from the arithmetic processing device 40 or the like provided outside the signal generation portion 30. As the arithmetic processing device 40, a computer or a calculator having excellent arithmetic processing properties, such as a dedicated server or a cloud, can be used. The arithmetic processing device 40 can reflect a learning result in the neural network NN1 by supplying the weight coefficient W, which is obtained by learning with a later-described machine learning system, to the correction circuit CC through the receiving portion RCV. Here, the arithmetic processing device 40 may be replaced with the later-described machine learning system.

The interface IF has a function of processing the data or control signal received by the receiving portion RCV as appropriate and outputting the data or control signal to the control circuit CTRL.

The control circuit CTRL has a function of supplying the control signal to the circuits included in the signal generation portion 30. For example, the control circuit CTRL has a function of supplying the control signal to the decoder DEC, the processing circuit PC, the divider circuit DIV, or the correction circuit CC. The control by the control circuit CTRL can be performed on the basis of the control signal received by the receiving portion RCV or the like.

Figure 4A:
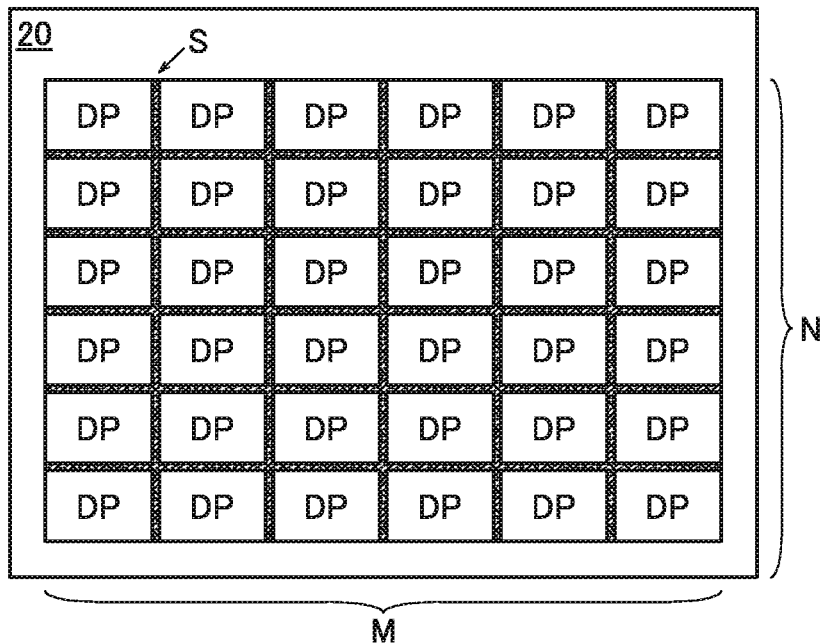

The video signal generated by the above signal generation portion 30 is output to the display device 20, and a picture is displayed on the display device 20. Here, in the case where the plurality of display panels DP are arranged in a matrix in the display device 20, there is a region where the display panels DP are adjacent to each other, that is, a junction region between the display panels DP (a region S in the figure), as illustrated in FIG. 4A. When a picture is displayed using the plurality of display panels DP, picture continuity in the region S is preferably ensured.

Figures 1, 4B:
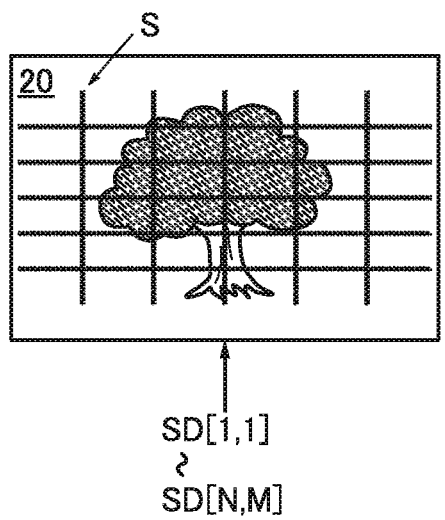

However, there can be variations in the transistor characteristics or capacitor size in the pixels 22, the parasitic resistance or parasitic capacitance of the wirings SL, the drive capability of the driver circuit 24, and the like among the display panels DP. This can make an error in a picture displayed on each display panel DP when the video signals are supplied to the display panels DP, which might result in picture discontinuity in the junction region. Furthermore, in the case where the display region 51 of one display panel DP has a region overlapping with the region 52 of another display panel DP, which transmits visible light, as illustrated in FIGS. 3B and 3C, in the junction region, the picture displayed in the display region 51 is viewed through the region 52 and a gray level error can be made. Thus, if the pieces of data (data SD[1, 1] to data [N, M]) obtained by directly dividing the data SD generated by the processing circuit PC are supplied to the display panels DP, a picture that is discontinuous at the region S can be viewed as illustrated in FIG. 4B-1.

In view of the above, according to one embodiment of the present invention, the correction circuit CC having a function of correcting the video signal by utilizing artificial intelligence (AI) is provided in the signal generation portion 30. Specifically, the correction circuit CC includes an artificial neural network (ANN) and inference (recognition) by the artificial neural network enables the video signal to be corrected so as to compensate for the picture discontinuity particularly at a junction. In this manner, in the case where the display device 20 is formed using the plurality of display panels DP, the picture distortion at the junction of the display panels DP can be inconspicuous, improving the quality of the picture.

Note that artificial intelligence refers to a computer that imitates the intelligence of human beings. The artificial neural network is a circuit that imitates a neural network composed of neurons and synapses, and is a kind of artificial intelligence. In this specification and the like, the term "neural network" particularly refers to the artificial neural network.

The correction circuit CC illustrated in FIG. 1 has a function of correcting the video signal input from the processing circuit PC. Specifically, in the case where the plurality of display panels DP are provided in the display device 20, the correction circuit CC has a function of correcting the data SD so that a picture which is continuous at the boundary between the display panels DP is displayed, that is, the picture discontinuity at the junction is compensated for.

Figures 2, 4B:
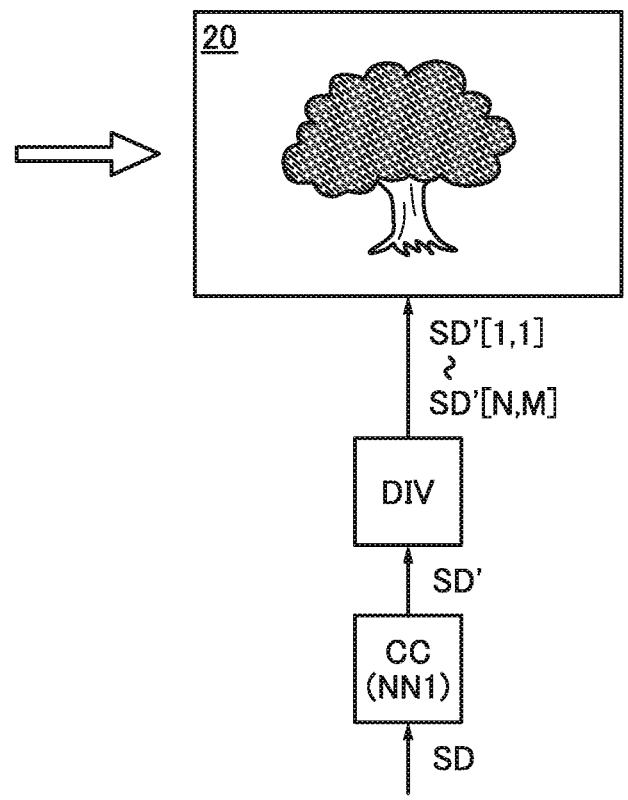

The correction of the data SD is performed by the neural network NN1 included in the correction circuit CC. In the neural network NN1, learning is performed to appropriately correct the video signal so that discontinuity of the picture at the junction region is relieved. Then, when the data SD is supplied as input data to the neural network NN1, the neural network NN1 performs inference and outputs the data SD'. Then, when the data SD' generated by the neural network NN1 is divided by the divider circuit DIV and the resulting N×M pieces of data SD'[i, j] are supplied to the display device 20, a picture with an inconspicuous seam as illustrated in FIG. 4B-2 is displayed.

Figure 4C:
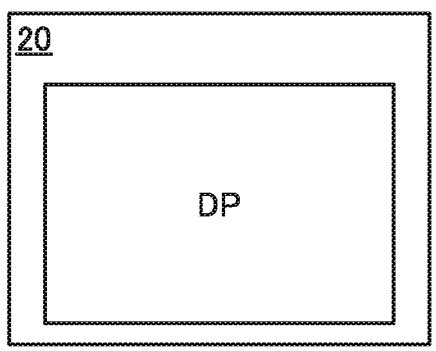

Note that the example in which the display device 20 includes the plurality of display panels DP is given here; however, also in the case where the display device 20 has one display panel DP as illustrated in FIG. 4C, there might occur display unevenness because of a variation in transistor characteristics or capacitor size, an adverse effect by the parasitic resistance or parasitic capacitance of the wirings SL, an in-plane variation in the drive capability of the driver circuit 24, an in-plane variation in display element characteristics, and the like. Even in this case, the data SD' generated by the correction circuit CC enables a picture with inconspicuous unevenness to be displayed.

The correction circuit CC using the neural network NN1 is described below in detail.

Structure Example of Correction Circuit

Figure 5:
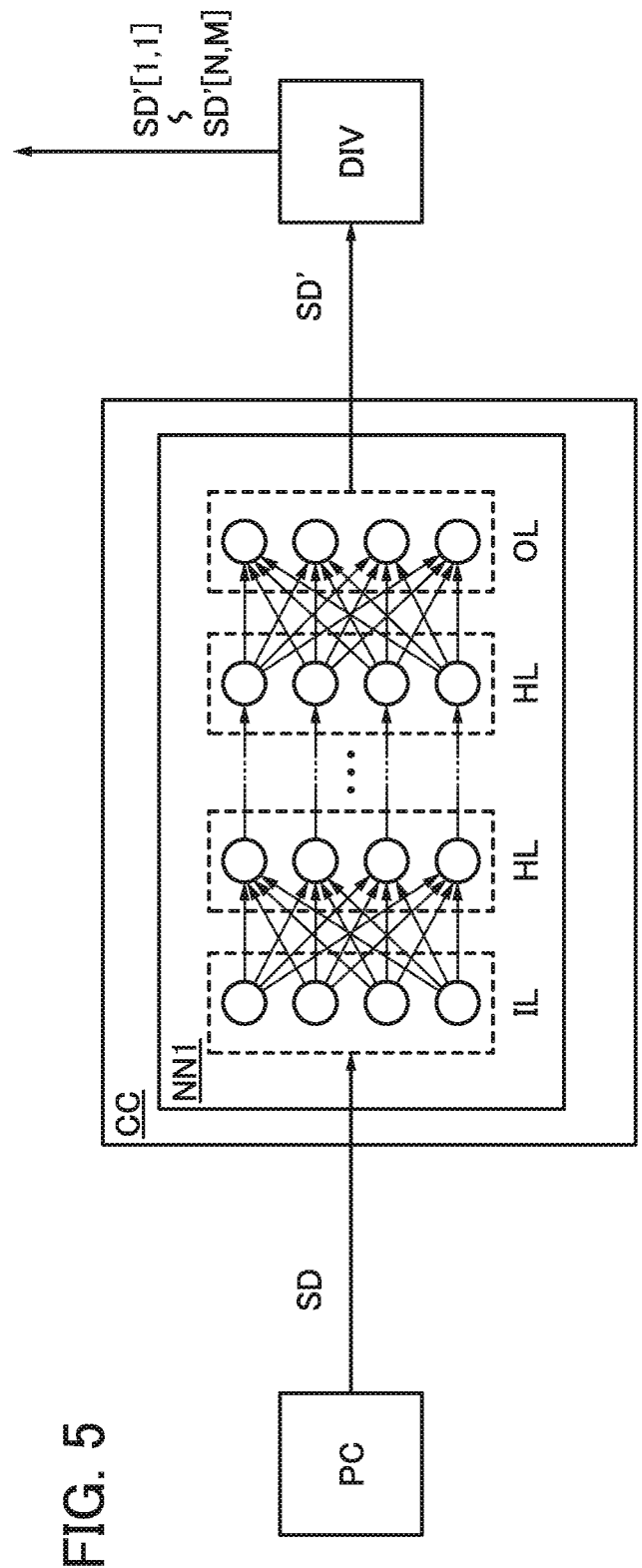
FIG. 5 illustrates a structure example of a correction circuit.

FIG. 5 illustrates a structure example of the correction circuit CC. The correction circuit CC includes the neural network NN1 and has a function of correcting the data SD. The data SD is input to the neural network NN1.

Note that although a structure example where the correction circuit has one neural network NN1 is described here, a structure in which a plurality of neural networks are provided in parallel is also possible. In such a case, the input data SD is divided into a plurality of pieces of data and they are input to the respective neural networks. In addition, a layer that combines data output from the plurality of neural networks and outputs the data SD' including one image data is preferably provided. Thus, the video signal can be corrected at high speed. This is particularly preferred in the case where picture data with a high resolution such as 8K4K is processed.

The neural network NN1 includes an input layer IL, an output layer OL, and a hidden layer (middle layer) HL. The neural network NN1 may be formed of a neural network including a plurality of hidden layers HL, that is, a deep neural network. Note that learning by the deep neural network may be referred to as deep learning. The output layer OL, the input layer IL, and the hidden layers HL each include a plurality of neuron circuits, and the neuron circuits provided in the different layers are connected to each other through a synapse circuit.

The function of correcting the data SD so as to relieve the discontinuity of the picture to be displayed on the display device 20 is added to the neural network NN1 by learning. Then, when the data SD is input to the neural network NN1, arithmetic processing is performed in each layer. The arithmetic processing in each layer is executed by the product-sum operation of an output of the neuron circuits in the previous layer and a weight coefficient, and the like. Note that the connection between layers may be a full connection where all of the neuron circuits are connected or a partial connection where some of the neuron circuits are connected.

Then, the operation result is output from the output layer OL as the data SD'. Thus, the data SD is corrected to the data SD'.

Then, the data SD' output from the output layer OL of the neural network NN1 is input to the divider circuit DIV. In this manner, by using the video signal corrected by the neural network NN1, a picture with an inconspicuous junction can be displayed on the display device 20.

The weight coefficient is stored in the neural network NN1. Optimization of the weight coefficient, that is, a learning method is described later.

The above is the description of the display system 10. With such a structure, a display system capable of display with extremely high quality can be provided.

Structure Example of Machine Learning System

While an example is given of a system capable of optimizing the weight coefficient stored in the neural network NN1 in the correction circuit CC described above, that is, capable of neural-network learning, a machine learning method of one embodiment of the present invention or a method of generating data used for machine learning, as well as a structure example and an operation example of the system, are described below.

Figure 6:
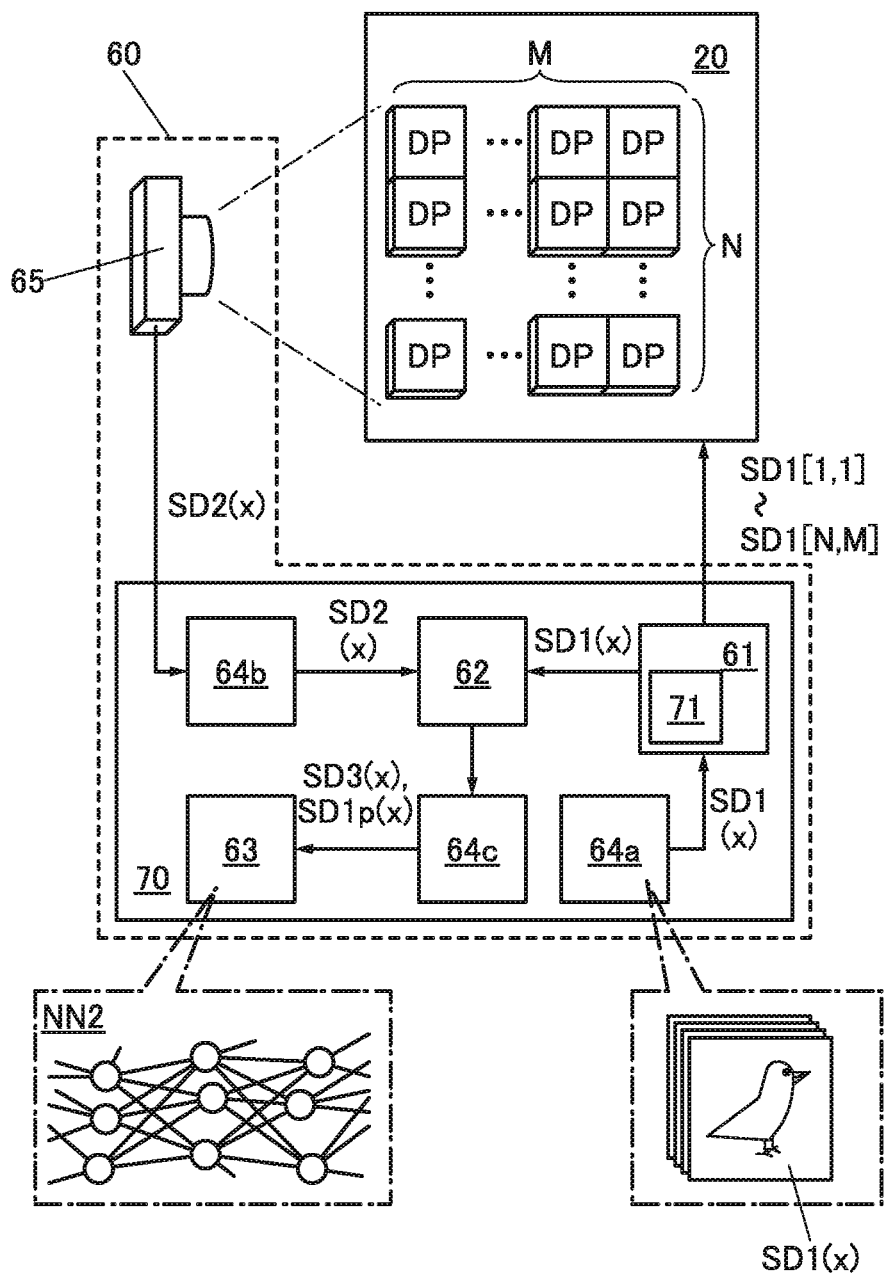
FIG. 6 illustrates a structure example of a machine learning system.

FIG. 6 illustrates a structure example of a machine learning system 60. In FIG. 6, the display device 20 is illustrated in addition to the machine learning system 60. The above description can be referred to for the structure of the display device 20.

The machine learning system 60 includes a processing device 70 and an imaging device 65.

The imaging device 65 can capture an image to be displayed on the display device 20. In addition, the image data captured by the imaging device 65 is output as data SD2 to the processing device 70. For example, a camera can be used as the imaging device 65. The higher the resolution of an image which can be captured by the imaging device 65 is, the more preferable it is. In particular, an imaging device with a resolution greater than or equal to the number of all pixels of the display device 20 is preferably used.

The processing device 70 includes a control portion 61, a data generation portion 62, an arithmetic portion 63, a memory portion 64a, a memory portion 64b, a memory portion 64c, and the like.

The memory portion 64a has a function of storing X pieces of data SD1 (X is an integer greater than or equal to 2).

In the following description, in the case where the pieces of data SD1 and the like need to be distinguished from each other, x-th data may be denoted by a reference numeral followed by the letter (x), for example, data SD1($x$) or the like (x is an integer greater than or equal to 1 and less than or equal to X). By contrast, in the description without distinction between individual pieces of data, data may be denoted as data SD1 or the like without addition of (x).

The memory portion 64a can output data SD1($x$) in response to requirement from the control portion 61. In addition, X pieces of data SD1($x$) are image data and different from each other; the larger the number of pieces of data SD1($x$) is, the higher the learning accuracy of a neural network NN2 described later can become.

The control portion 61 has a function of outputting the data SD1($x$) input from the memory portion 64 to the data generation portion 62.

In addition, the control portion 61 includes a divider circuit 71 and has a function of dividing the data SD1($x$) into N×M pieces of data SD(x)[1, 1] to SD(x)[N, M] to output them to the display device 20.

The control portion 61 may have a function of controlling operations of various components of the processing device 70. The control portion 61 may also have a function of generating a signal requiring the imaging device 65 to perform an operation such as imaging or data output and outputting the signal to the imaging device 65. Note that in addition to the control portion 61, a control portion having a function of controlling operations of various components of the processing device 70 may be provided.

The data generation portion 62 has a function of generating data SD3(x) based on the data SD1(x) and data SD2(x) and outputting the data SD3(x) to the arithmetic portion 63. The data generation portion 62 may also have a function of generating data SD1p(x) by performing padding processing the data SD1(x) and outputting the data SD1p(x) to the arithmetic portion 63. The details of the data generated by the data generation portion are described later.

Note that the padding processing refers to the processing of adding data corresponding to a lack of data to set the data length in the case where the data length is shorter than a predetermined length. Here, in the case where the object data is image data, the padding processing corresponds to the processing in which data is added to the left, right, top, and bottom of an image so that a blank portion (also referred to as a margin) is added to surround the original image. Here, zero padding using "0" as pixel gray level data to be added may be employed, or the same gray level as the gray level of an adjacent pixel may be used as pixel gray level data to be added.

The memory portion 64b has a function of storing the data SD2(x) input from the imaging device 65. In addition, the memory portion 64b can output the data SD2(x) to the data generation portion 62 in response to requirement from the control portion 61.

The memory portion 64c has a function of storing the data SD3(x) and data SD1p(x) generated by the data generation portion 62. In addition, the memory portion 64c can output the data SD3(x) and the data SD1p(x) to the arithmetic portion 63 in response to requirement from the control portion 61.

Note that although the memory portion 64a, the memory portion 64b, and the memory portion 64c are described as different blocks here, one memory device may serve as these memory portions.

The memory portion 64c can be omitted. In such a case, when learning is performed, the data SD3(x) and the data SD1p(x) generated by the data generation portion 62 can be sequentially output to the arithmetic portion 63 directly without passing through the memory portion 64c.

The arithmetic portion 63 includes the neural network NN2. The neural network NN2 updates the weight coefficient W, that is, performs learning with the data SD1p and the data SD3 generated by the data generation portion 62.

Here, the structure of the neural network NN2 is preferably a structure corresponding to the neural network NN1 included in the correction circuit CC of the above display system 10. By making the structure of the neural network NN2 the same as that of the neural network NN1, the weight coefficient W for which the learning has been finished can be directly reflected in the neural network NN1. The neural network NN2 may have a structure different from the neural network NN1 to perform efficient learning. Furthermore, the neural network NN1 may have a simpler structure than the neural network NN2 since the neural network NN1 is used mainly to execute the inference whereas the neural network NN2 is used mainly to execute the learning. For example, the neural network NN2 needs to conduct calculation for a backpropagation method to perform the learning but the neural network NN1 does not need such calculation.

Example of Operation Method of Machine Learning System

Figure 7:
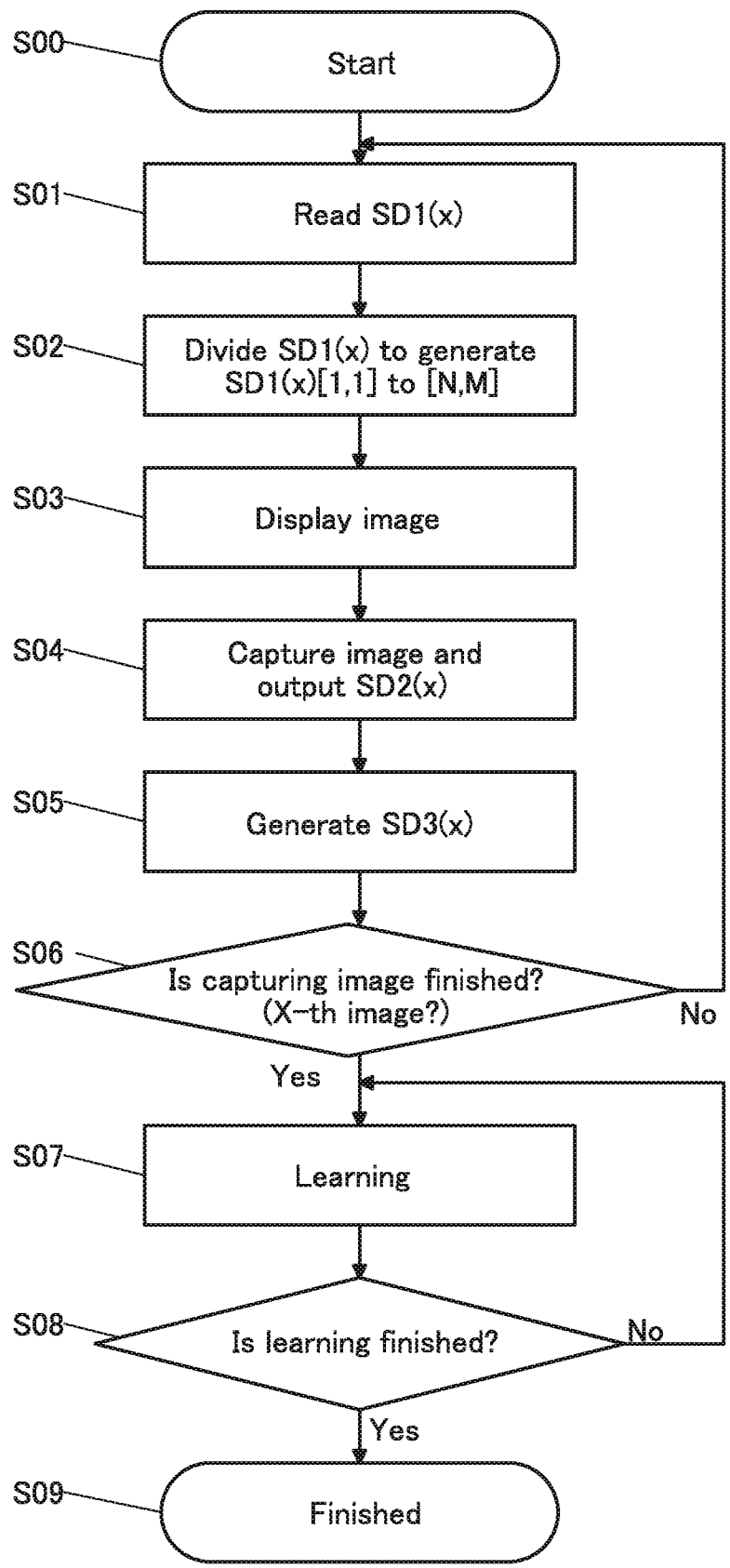
FIG. 7 is a flow chart showing an operation method of a machine learning system.

An example of an operation method of the machine learning system 60 is described below. FIG. 7 is a flow chart showing the example of the operation method of the machine learning system 60.

(Step S00)

In Step S00, an operation of the machine learning system 60 starts.

(Step S01)

In Step S01, the data SD1(x) is read from the memory portion 64a to the control portion 61.

(Step S02)

In Step S02, the N×M pieces of data SD1(x)[1, 1] to SD1(x)[N, M] obtained by dividing the data SD1(x) by the divider circuit 71 in the control portion 61 are generated.

(Step S03)

In Step S03, the control portion 61 outputs the N×M pieces of data SD1(x)[1, 1] to SD1(x)[N, M] to the display device 20. The display panels DP of the display device 20 display an image based on the input data.

(Step S04)

In Step S04, the image displayed on the display device 20 is captured by the imaging device 65. The captured image is output as the data SD2(x) to the memory portion 64b.

(Step S05)

In Step S05, the data generation portion 62 generates the data SD3(x) based on the data SD1(x) input from the control portion 61 and the data SD2(x) input from the memory portion 64b, and outputs the data SD3(x) to the memory portion 64c.

Figure 8:
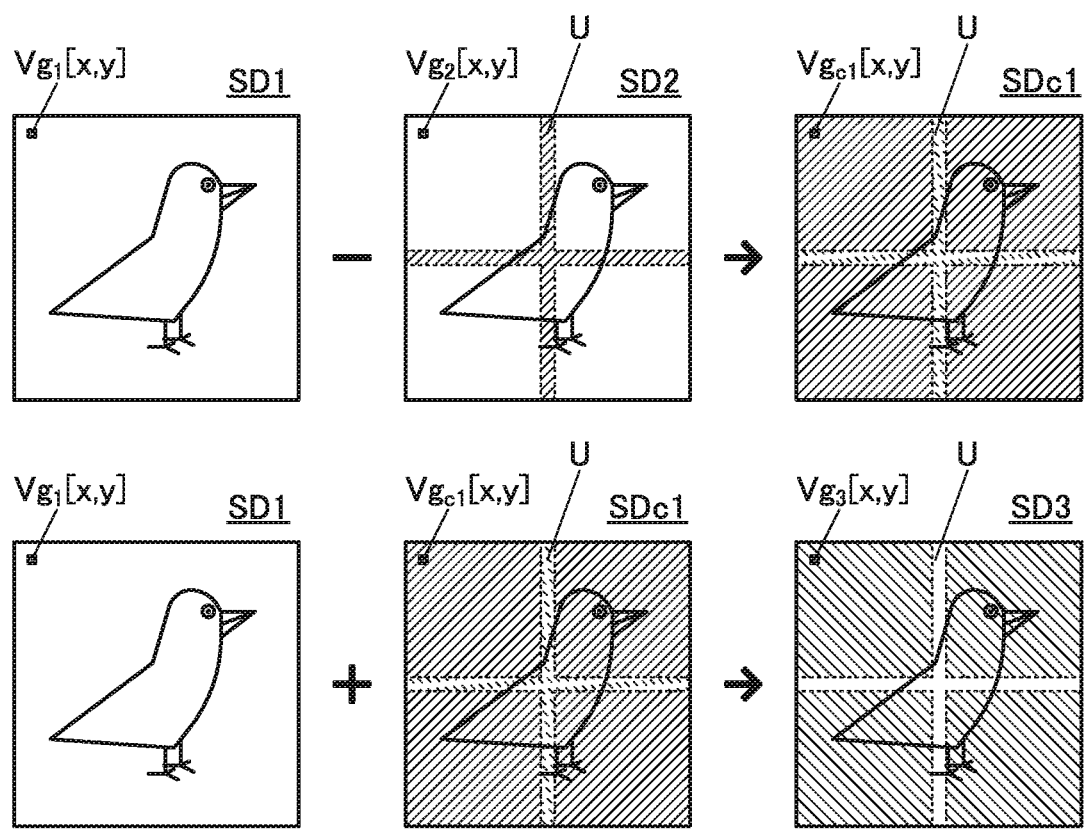
FIG. 8 illustrates an operation example of a data generation portion.

The data SD3 generated is described here with reference to FIG. 8.

First, as illustrated in the upper part of FIG. 8, the data generation portion 62 generates data SDc1 by performing an operation in such a manner that the data SD2 is subtracted from the data SD1, that is, a difference between the data SD1 from the data SD2 is obtained.

In FIG. 8, the image shown by the data SD2 is assumed to include a cross-shaped region U having lower luminance than the other regions. The region U corresponds to a region (a junction portion) in two adjacent display panels DP where a region transmitting visible light which is included in one display panel DP overlaps with a display portion of the other display panel DP, for example.

In the data SDc1 obtained by subtracting the data SD2 from the data SD1, the region U has higher luminance than the other regions.

Then, as illustrated in the lower part of FIG. 8, the data SD3 is generated by an operation in such a manner that the data SD1 is added to the data SDc1, that is, the sum of the data SD1 and the data SDc1 is obtained.

The data SD3 is image data in which the luminance of the region U is increased to be higher than that in the data SD1. This data SD3 can be said to be data in which the gray levels are increased so that a reduction in the luminance of the junction portion of the plurality of display panels DP is compensated for. If directly input to the display device 20, this data SD3 thus becomes image data with the junction portion that is difficult to view.

The arithmetic processing in Step S05 is represented by Formula 1. Here, $Vg_1[x, y]$ is the gray level of a pixel of a predetermined address [x, y] in the data SD1 (see FIG. 8). Similarly, $Vg_2[x, y]$, $Vg_{c1}[x, y]$, and $Vg_3[x, y]$ are the gray levels of pixels of predetermined addresses in the data SD2, the data SDc1, and the data SD3, respectively.

$$Vg_{c1}[x,y]=Vg_1[x,y]-Vg_2[x,y]$$

$$Vg_3[x,y]=Vg_1[x,y]+Vg_{c1}[x,y] \quad (1)$$

The above description is made using the data SDc1 generated as an intermediary image for easy understanding; however, an actual operation may be performed based on Formula 2 shown below without generating the data SDc1.

$$Vg_3[x,y]=2Vg_1[x,y]-Vg_2[x,y] \quad (2)$$

(Step S06)

In the case where the imaging is finished in Step S06, that is, the data SD1(x) is X-th data, the next step is Step S07. In the case where the imaging is continued, that is, the data SD1(x) is not X-th data, the next step is Step S01; in this case, 1 is added to x so that Steps S01 to S06 are performed on the next data (SD(x+1)).

In the case where the imaging is continued, the data SD1(x+1), which is the next image data stored in the memory portion 64a, is read.

Steps S01 to S06 are performed repeatedly as many times as the number (i.e., X) of pieces of the data SD1 stored in the memory portion 64. However, this does not apply to the case where interrupt processing is performed by a user or other programs.

(Step S07)

The learning in the neural network NN2 is performed in Step S07.

Figure 9A:
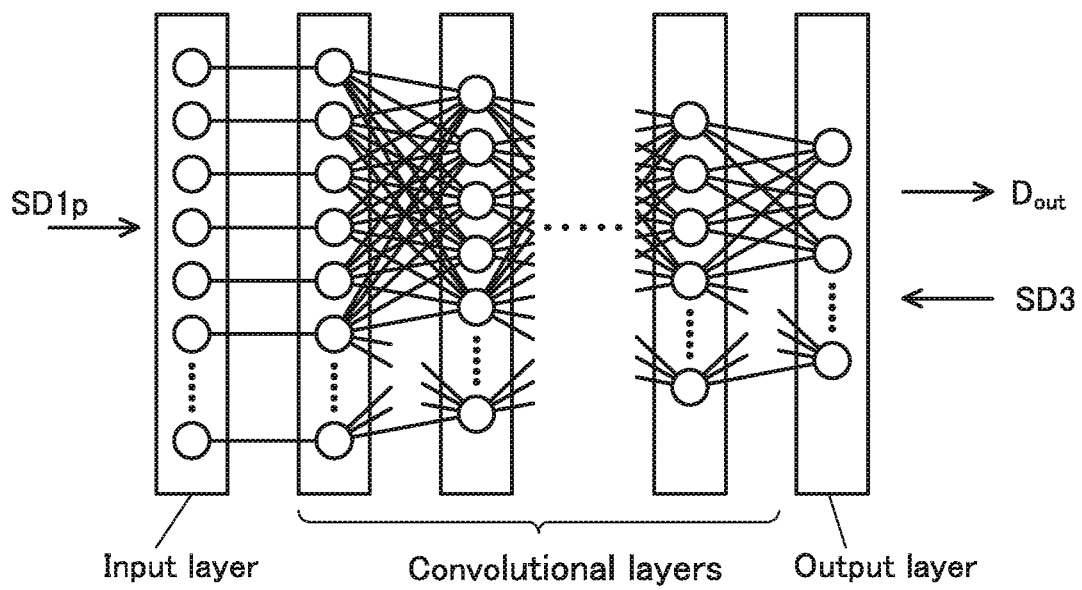
FIGS. 9A and 9B illustrate a structure example of a neural network and a learning method, respectively.
Figure 9B:
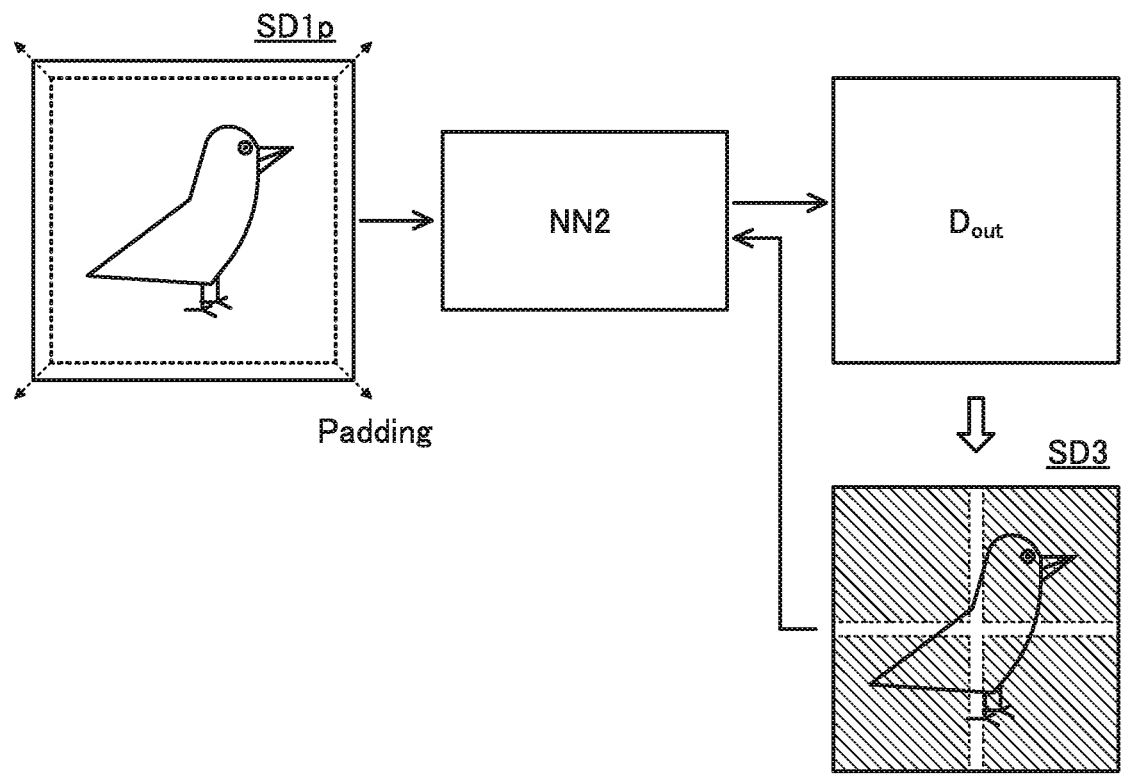

First, a structure example of the neural network NN2 is described. FIG. 9A illustrates the structure example of the neural network NN2. In addition, FIG. 9B schematically illustrates a learning method.

The neural network NN2 illustrated in FIG. 9A includes a plurality of convolutional layers between an input layer and an output layer. The neural network NN2 can be considered as a convolutional neural network (CNN) because the neural network NN2 includes the convolutional layers. The use of the CNN illustrated in FIG. 9A enables construction of a more accurate neural network.

Note that the structure of the neural network NN2 is not limited to this and can be a variety of structures.

Here, the size of image data (specifically, the number of pixels) is reduced when convolution processing by the convolutional layer is performed; therefore, the size of image data to be used as input data is preferably increased by advance padding processing.

Next, the learning is described. The learning can be executed by a so-called supervised learning method using the data SD1p, which has undergone padding processing, as input data and using the data SD3 as teacher data. As illustrated in FIGS. 9A and 9B, the data SD1p having undergone padding processing is input from the input layer side of the neural network NN2, and the data SD3 is input from the output layer side. In this case, the weight coefficient of the neural network NN2 is updated so that output data $D_{out}$ of the neural network NN2 becomes equal to the data SD3 (or as close to the data SD3 as possible). The weight coefficient can be updated by a method such as a backpropagation method.

More specifically, one-time update of the weight coefficient is followed by update of the output data $D_{out}$ of the neural network NN2; then, based on the difference between the output data $D_{out}$ and the data SD3, the weight coefficient is further updated. This operation is repeated until an error (difference) between the output data $D_{out}$ and the data SD3 becomes less than or equal to a certain value. Note that calculation of the difference may be performed either inside or outside the neural network NN2. In addition, the allowable range of the error can be determined freely. When the difference between the output data $D_{out}$ and the data SD3 finally becomes less than or equal to the certain value, learning for one piece of data SD1 in the neural network NN1 is finished.

(Step S08)

In the case where the learning is finished in Step S08, the next step is Step S09 and the operation is finished. In the case where the learning is not finished in Step S08, the next step is Step S07.

In the case where the learning is not finished, the learning is performed based on the next data (data SD3(x+1) and data SD1p(x+1)) stored in the memory portion 64c in Step S07.

Step S07 is performed as many times as the number of pieces of the data SD1 stored in the memory portion 64a, i.e., X times. However, this does not apply to the case where interrupt processing is performed by a user or other programs.

(Step S09)

In Step S09, the operation is finished. Then, the weight coefficient of the neural network NN2 at this time is obtained as a learning result.

The above is the description of the operation method example of the machine learning system 60.

Note that the step of performing the imaging, the step of generating the data SD3, and the step of executing the learning may be performed in parallel. For example, while learning based on first image data (data SD1(1)) is executed, imaging based on second image data (data SD1(2)) and generation of data SD3(2) may be performed. The learning and the data generation can be executed in parallel in this manner, which can reduce a period required for the machine learning.

In the above operation method of the machine learning system 60, for example, a program can be stored in a non-transitory medium, read by an arithmetic device included in hardware, and executed. Thus, one embodiment of the present invention is a program that enables hardware to execute the operation based on the above-described operation method, or a non-transitory memory medium in which the program is stored.

Modification Example

A modification example of the above operation of the data generation portion 62 is described below.

In the method illustrated in FIG. 8 as an example, since the data SD3 is generated by adding the data SDc1 to the data SD1 corresponding to the original image, the gray level of a pixel in the generated data SD3 might exceed the gray level of the highest luminance (e.g., a gray level of 255 for 8-bit data) depending on the image of the data SD1. An example of a method that does not cause such a problem is described.

Figure 10:
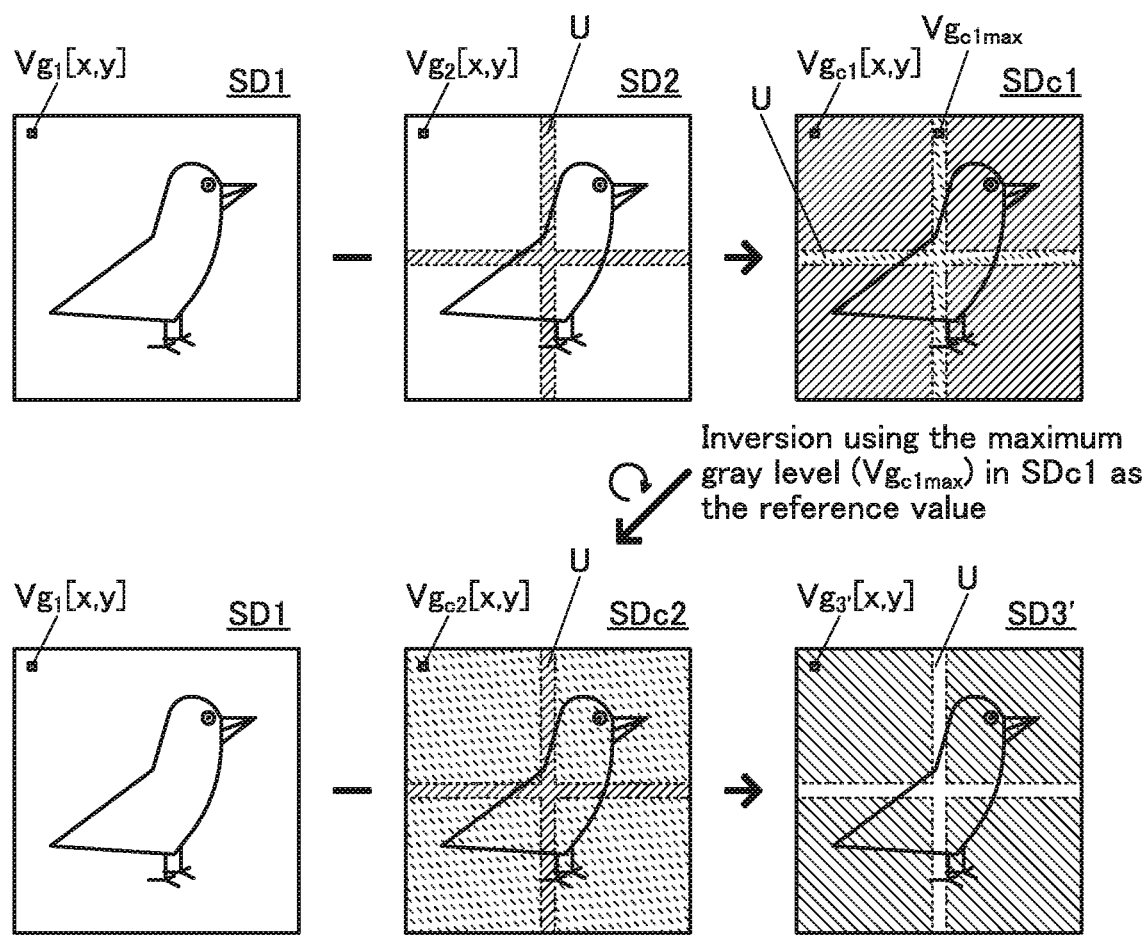
FIG. 10 illustrates an operation example of a data generation portion.

An example of a data generation method is described below with reference to FIG. 10.

First, as in the example illustrated in FIG. 8, the data SD2 is subtracted from the data SD1 to generate SDc1.

Here, the gray level of the pixel with the highest luminance in the data SDc1 is $Vg_{c1max}$. In many cases, the pixel with $Vg_{c1max}$ is located in the region U.

Next, the data SDc2 is generated by an operation performed in such a manner that the gray levels of all the pixels in the data SDc1 are inverted using the gray level $Vg_{c1max}$ as the reference value. Here, the gray level of any pixel in the data SDc2 is $Vg_{c2}[x, y]$.

Next, the data SD3' can be generated by performing an operation in such a manner that the data SDc2 is subtracted from the data SD1, that is, a difference between the data SDc2 from the data SD1 is obtained.

A series of arithmetic processing at this time is represented by Formula 3.

$$Vg_{c1}[x,y]=Vg_1[x,y]-Vg_2[x,y]$$

$$Vg_{c2}[x,y]=2Vg_{c1\ max}-Vg_{c1}[x,y]$$

$$Vg_{3'}[x,y]=Vg_1[x,y]-Vg_{c2}[x,y] \quad (3)$$

When actually performed, the operation may be performed based on Formula 4 shown below without generating the data SDc2 as an intermediary image.

$$Vg_{3'}[x,y]=2Vg_1[x,y]-Vg_2[x,y]-2Vg_{c1\ max} \quad (4)$$

The highest gray level in the data SD3' generated in such a manner is less than or equal to the gray level of the highest luminance, and consequently the above-described problem is not caused.

The above is the description of the modification example.

According to the machine learning method or machine learning system of one embodiment of the present invention, image correction using a neural network which can favorably reduce display unevenness of the display device can be performed.

The display system including the neural network using the weight coefficient obtained based on the machine learning method or machine learning system of one embodiment of the present invention can perform image correction that is optimized according to the properties of the display device; thus the display system can achieve extremely high display quality.

At least part of this embodiment can be implemented in combination with any of the other embodiments described in this specification as appropriate.

Embodiment 2

In this embodiment, a structure example of a semiconductor device that can be used in the neural networks described in the above embodiment is described.

Figure 11A:
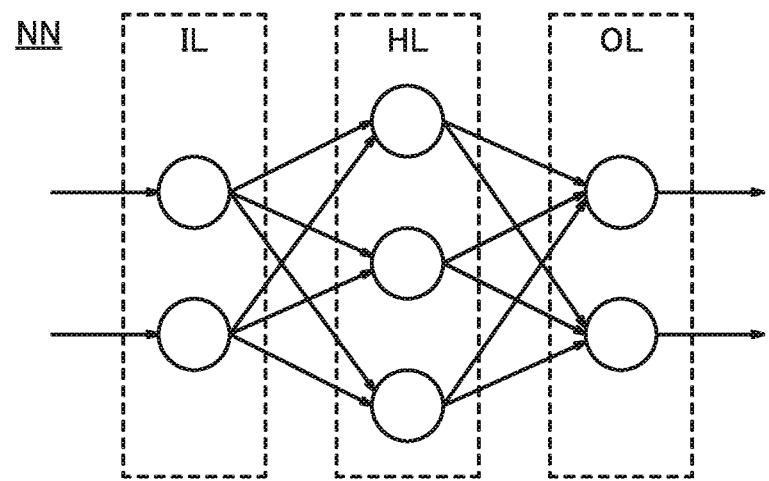
FIGS. 11A and 11B illustrate a structure example of a neural network.

As illustrated in FIG. 11A, a neural network NN can be formed of the input layer IL, the output layer OL, and the middle layer (hidden layer) HL. The input layer IL, the output layer OL, and the middle layer HL each include one or more neurons (units). Note that the middle layer HL may be one layer or two or more layers. A neural network including two or more middle layers HL can also be referred to as a deep neural network (DNN), and learning using a deep neural network can also be referred to as deep learning.

Input data is input to each neuron of the input layer IL, output signals of neurons in the previous layer or the subsequent layer are input to neurons of the middle layer HL, and output signals of neurons in the previous layer are input to neurons of the output layer OL. Note that each neuron may be connected to all the neurons in the previous and subsequent layers (full connection), or may be connected to some of the neurons.

Figure 11B:
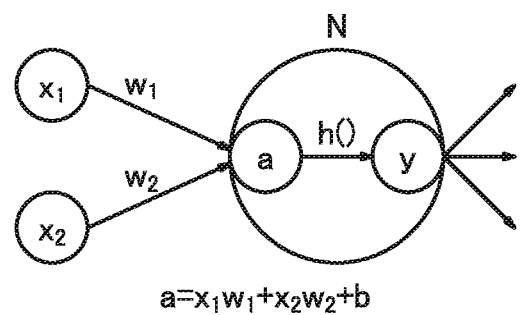

FIG. 11B illustrates an example of an operation with the neurons. Here, a neuron N and two neurons in the previous layer which output signals to the neuron N are illustrated. An output $x_1$ of a neuron in the previous layer and an output $x_2$ of a neuron in the previous layer are input to the neuron N. Then, in the neuron N, a total sum $x_1w_1+x_2w_2$ of a multiplication result ($x_1w_1$) of the output $x_1$ and a weight $w_1$ and a multiplication result ($x_2w_2$) of the output $x_2$ and a weight $w_2$ is calculated, and then a bias b is added as necessary, so that the value $a=x_1w_1+x_2w_2+b$ is obtained. Then, the value a is converted with an activation function h( ), and an output signal y=h(a) is output from the neuron N.

In this manner, the operation with the neurons includes the operation that sums the products of the outputs and the weights of the neurons in the previous layer, that is, the product-sum operation ($x_1w_1+x_2w_2$ in the above). This product-sum operation may be performed using a program on software or using hardware. In the case where the product-sum operation is performed by hardware, a product-sum arithmetic circuit can be used. A digital circuit or an analog circuit may be used as this product-sum arithmetic circuit. In the case where an analog circuit is used as the product-sum arithmetic circuit, the circuit scale of the product-sum arithmetic circuit can be reduced, or higher processing speed and lower power consumption can be achieved by reduced frequency of access to a memory.

The product-sum arithmetic circuit may be formed of a transistor including silicon (such as single crystal silicon) in a channel formation region (hereinafter also referred to as a Si transistor) or a transistor including an oxide semiconductor in a channel formation region (hereinafter also referred to as an OS transistor). An OS transistor is particularly preferably used as a transistor included in an analog memory of the product-sum arithmetic circuit because of its extremely low off-state current. Note that the product-sum arithmetic circuit may be formed of both a Si transistor and an OS transistor. A structure example of a semiconductor device having a function of the product-sum arithmetic circuit is described below.

Structure Example of Semiconductor Device

Figure 12:
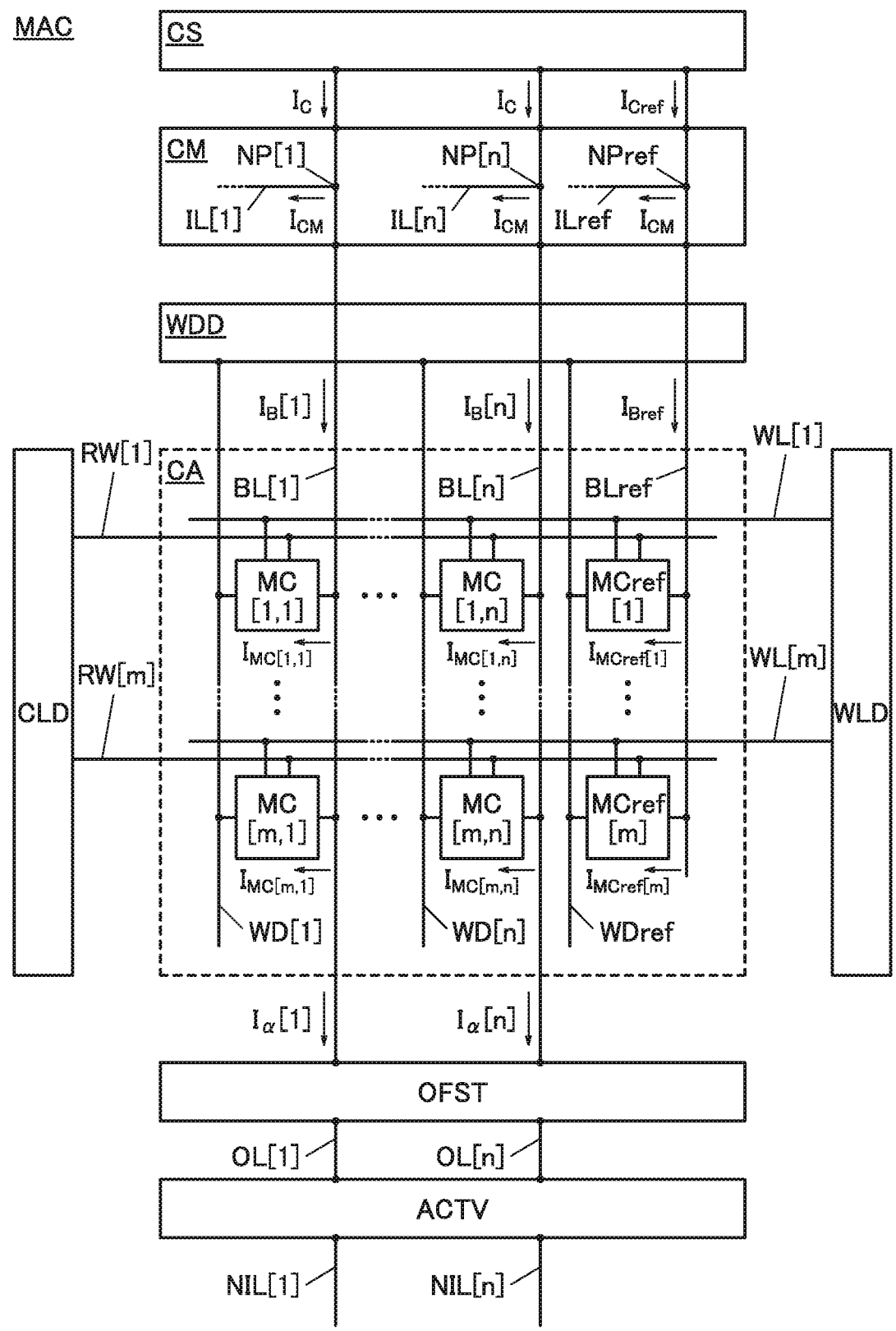
FIG. 12 illustrates a structure example of a semiconductor device.

FIG. 12 illustrates a structure example of a semiconductor device MAC having a function of performing an operation of the neural network. The semiconductor device MAC has a function of performing a product-sum operation of first data corresponding to the strength (weight) of connection between the neurons and second data corresponding to input data. Note that the first data and the second data can each be analog data or multilevel data (discrete data). The semiconductor device MAC also has a function of converting data obtained by the product-sum operation with the activation function.

The semiconductor device MAC includes a cell array CA, a current source circuit CS, a current mirror circuit CM, a circuit WDD, a circuit WLD, a circuit CLD, an offset circuit OFST, and an activation function circuit ACTV.

The cell array CA includes a plurality of memory cells MC and a plurality of memory cells MCref. In the structure example illustrated in FIG. 12, the cell array CA includes the memory cells MC in m rows and n columns (memory cells MC[1, 1] to MC[m, n]) and the m memory cells MCref (memory cells MCref[1] to MCref[m]) (m and n are integers greater than or equal to 1). The memory cells MC have a function of storing the first data. In addition, the memory cells MCref have a function of storing reference data used for the product-sum operation. Note that the reference data can be analog data or multilevel data.

The memory cell MC[i, j] is connected to a wiring WL[i], a wiring RW[i], a wiring WD[j], and a wiring BL[j] (i is an integer greater than or equal to 1 and less than or equal to m, and j is an integer greater than or equal to 1 and less than or equal to n). In addition, the memory cell MCref[i] is connected to the wiring WL[i], the wiring RW[i], a wiring WDref, and a wiring BLref. Here, a current flowing between the memory cell MC[i, j] and the wiring BL[j] is denoted by $I_{MC[i, j]}$, and a current flowing between the memory cell MCref[i] and the wiring BLref is denoted by $I_{MCref[i]}$.

Figure 13:
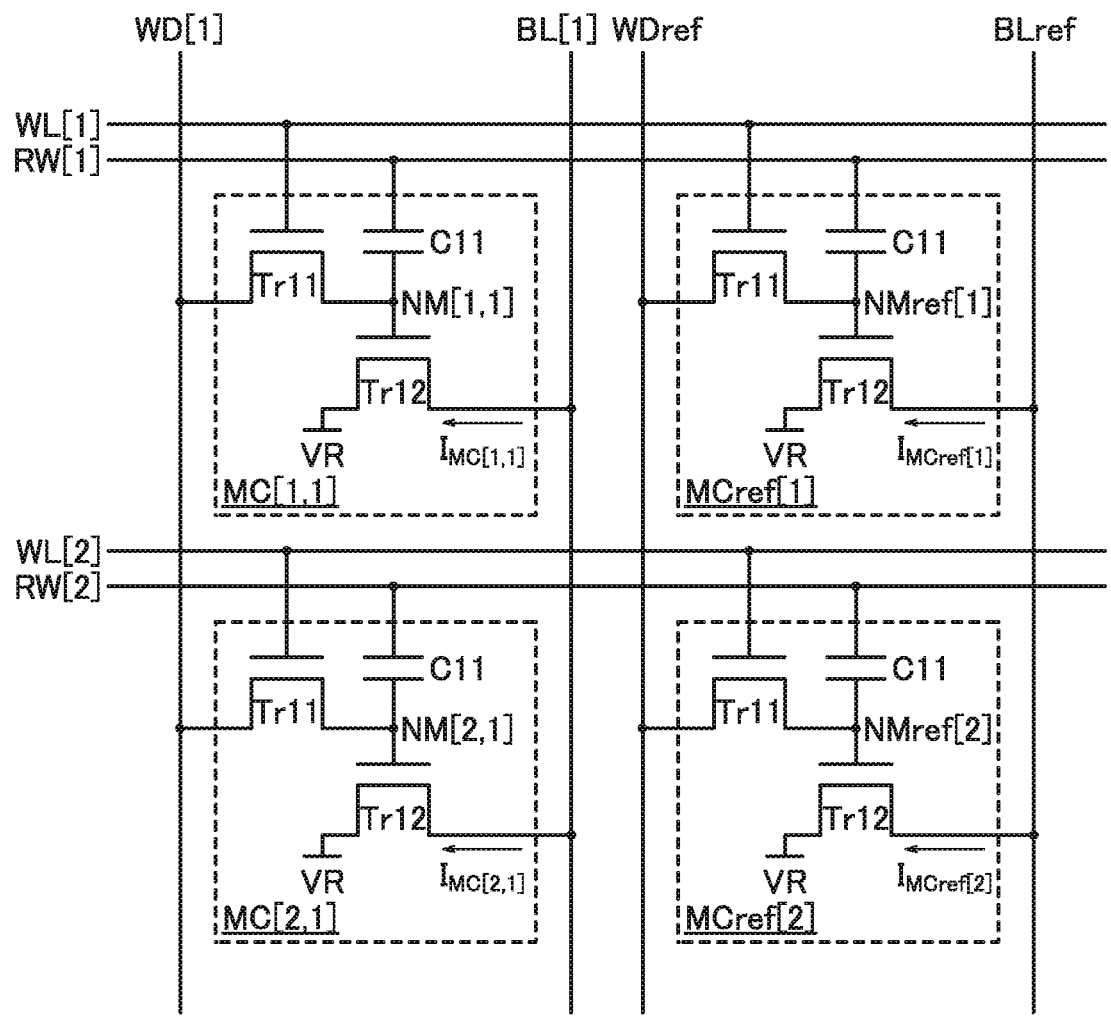
FIG. 13 illustrates a structure example of memory cells.

FIG. 13 illustrates a specific structure example of the memory cell MC and the memory cell MCref. Although the memory cells MC[1, 1] and MC[2, 1] and the memory cells MCref[1] and MCref[2] are given as typical examples in FIG. 13, similar structures can also be used for other memory cells MC and other memory cells MCref. The memory cells MC and the memory cells MCref each include a transistor Tr11, a transistor Tr12, and a capacitor C11. Here, the case where the transistors Tr11 and Tr12 are n-channel transistors is described.

In the memory cell MC, a gate of the transistor Tr11 is connected to the wiring WL, one of a source and a drain of the transistor Tr11 is connected to a gate of the transistor Tr12 and a first electrode of the capacitor C11, and the other of the source and the drain of the transistor Tr11 is connected to the wiring WD. One of a source and a drain of the transistor Tr12 is connected to the wiring BL, and the other of the source and the drain thereof is connected to a wiring VR. A second electrode of the capacitor C11 is connected to the wiring RW. The wiring VR has a function of supplying a predetermined potential. An example in which a low power source potential (e.g., a ground potential) is supplied from the wiring VR is described below.

A node connected to the one of the source and the drain of the transistor Tr11, the gate of the transistor Tr12, and the first electrode of the capacitor C11 is referred to as a node NM. The nodes NM included in the memory cells MC[1, 1] and MC[2, 1] are referred to as nodes NM[1, 1] and NM[2, 1], respectively.

The memory cells MCref have a structure similar to that of the memory cell MC.

However, the memory cells MCref are connected to the wiring WDref instead of the wiring WD and connected to a wiring BLref instead of the wiring BL. Furthermore, a node NMref[1] in the memory cell MCref[1] and a node NMref[2] in the memory cell MCref[2] refer to nodes each of which is connected to the one of the source and the drain of the transistor Tr11, the gate of the transistor Tr12, and the first electrode of the capacitor C11.

The nodes NM and NMref function as holding nodes of the memory cells MC and MCref, respectively. The first data is held in the node NM and the reference data is held in the node NMref. Furthermore, currents $I_{MC[1, 1]}$ and $I_{MC[2, 1]}$ flow from the wiring BL[1] to the transistors Tr12 of the memory cells MC[1, 1] and MC[2, 1], respectively. Currents $I_{MCref[1, 1]}$ and $I_{MCref[2]}$ flow from the wiring BLref to the transistor Tr12 of the memory cells MCref[1] and MCref[2], respectively.

Since the transistor Tr11 has a function of holding a potential of the node NM or the node NMref, the off-state current of the transistor Tr11 is preferably low. Thus, it is preferable to use an OS transistor, which has extremely low off-state current, as the transistor Tr11. This suppresses a change in the potential of the node NM or the node NMref, so that the operation accuracy can be increased. Furthermore, operations of refreshing the potential of the node NM or the node NMref can be performed with less frequency, which leads to a reduction in power consumption.

There is no particular limitation on the transistor Tr12, and for example, a Si transistor, an OS transistor, or the like can be used. In the case where an OS transistor is used as the transistor Tr12, the transistor Tr12 can be manufactured with the same manufacturing apparatus as the transistor Tr11, and accordingly manufacturing cost can be reduced. Note that the transistor Tr12 may be an n-channel transistor or a p-channel transistor.

The current source circuit CS is connected to the wirings BL[1] to BL[n] and the wiring BLref. The current source circuit CS has a function of supplying currents to the wirings BL[1] to BL[n] and the wiring BLref. Note that the value of the current supplied to the wirings BL[1] to BL[n] may be different from that of the current supplied to the wiring BLref. Here, the current supplied from the current source circuit CS to the wirings BL[1] to BL[n] is denoted by $I_C$, and the current supplied from the current source circuit CS to the wiring BLref is denoted by $I_{Cref}$.

The current mirror circuit CM includes wirings IL[1] to IL[n] and a wiring ILref. The wirings IL[1] to IL[n] are connected to the wirings BL[1] to BL[n], respectively, and the wiring ILref is connected to the wiring BLref. Here, a connection portion between the wirings IL[1] and BL[1] to a connection portion between the wirings IL[n] and BL[n] are referred to as nodes NP[1] to NP[n], respectively. Furthermore, a connection portion between the wiring ILref and the wiring BLref is referred to as a node NPref.

The current mirror circuit CM has a function of flowing a current $I_{CM}$ corresponding to the potential of the node NPref to the wiring ILref and a function of flowing this current $I_{CM}$ also to the wirings IL[1] to IL[n]. In the example illustrated in FIG. 12, the current $I_{CM}$ is discharged from the wiring BLref to the wiring ILref, and the current $I_{CM}$ is discharged from the wirings BL[1] to BL[n] to the wirings IL[1] to IL[n]. Furthermore, currents flowing from the current mirror circuits CM to the cell array CA through the wirings BL[1] to BL[n] are denoted by $I_B[1]$ to $I_B[n]$, respectively. Furthermore, a current flowing from the current mirror circuit CM to the cell array CA through the wiring BLref is denoted by $I_{Bref}$.

The circuit WDD is connected to wirings WD[1] to WD[n] and the wiring WDref. The circuit WDD has a function of supplying a potential corresponding to the first data stored in the memory cells MC to the wirings WD[1] to WD[n]. The circuit WDD also has a function of supplying a potential corresponding to the reference data stored in the memory cell MCref to the wiring WDref. The circuit WLD is connected to wirings WL[1] to WL[m]. The circuit WLD has a function of supplying a signal for selecting the memory cell MC or MCref to which data is to be written to any of the wirings WL[1] to WL[m]. The circuit CLD is connected to the wirings RW[1] to RW[m]. The circuit CLD has a function of supplying a potential corresponding to the second data to the wirings RW[1] to RW[m].

The offset circuit OFST is connected to the wirings BL[1] to BL[n] and wirings OL[1] to [n]. The offset circuit OFST has a function of detecting the amount of currents flowing from the wirings BL[1] to BL[n] to the offset circuit OFST and/or the amount of a change in the currents flowing from the wirings BL[1] to BL[n] to the offset circuit OFST. The offset circuit OFST also has a function of outputting a detection result to the wirings OL[1] to OL[n]. Note that the offset circuit OFST may output a current corresponding to the detection result to the wiring OL, or may convert the current corresponding to the detection result into a voltage to output the voltage to the wiring OL. The currents flowing between the cell array CA and the offset circuit OFST are denoted by $I_\alpha[1]$ to $I_\alpha[n]$.

Figure 14:
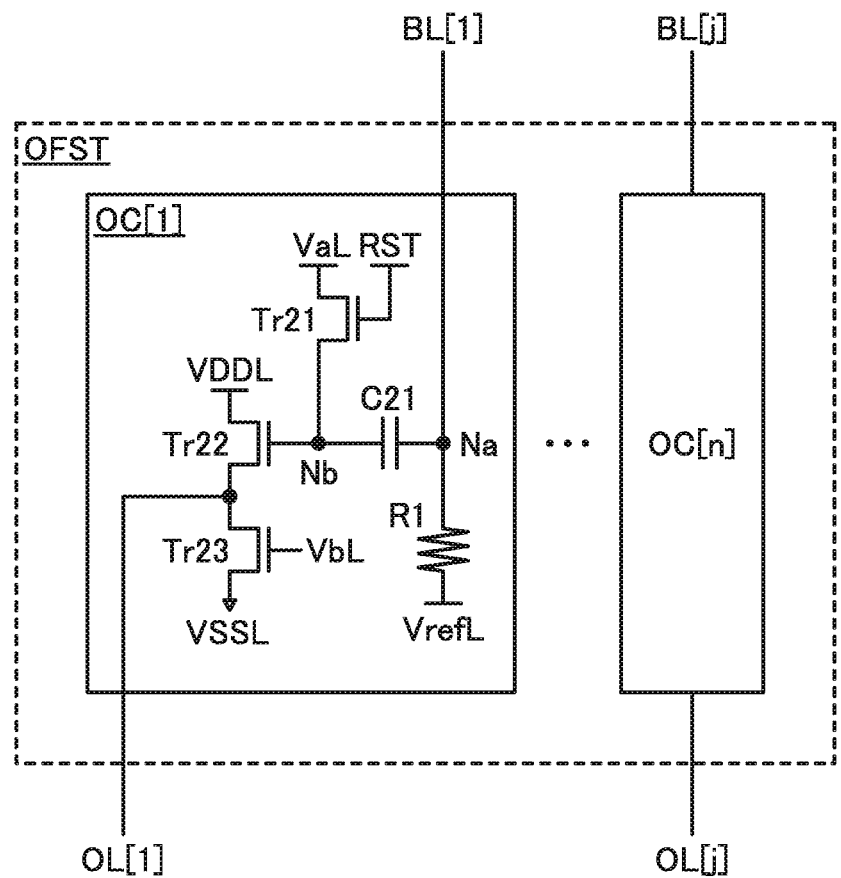
FIG. 14 illustrates a structure example of an offset circuit.

FIG. 14 illustrates a structure example of the offset circuit OFST. The offset circuit OFST illustrated in FIG. 14 includes circuits OC[1] to OC[n]. Furthermore, the circuits OC[1] to OC[n] each include a transistor Tr21, a transistor Tr22, a transistor Tr23, a capacitor C21, and a resistor R1. Connection relations of the elements are as illustrated in FIG. 14. Note that a node connected to a first electrode of the capacitor C21 and a first terminal of the resistor R1 is referred to as a node Na. In addition, a node connected to a second electrode of the capacitor C21, one of a source and a drain of the transistor Tr21, and a gate of the transistor Tr22 is referred to as a node Nb.

A wiring VrefL has a function of supplying a potential Vref, a wiring VaL has a function of supplying a potential Va, and a wiring VbL has a function of supplying a potential Vb. Furthermore, a wiring VDDL has a function of supplying a potential VDD, and a wiring VSSL has a function of supplying a potential VSS. Here, the case where the potential VDD is a high power supply potential and the potential VSS is a low power supply potential is described. Furthermore, a wiring RST has a function of supplying a potential for controlling the conduction state of the transistor Tr21. The transistor Tr22, the transistor Tr23, the wiring VDDL, the wiring VSSL, and the wiring VbL form a source follower circuit.

Next, an operation example of the circuits OC[1] to OC[n] is described. Note that although an operation example of the circuit OC[1] is described here as a typical example, the circuits OC[2] to OC[n] can be operated in a manner similar to that of the circuit OC[1]. First, when a first current flows to the wiring BL[1], the potential of the node Na becomes a potential corresponding to the first current and the resistance value of the resistor R1. At this time, the transistor Tr21 is turned on, and thus the potential Va is supplied to the node Nb. Then, the transistor Tr21 is turned off.

Next, when a second current flows to the wiring BL[1], the potential of the node Na becomes a potential corresponding to the second current and the resistance value of the resistor R1. At this time, since the transistor Tr21 is in an off state and the node Nb is in a floating state, the potential of the node Nb is changed owing to capacitive coupling, following the change in the potential of the node Na. Here, when the amount of change in the potential of the node Na is $\Delta V_{Na}$ and the capacitive coupling coefficient is 1, the potential of the node Nb is $Va+\Delta V_{Na}$. In addition, when the threshold voltage of the transistor Tr22 is $V_{th}$, a potential of $Va+\Delta V_{Na}-V_{th}$ is output from the wiring OL[1]. Here, when $Va=V_{th}$, the potential $\Delta V_{Na}$ can be output from the wiring OL[1].

The potential $\Delta V_{Na}$ is determined by the amount of change from the first current to the second current, the resistor R1, and the potential Vref. Here, since the resistor R1 and the potential Vref are known, the amount of change in the current flowing to the wiring BL can be found from the potential $\Delta V_{Na}$.

A signal corresponding to the amount of current and/or the amount of change in the current detected by the offset circuit OFST as described above is input to the activation function circuit ACTV through the wirings OL[1] to [n].

The activation function circuit ACTV is connected to the wirings OL[1] to [n] and wirings NIL[1] to [n]. The activation function circuit ACTV has a function of performing an operation for converting the signal input from the offset circuit OFST in accordance with the activation function defined in advance. As the activation function, for example, a sigmoid function, a tan h function, a softmax function, a ReLU function, a threshold function, or the like can be used. The signal converted by the activation function circuit ACTV is output as output data to the wirings NIL[1] to [n].

Operation Example of Semiconductor Device

With the above semiconductor device MAC, the product-sum operation of the first data and the second data can be performed. An operation example of the semiconductor device MAC at the time of performing the product-sum operation is described below.

Figure 15:
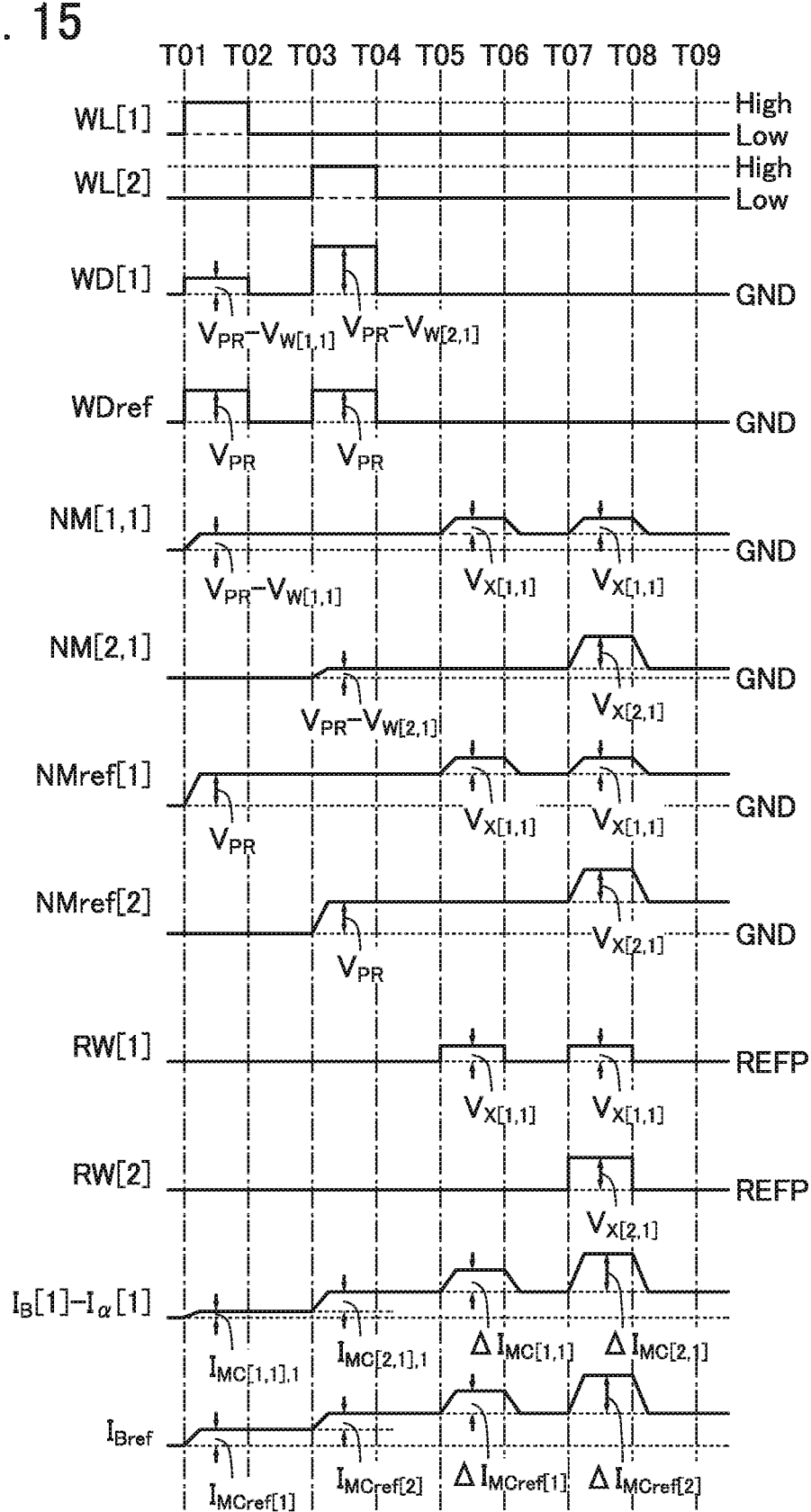
FIG. 15 is a timing chart.

FIG. 15 is a timing chart showing the operation example of the semiconductor device MAC. FIG. 15 shows changes in the potentials of the wirings WL[1], WL[2], WD[1], and WDref, the nodes NM[1, 1], NM[2, 1], NMref[1], and NMref[2], and the wirings RW[1] and RW[2] in FIG. 13 and changes in the values of the currents $I_B[1]$ to $I_\alpha[1]$ and $I_{Bref}$. The currents $I_B[1]$ to $I_\alpha[1]$ correspond to a total of the currents flowing from the wiring BL[1] to the memory cells MC[1, 1] and MC[2, 1].

Although an operation is described with a focus on the memory cells MC[1, 1], MC[2, 1], MCref[1], and MCref[2] illustrated in FIG. 13 as typical examples, the other memory cells MC and MCref can also be operated in a similar manner.

(Storage of First Data)

First, during a period from Time T01 to Time T02, the potential of the wiring WL[1] becomes a high level, the potential of the wiring WD[1] becomes a potential greater than a ground potential (GND) by $V_{PR}-V_{W[1, 1]}$, and the potential of the wiring WDref becomes a potential greater than the ground potential by $V_{PR}$. Furthermore, the potentials of the wirings RW[1] and RW[2] are reference potentials (REFP). Note that the potential $V_{W[1, 1]}$ is the potential corresponding to the first data stored in the memory cell MC[1, 1]. In addition, the potential $V_{PR}$ is the potential corresponding to the reference data. Thus, the transistors Tr11 included in the memory cells MC[1, 1] and MCref[1] are turned on, and the potentials of the nodes NM[1, 1] and NMref[1] become $V_{PR}-V_{W[1, 1]}$ and $V_{PR}$, respectively.

In this case, a current $I_{MC[1, 1], 0}$ flowing from the wiring BL[1] to the transistor Tr12 in the memory cell MC[1, 1] can be expressed by a formula shown below. Here, k is a constant determined by the channel length, the channel width, the mobility, the capacitance of a gate insulating film, and the like of the transistor Tr12. Furthermore, $V_{th}$ is a threshold voltage of the transistor Tr12.

$$I_{MC[1,1],0}=k(V_{PR}-V_{W[1,1]}-V_{th})^2 \qquad (E1)$$

Furthermore, a current $I_{MCref[1], 0}$ flowing from the wiring BLref to the transistor Tr12 in the memory cell MCref[1] can be expressed by a formula shown below.

$$I_{MCref[1],0}=k(V_{PR}-V_{th})^2 \qquad (E2)$$

Next, during a period from Time T02 to Time T03, the potential of the wiring WL[1] becomes a low level. Consequently, the transistors Tr11 included in the memory cells MC[1, 1] and MCref[1] are turned off, and the potentials of the nodes NM[1, 1] and NMref[1] are held.

As described above, an OS transistor is preferably used as the transistor Tr11. This can suppress the leakage current of the transistor Tr11, so that the potentials of the nodes NM[1, 1] and NMref[1] can be accurately held.

Next, during a period from Time T03 to Time T04, the potential of the wiring WL[2] becomes the high level, the potential of the wiring WD[1] becomes a potential greater than the ground potential by $V_{PR}-V_{W[2, 1]}$, and the potential of the wiring WDref becomes a potential greater than the ground potential by $V_{PR}$. Note that the potential $V_{W[2, 1]}$ is a potential corresponding to the first data stored in the memory cell MC[2, 1]. Thus, the transistors Tr11 included in the memory cells MC[2, 1] and MCref[2] are turned on, and the potentials of the nodes NM[2, 1] and NMref[2] become $V_{PR}-V_{W[2, 1]}$ and $V_{PR}$, respectively.

Here, a current $I_{MC[2, 1], 0}$ flowing from the wiring BL[1] to the transistor Tr12 in the memory cell MC[2, 1] can be expressed by a formula shown below.

$$I_{MC[2,1],0}=k(V_{PR}-V_{W[2,1]}-V_{th})^2 \quad (E3)$$

Furthermore, a current $I_{MCref[2], 0}$ flowing from the wiring BLref to the transistor Tr12 in the memory cell MCref[2] can be expressed by a formula shown below.

$$I_{MCref[2],0}=k(V_{PR}-V_{th})^2 \quad (E4)$$

Next, during a period from Time T04 to Time T05, the potential of the wiring WL[2] becomes the low level. Consequently, the transistors Tr11 included in the memory cells MC[2, 1] and MCref[2] are turned off, and the potentials of the nodes NM[2, 1] and NMref[2] are held.

Through the above operation, the first data is stored in the memory cells MC[1, 1] and MC[2, 1], and the reference data is stored in the memory cells MCref[1] and MCref[2].

Here, currents flowing to the wirings BL[1] and BLref during the period from Time T04 to Time T05 are considered. The current is supplied from the current source circuit CS to the wiring BLref. The current flowing through the wiring BLref is also discharged to the current mirror circuit CM and the memory cells MCref[1] and MCref[2]. A formula shown below holds where $I_{Cref}$ is the current supplied from the current source circuit CS to the wiring BLref and $I_{CM, 0}$ is the current discharged from the wiring BLref to the current mirror circuit CM.

$$I_{Cref}-I_{CM,0}=I_{MCref[1],0}+I_{MCref[2],0} \quad (E5)$$

The current from the current source circuit CS is supplied to the wiring BL[1]. The current flowing through the wiring BL[1] is also discharged to the current mirror circuit CM and the memory cells MC[1, 1] and MC[2, 1]. Furthermore, the current flows from the wiring BL[1] to the offset circuit OFST. A formula shown below holds where $I_{C, 0}$ is the current supplied from the current source circuit CS to the wiring BL[1] and $I_{\alpha, 0}$ is the current flowing from the wiring BL[1] to the offset circuit OFST.

$$I_C-I_{CM,0}=I_{MC[1,1],0}+I_{MC[2,1],0}+I_{\alpha,0} \quad (E6)$$

(Product-Sum Operation of First Data and Second Data)

Next, during a period from Time T05 to Time T06, the potential of the wiring RW[1] becomes a potential greater than the reference potential by $V_{X[1]}$. At this time, the potential $V_{X[1]}$ is supplied to the capacitors C11 in the memory cells MC[1, 1] and MCref[1], so that the potentials of the gates of the transistors Tr12 increase owing to capacitive coupling. Note that the potential $V_{X[1]}$ is the potential corresponding to the second data supplied to the memory cells MC[1, 1] and MCref[1].

The amount of change in the potential of the gate of the transistor Tr12 corresponds to the value obtained by multiplying the amount of change in the potential of the wiring RW by a capacitive coupling coefficient determined by the memory cell structure. The capacitive coupling coefficient is calculated on the basis of the capacitance of the capacitor C11, the gate capacitance of the transistor Tr12, the parasitic capacitance, and the like. In the following description, for convenience, the amount of change in the potential of the wiring RW is equal to the amount of change in the potential of the gate of the transistor Tr12, that is, the capacitive coupling coefficient is set to 1. In practice, the potential Vx can be determined in consideration of the capacitive coupling coefficient.

When the potential $V_{X[1]}$ is supplied to the capacitors C11 in the memory cell MC[1, 1] and the memory cell MCref[1], the potentials of the node NN[1, 1] and the node NMref[1] each increase by $V_{X[1]}$.

Here, a current $I_{MC[1, 1], 1}$ flowing from the wiring BL[1] to the transistor Tr12 in the memory cell MC[1, 1] during the period from Time T05 to Time T06 can be expressed by a formula shown below.

$$I_{MC[1,1],1}=k(V_{PR}-V_{W[1,1]}+V_{X[1]}-V_{th})^2 \quad (E7)$$

Thus, when the potential $V_{X[1]}$ is supplied to the wiring RW[1], the current flowing from the wiring BL[1] to the transistor Tr12 in the memory cell MC[1, 1] increases by $\Delta I_{MC[1, 1]}=I_{MC[1, 1], 1}-I_{MC[1, 1], 0}$.

Here, a current $I_{MCref[1], 1}$ flowing from the wiring BLref to the transistor Tr12 in the memory cell MCref[1] during the period from Time T05 to Time T06 can be expressed by a formula shown below.

$$I_{MCref[1],1}=k(V_{PR}-V_{X[1]}-V_{th})^2 \quad (E8)$$

Thus, when the potential $V_{X[1]}$ is supplied to the wiring RW[1], the current flowing from the wiring BLref to the transistor Tr12 in the memory cell MCref[1] increases by $\Delta I_{MCref[1]}=I_{MCref[1], 1}-I_{MCref[1], 0}$.

Furthermore, currents flowing to the wirings BL[1] and BLref are considered. A current $I_{Cref}$ is supplied from the current source circuit CS to the wiring BLref. The current flowing through the wiring BLref is also discharged to the current mirror circuit CM and the memory cells MCref[1] and MCref[2]. A formula shown below holds where $I_{CM, 1}$ is the current discharged from the wiring BLref to the current mirror circuit CM.

$$I_{Cref}-I_{CM,1}=I_{MCref[1],1}+I_{MCref[2],0} \quad (E9)$$

The current $I_C$ from the current source circuit CS is supplied to the wiring BL[1]. The current flowing through the wiring BL[1] is also discharged to the current mirror circuit CM and the memory cells MC[1, 1] and MC[2, 1]. Furthermore, the current flows from the wiring BL[1] to the offset circuit OFST. A formula shown below holds where $I_{\alpha,1}$ is the current flowing from the wiring BL[1] to the offset circuit OFST.

$$I_C-I_{CM,1}=I_{MC[1,1],1}+I_{MC[2,1],1}+I_{\alpha,1} \quad (E10)$$

In addition, from Formulae (E1) to (E10), a difference between the current $I_{\alpha, 0}$ and the current $I_{\alpha, 1}$ (differential current $\Delta I_\alpha$) can be expressed by a formula shown below.

$$\Delta I_\alpha=I_{\alpha,1}-I_{\alpha,0}=2k\,V_{W[1,1]}V_{X[1]} \quad (E11)$$

Thus, the differential current $\Delta I_\alpha$ is a value corresponding to the product of the potentials $V_{W[1, 1]}$ and $V_{X[1]}$.

After that, during a period from Time T06 to Time T07, the potential of the wiring RW[1] becomes the ground potential, and the potentials of the nodes NM[1, 1] and NMref[1] become similar to the potentials thereof during the period from Time T04 to Time T05.

Next, during a period from Time T07 to Time T08, the potential of the wiring RW[1] becomes the potential greater than the reference potential by $V_{X[1]}$, and the potential of the wiring RW[2] becomes a potential greater than the reference potential by $V_{X[2]}$. Accordingly, the potential Vx[i] is supplied to the capacitors C11 in the memory cell MC[1, 1] and the memory cell MCref[1], and the potentials of the node NM[1, 1] and the node NMref[1] each increase by $V_{X[1]}$ due to capacitive coupling. Furthermore, the potential $V_{X[2]}$ is supplied to the capacitors C11 in the memory cell MC[2, 1] and the memory cell MCref[2], and the potentials of the node NM[2, 1] and the node NMref[2] each increase by $V_{X[2]}$ due to capacitive coupling.

Here, the current $I_{MC[2, 1], 1}$ flowing from the wiring BL[1] to the transistor Tr12 in the memory cell MC[2, 1] during the period from Time T07 to Time T08 can be expressed by a formula shown below.

$$I_{MC[2,1],1} = k(V_{PR} - V_{W[2,1]} + V_{X[2]} - V_{th})^2 \quad (E12)$$

Thus, when the potential $V_{X[2]}$ is supplied to the wiring RW[2], the current flowing from the wiring BL[1] to the transistor Tr12 in the memory cell MC[2, 1] increases by $\Delta I_{MC[2, 1]} = I_{MC[2, 1], 1} - I_{MC[2, 1], 0}$.

Here, a current $I_{MCref[2], 1}$ flowing from the wiring BLref to the transistor Tr12 in the memory cell MCref[2] during the period from Time T05 to Time T06 can be expressed by a formula shown below.

$$I_{MCref[2],1} = k(V_{PR} + V_{X[2]} - V_{th})^2 \quad (E13)$$

Thus, when the potential $V_{X[2]}$ is supplied to the wiring RW[2], the current flowing from the wiring BLref to the transistor Tr12 in the memory cell MCref[2] increases by $\Delta I_{MCref[2]} = I_{MCref[2], 1} - I_{MCref[2], 0}$.

Furthermore, currents flowing to the wirings BL[1] and BLref are considered. The current $I_{Cref}$ is supplied from the current source circuit CS to the wiring BLref. The current flowing through the wiring BLref is also discharged to the current mirror circuit CM and the memory cells MCref[1] and MCref[2]. A formula shown below holds where $I_{CM, 2}$ is the current discharged from the wiring BLref to the current mirror circuit CM.

$$I_{Cref} - I_{CM,2} = I_{MCref[1],1} + I_{MCref[2],1} \quad (E14)$$

The current $I_C$ from the current source circuit CS is supplied to the wiring BL[1]. The current flowing through the wiring BL[1] is also discharged to the current mirror circuit CM and the memory cells MC[1, 1] and MC[2, 1]. Furthermore, the current flows from the wiring BL[1] to the offset circuit OFST. A formula shown below holds where $I_{\alpha, 2}$ is the current flowing from the wiring BL[1] to the offset circuit OFST.

$$I_C - I_{CM,2} = I_{MC[1,1],1} + I_{MC[2,1],1} + I_{\alpha,2} \quad (E15)$$

In addition, from Formulae (E1) to (E8) and (E12) to (E15), a difference between the current $I_{\alpha, 0}$ and the current $I_{\alpha, 2}$ (differential current $\Delta I_\alpha$) can be expressed by a formula shown below.

$$\Delta I_\alpha = I_{\alpha,2} - I_{\alpha,0} = 2k(V_{W[1,1]} V_{X[1]} + V_{W[2,1]} V_{X[2]}) \quad (E16)$$

Thus, the differential current $\Delta I_\alpha$ is a value corresponding to a result of the sum of the product of the potentials $V_{W[1, 1]}$ and $V_{X[1]}$ and the product of the potentials $V_{W[2, 1]}$ and $V_{X[2]}$.

After that, during a period from Time T08 to Time T09, the potentials of the wirings RW[1] and RW[2] become the ground potential, and the potentials of the nodes NM[1, 1], NM[2, 1], NMref[1], and NMref[2] become similar to the potentials thereof during the period from Time T04 to Time T05.

As represented by Formulae (E9) and (E16), the differential current $\Delta I_\alpha$ input to the offset circuit OFST is a value corresponding to a result of the sum of the products of the potentials Vx corresponding to the first data (weight) and the potentials Vw corresponding to the second data (input data). Thus, measurement of the differential current $\Delta I_\alpha$ with the offset circuit OFST gives the result of the product-sum operation of the first data and the second data.

Note that although the memory cells MC[1, 1], MC[2, 1], MCref[1], and MCref[2] are focused in the above description, the number of the memory cells MC and MCref can be any number. The differential current $\Delta I_\alpha$ can be expressed by a formula shown below where the number m of rows of the memory cells MC and MCref is any number.

$$\Delta I_\alpha = 2k \Sigma_i V_{W[i,1]} V_{X[i]} \quad (E17)$$

Furthermore, when the number n of columns of the memory cells MC and MCref is increased, the number of product-sum operations executed in parallel can be increased.

The product-sum operation of the first data and the second data can be performed using the semiconductor device MAC as described above. Note that the use of the structure of the memory cells MC and MCref in FIG. 13 allows the product-sum arithmetic circuit to be formed of fewer transistors. Accordingly, the circuit scale of the semiconductor device MAC can be reduced.

In the case where the semiconductor device MAC is used for the operation in the neural network, the number m of rows of the memory cells MC can correspond to the number of pieces of input data supplied to one neuron and the number n of columns of the memory cells MC can correspond to the number of neurons. For example, the case where a product-sum operation using the semiconductor device MAC is performed in the middle layer HL in FIG. 11A is considered. In this case, the number m of rows of the memory cells MC can be set to the number of pieces of input data supplied from the input layer IL (the number of neurons in the input layer IL), and the number n of columns of the memory cells MC can be set to the number of neurons in the middle layer HL.

Note that there is no particular limitation on the structure of the neural network for which the semiconductor device MAC is used. For example, the semiconductor device MAC can also be used for a convolutional neural network (CNN), a recurrent neural network (RNN), an autoencoder, a Boltzmann machine (including a restricted Boltzmann machine), or the like.

The product-sum operation of the neural network can be performed using the semiconductor device MAC as described above. Furthermore, the memory cells MC and MCref illustrated in FIG. 13 are used for the cell array CA, which can provide an integrated circuit with improved operation accuracy, lower power consumption, or a reduced circuit scale.

At least part of this embodiment can be implemented in combination with any of the other embodiments described in this specification as appropriate.

Embodiment 3

In this embodiment, structure examples of pixels that can be used for the display panels described in the above embodiment are described.

Figure 16A:
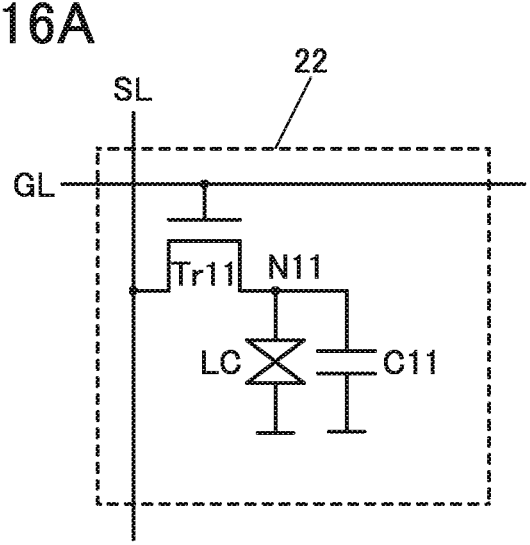
FIGS. 16A and 16B each illustrate a structure example of a pixel.
Figure 16B:
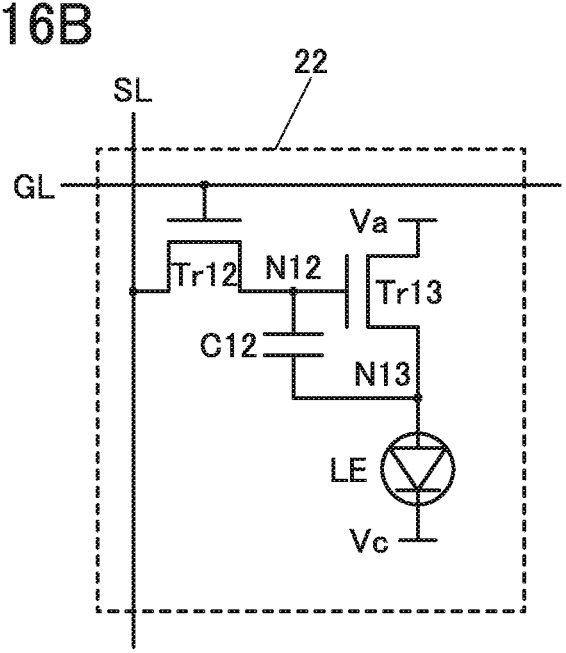

Various display elements can be provided in the pixels 22 illustrated in FIG. 2B. FIGS. 16A and 16B illustrate structure examples of pixels including a liquid crystal element and a light-emitting element as the display elements.

FIG. 16A illustrates a structure example of a pixel using a liquid crystal element. The pixel 22 in FIG. 16A includes the transistor Tr11, the capacitor C11, and the liquid crystal element LC. Although the transistor Tr11 is an n-channel transistor here, the polarity of the transistor can be changed as appropriate.

The gate of the transistor Tr11 is connected to the wiring GL, one of a source and a drain is connected to one electrode of the liquid crystal element LC and one electrode of the capacitor C11, and the other of the source and the drain is connected to the wiring SL. The other electrode of the liquid crystal element LC and the other electrode of the capacitor C11 are each connected to a wiring to which a predetermined potential is supplied. Anode which is connected to the one of the source and the drain of the transistor Tr11, the one electrode of the liquid crystal element LC, and the one electrode of the capacitor C11 is the node N11.

Note that a source of a transistor in this specification and the like means a source region that is part of a semiconductor layer functioning as a channel formation region, a source electrode connected to the semiconductor layer, or the like. Similarly, a "drain" of a transistor means a drain region that is part of the semiconductor layer, a drain electrode connected to the semiconductor layer, or the like. A gate means a gate electrode or the like.

The terms "source" and "drain" of a transistor interchange with each other depending on the conductivity type of the transistor or levels of potentials applied to the terminals. In general, in an n-channel transistor, a terminal to which a lower potential is applied is referred to as a source, and a terminal to which a higher potential is applied is referred to as a drain. In a p-channel transistor, a terminal to which a lower potential is applied is referred to as a drain, and a terminal to which a higher potential is applied is referred to as a source. In this specification, although the connection relation of the transistor is described assuming that the source and the drain are fixed in some cases for convenience, actually, the source and the drain interchange with each other depending on the relation of the potentials.

The potential of the other electrode of the liquid crystal element LC may be a common potential among the plurality of pixels 22 or may be the same potential as the other electrode of the capacitor C11. The potential of the other electrode of the liquid crystal element LC may differ between the pixels 22. The capacitor C11 has a function of a storage capacitor for holding a potential of the node N11.

The transistor Tr11 has a function of controlling the supply of a potential of the wiring SL to the node N11. Specifically, the potential of the wiring GL is controlled to turn on the transistor Tr11, whereby the potential of the wiring SL (corresponding to the video signal) is supplied to the node N11 and is written to the pixel 22. Then, the potential of the wiring GL is controlled to turn off the transistor Tr11, whereby the potential of the node N11 is held.

The liquid crystal element LC includes a pair of electrodes and a liquid crystal layer containing a liquid crystal material to which the voltage between the pair of electrodes is applied. The alignment of the liquid crystal molecules included in the liquid crystal element LC changes in accordance with the value of the voltage applied between the pair of electrodes, and thus the transmittance of the liquid crystal layer is changed. Therefore, controlling the potential supplied from the wiring SL to the node N11 allows the gradations of the pixel 22 to be controlled.

FIG. 16B illustrates a structure example of the pixel 22 including a light-emitting element. The pixel 22 in FIG. 16B includes the transistor Tr12, a transistor Tr13, a capacitor C12, and a light-emitting element LE. Although the transistors Tr12 and Tr13 are n-channel transistors here, the polarities of the transistors can be changed as appropriate.

The gate of the transistor Tr12 is connected to the wiring GL, one of the source and the drain is connected to a gate of the transistor Tr13 and one electrode of the capacitor C12, and the other of the source and the drain is connected to a wiring SL. One of a source and a drain of the transistor Tr13 is connected to the other electrode of the capacitor C12 and one electrode of the light-emitting element LE, and the other of the source and the drain is connected to a wiring to which the potential Va is supplied. The other electrode of the light-emitting element LE is connected to a wiring to which a potential Vc is supplied. A node which is connected to the one of the source and the drain of the transistor Tr12, the gate of the transistor Tr13, and the one electrode of the capacitor C12 is referred to as a node N12. A node which is connected to the one of the source and the drain of the transistor Tr13 and the other electrode of the capacitor C12 is referred to as a node N13.

Here, the case where the potential Va is a high power supply potential and the potential Vc is a low power supply potential is described. The capacitor C11 functions as a storage capacitor for retaining the potential of the node N12.

The transistor Tr12 has a function of controlling supply of the potential of the wiring SL to the node N12. Specifically, the potential of the wiring GL is controlled to turn on the transistor Tr12, whereby the potential of the wiring SL (corresponding to the video signal) is supplied to the node N12 and is written to the pixel 22. Then, the potential of the wiring GL is controlled to turn off the transistor Tr12, whereby the potential of the node N12 is retained.

The amount of current flowing between the source and the drain of the transistor Tr13 is controlled in accordance with the voltage between the nodes N12 and N13. The light-emitting element LE emits light with a luminance corresponding to the amount of flowing current. Accordingly, the gradations of the pixel 22 can be controlled. Note that the transistor Tr13 preferably operates in a saturation region.

The above-described operation is performed for the wirings GL one by one, whereby an image for a first frame can be displayed.

The selection of any of the wirings GL may be performed by either a progressive method or an interlace method. The supply of the video signals to the wirings SL may be performed by dot sequential driving in which video signals are sequentially supplied to the wirings SL, or line sequential driving in which video signals are concurrently supplied to the wirings SL. Alternatively, supply of video signals may be performed for every set of wirings SL.

Next, in a second frame period, a picture is displayed by an operation similar to that of a first frame period. Thus, the picture displayed on the pixel portion 21 is rewritten.

As the semiconductor of the transistors included in the pixels 22, a Group 14 element (e.g., silicon or germanium), a compound semiconductor such as gallium arsenide, an organic semiconductor, a metal oxide, or the like can be used. Alternatively, the semiconductor may be a non-single-crystal semiconductor (e.g., amorphous semiconductor, microcrystalline semiconductor, or polycrystalline semiconductor) or a single crystal semiconductor.

For example, as the transistors included in the pixels 22, transistors including an amorphous semiconductor, in particular, hydrogenated amorphous silicon (a-Si:H) in channel formation regions can be used. A transistor including an amorphous semiconductor can be easily adapted for an incased in the area of a substrate, which can simplify the manufacturing process.

As the transistors included in the pixels 22, transistors including a metal oxide in channel formation regions, that is, OS transistors can also be used. Because OS transistors have an extremely low off-state current, in the case where OS transistors are used as the transistors Tr11 or Tr12, video signals can be held in the pixels 22 for a significantly long period. This enables the update frequency of a video signal to be extremely low in a period when there is no change in the picture displayed on the pixel portion 21 or a period when the change is at a certain level or lower. The update frequency of the video signal can be, for example, less than or equal to once every 0.1 seconds, less than or equal to once every second, or less than or equal to once every 10 seconds. Furthermore, the update frequency of the video signal can be set for each display panel DP.

At least part of this embodiment can be implemented in combination with any of the other embodiments described in this specification as appropriate.

Embodiment 4

In this embodiment, examples of a display device that can be used for the display system illustrated as an example in the above embodiment are described.

Structure Examples

Figure 17A:
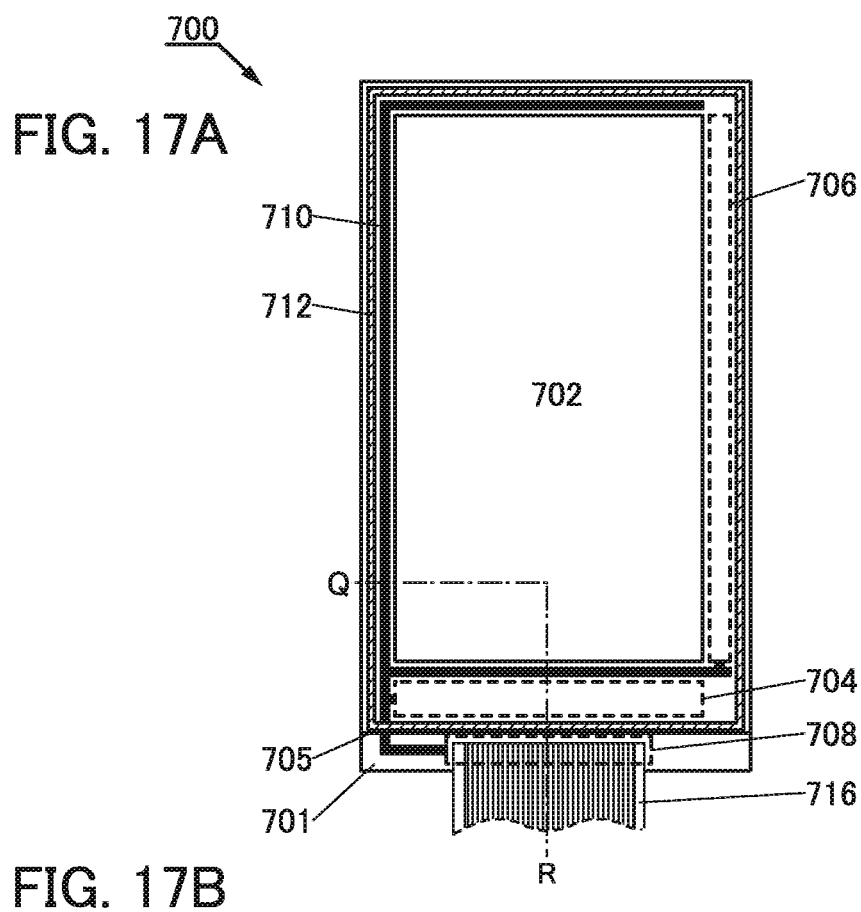
FIGS. 17A and 17B illustrate a structure example of a display device.

FIG. 17A is a top view of an example of a display device. A display device 700 in FIG. 17A includes a pixel portion 702 provided over a first substrate 701, a source driver circuit portion 704 and a gate driver circuit portion 706 that are provided over the first substrate 701, a sealant 712 provided to surround the pixel portion 702, the source driver circuit portion 704, and the gate driver circuit portion 706, and a second substrate 705 provided to face the first substrate 701. Note that the first substrate 701 and the second substrate 705 are sealed with the sealant 712. That is, the pixel portion 702, the source driver circuit portion 704, and the gate driver circuit portion 706 are sealed with the first substrate 701, the sealant 712, and the second substrate 705. Although not illustrated in FIG. 17A, a display element is provided between the first substrate 701 and the second substrate 705.

In the display device 700, a flexible printed circuit (FPC) terminal portion 708 electrically connected to the pixel portion 702, the source driver circuit portion 704, and the gate driver circuit portion 706 is provided in a region different from the region which is surrounded by the sealant 712 and positioned over the first substrate 701. Furthermore, an FPC 716 is connected to the FPC terminal portion 708, and a variety of signals and the like are supplied to the pixel portion 702, the source driver circuit portion 704, and the gate driver circuit portion 706 through the FPC 716. Furthermore, a signal line 710 is connected to the pixel portion 702, the source driver circuit portion 704, the gate driver circuit portion 706, and the FPC terminal portion 708. The variety of signals and the like from the FPC 716 are applied to the pixel portion 702, the source driver circuit portion 704, the gate driver circuit portion 706, and the FPC terminal portion 708 via the signal line 710.

A plurality of gate driver circuit portions 706 may be provided in the display device 700. An example of the display device 700 in which the source driver circuit portion 704 and the gate driver circuit portion 706 are formed over the first substrate 701 where the pixel portion 702 is also formed is described; however, the structure is not limited thereto. For example, only the gate driver circuit portion 706 may be formed over the first substrate 701 or only the source driver circuit portion 704 may be formed over the first substrate 701. In this case, a substrate over which a source driver circuit, a gate driver circuit, or the like is formed (e.g., a driver circuit board formed using a single-crystal semiconductor film or a polycrystalline semiconductor film) may be formed on the first substrate 701. Note that there is no particular limitation on the method of connecting a separately prepared driver circuit substrate, and a chip on glass (COG) method, a wire bonding method, or the like can be used.

The display device 700 can include any of a variety of elements. As examples of the elements, electroluminescent (EL) element (e.g., an EL element containing organic and inorganic materials, an organic EL element, an inorganic EL element, or an LED), a light-emitting transistor element (a transistor which emits light depending on current), an electron emitter, a liquid crystal element, an electronic ink display, an electrophoretic element, an electrowetting element, a plasma display panel (PDP), micro electro mechanical systems (MEMS) display (e.g., a grating light valve (GLV), a digital micromirror device (DMD), a digital micro shutter (DMS) element, or an interferometric modulator display (IMOD) element), and a piezoelectric ceramic display can be given.

An example of a display device including an EL element is an EL display. Examples of display devices including electron emitters are a field emission display (FED) and an SED-type flat panel display (SED: surface-conduction electron-emitter display). Examples of display devices including liquid crystal elements include a liquid crystal display (e.g., a transmissive liquid crystal display, a transflective liquid crystal display, a reflective liquid crystal display, a direct-view liquid crystal display, or a projection liquid crystal display). Display devices having electronic ink or electrophoretic elements include electronic paper and the like. In the case of a transflective liquid crystal display or a reflective liquid crystal display, some of or all of pixel electrodes function as reflective electrodes. For example, some or all of pixel electrodes are formed to contain aluminum, silver, or the like. In such a case, a memory circuit such as an SRAM can be provided under the reflective electrodes. Thus, the power consumption can be further reduced.

As a display method in the display device 700, a progressive method, an interlace method, or the like can be employed. Furthermore, color elements controlled in a pixel at the time of color display are not limited to three colors: R, G, and B (R, G, and B correspond to red, green, and blue, respectively). For example, four pixels of the R pixel, the G pixel, the B pixel, and a W (white) pixel may be included. Alternatively, a color element may be composed of two colors among R, G, and B as in PenTile layout. The two colors may differ among color elements. Alternatively, one or more colors of yellow, cyan, magenta, and the like may be added to RGB. Furthermore, the size of a display region may be different depending on respective dots of the color components. Embodiments of the disclosed invention are not limited to a display device for color display; the disclosed invention can also be applied to a display device for monochrome display.

A coloring layer (also referred to as a color filter) may be used to obtain a full-color display device in which white light (W) is used for a backlight (e.g., an organic EL element, an inorganic EL element, an LED, or a fluorescent lamp). As the coloring layer, red (R), green (G), blue B, yellow (Y), or the like may be combined as appropriate, for example. With use of the coloring layer, higher color reproducibility can be obtained than in the case without the coloring layer. In this case, by providing a region with the coloring layer and a region without the coloring layer, white light in the region without the coloring layer may be directly utilized for display. By partly providing the region without the coloring layer, a decrease in luminance due to the coloring layer can be suppressed, and 20% to 30% of power consumption can be reduced in some cases when an image is displayed brightly. Note that in the case where full-color display is performed using a self-luminous element such as an organic EL element or an inorganic EL element, elements may emit light of their respective colors R, G, B, Y, and W. By using a self-luminous element, power consumption can be further reduced as compared to the case of using the coloring layer in some cases.

As a coloring method, any of the following methods may be used: a method in which part of white light is converted into red light, green light, and blue light through color filters as described above (a color filter method); a method in which red light, green light, and blue light are used (a three-color method); and a method in which part of blue light is converted into red light or green light (a color conversion method or a quantum dot method).

Figure 17B:
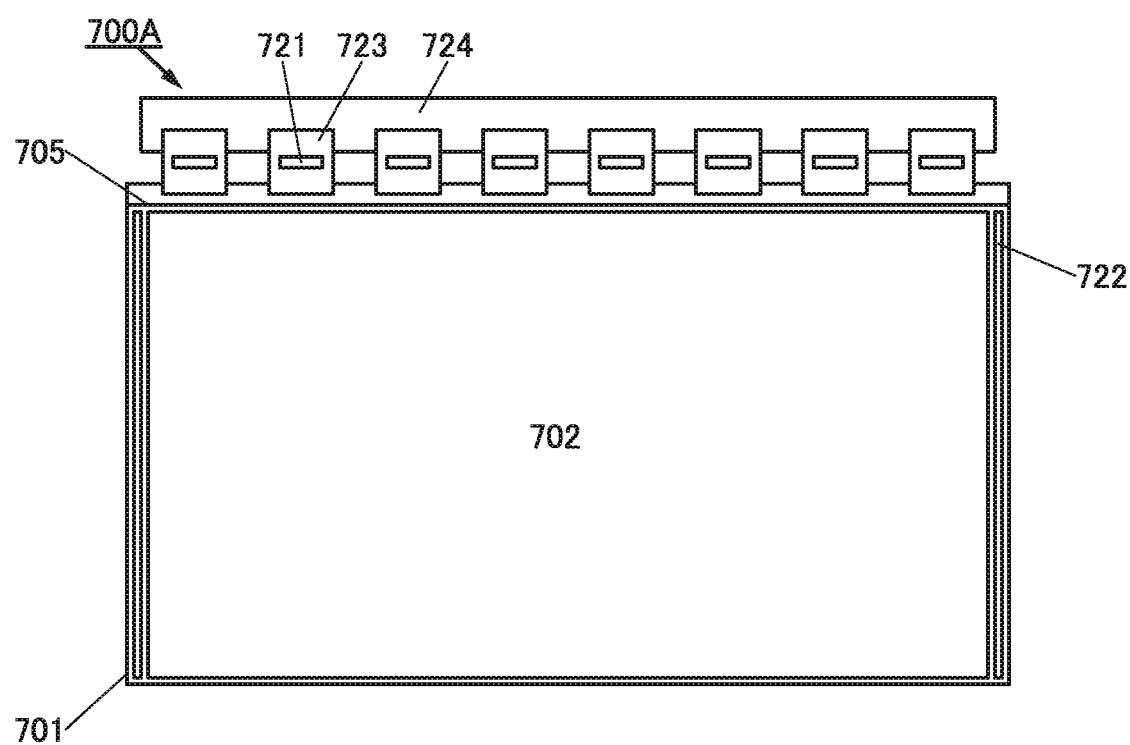

A display device 700A illustrated in FIG. 17B is a display device that can be favorably used for an electronic device with a large screen. For example, the display device 700A can be suitably used for a television device, a monitor, a digital signage, or the like.

The display device 700A includes a plurality of source driver ICs 721 and a pair of gate driver circuits 722.

The plurality of source driver ICs 721 are attached to respective FPCs 723. In each of the plurality of FPCs 723, one of terminals is connected to the first substrate 701, and the other terminal is connected to the printed circuit board 724. The printed circuit board can be mounted on the electronic device in such a manner that the FPCs 723 are bent so that the printed circuit board 724 is located on the back side of the pixel portion 702.

Furthermore, the gate driver circuits 722 are provided over the first substrate 701. Thus, an electronic device with a narrow frame can be fabricated.

With such a structure, a large-size and high-resolution display device can be provided. For example, such a structure can be used for a display device whose screen size (diagonal) is 30 inches or more, 40 inches or more, 50 inches or more, or 60 inches or more. Furthermore, a display device with an extremely high resolution such as full high definition, 4K2K, or 8K4K can be provided.

Cross-Sectional Structure Example

Figure 18:
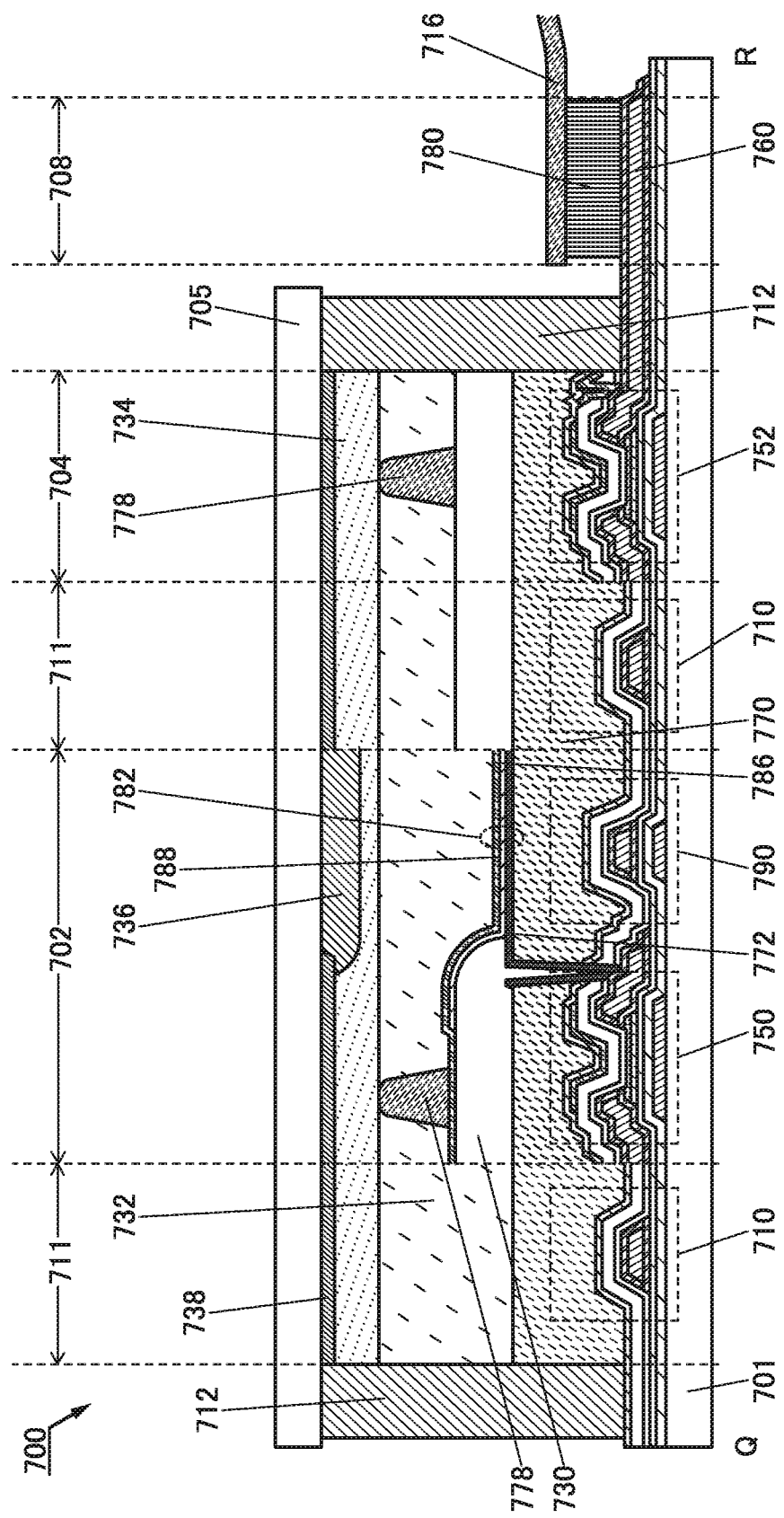
FIG. 18 illustrates a structure example of a display device.

A structure including an EL element as a display element is described below with reference to FIG. 18. FIG. 18 is a cross-sectional view taken along the dashed-dotted line Q-R in FIG. 17A and illustrates the structure including an EL element as a display element.

The display device 700 in FIG. 18 includes a lead wiring portion 711, the pixel portion 702, the source driver circuit portion 704, and the FPC terminal portion 708. Note that the lead wiring portion 711 includes the signal line 710. The pixel portion 702 includes a transistor 750 and a capacitor 790. The source driver circuit portion 704 includes a transistor 752.

In the transistor provided in each pixel, a metal oxide (an oxide semiconductor) is preferably used for a semiconductor layer where a channel is formed. This can increase the field-effect mobility of the transistor and thus reduce the size (occupation area) of the transistor) as compared with the case where amorphous silicon is used. Accordingly, parasitic capacitance of the source lines and the gate lines can be small.

In particular, the use of a transistor including an oxide semiconductor provides various effects described below. For example, the transistor size (occupation area) can be small; thus, parasitic capacitance of the transistor itself can be small. Moreover, the aperture ratio can be improved, or the wiring width can be widened and wiring resistance can be low without reducing the aperture ratio as compared with a transistor including amorphous silicon. Furthermore, since the transistor including an oxide semiconductor can have a high on-state current, the period for writing to the pixel can be shortened. Owing to these effects, charge and discharge periods of the gate line and the source line can be shortened and the frame frequency can be increased.

Furthermore, since the transistor including an oxide semiconductor can have a significantly low off-state current, the holding period of a potential applied to the pixel can be prolonged and the frame frequency can be reduced. For example, the frame frequency can be variable in a range from 0.1 Hz to 480 Hz inclusive. In a television device or the like, the frame frequency is preferably greater than or equal to 30 Hz and less than or equal to 480 Hz, more preferably greater than or equal to 60 Hz and less than or equal to 240 Hz.

Another effect from the use of a transistor having a significantly low off-state current is a reduction in the storage capacitor of the pixel. This can increase the aperture ratio of the pixel and shorten the period for writing to the pixel.

By reducing the electric resistance and capacitance of each source line as small as possible, driving at a higher frame frequency, a larger display device, and the like can be achieved. Examples of methods of reducing the electric resistance and capacitance include using a low resistance material (e.g., copper or aluminum) as a material of the source line, making the thickness or width of the source line large, making the thickness of an interlayer insulating film between the source line and another wiring large, and making the intersecting area of the source line and another wiring small.

The transistors used in this embodiment each include an oxide semiconductor film which is highly purified and in which formation of oxygen vacancies is suppressed. The transistor can have low off-state current. Accordingly, an electrical signal such as a video signal can be held for a longer period, and a writing interval can be set longer in an on state. Accordingly, the frequency of refresh operation can be reduced, which leads to an effect of suppressing power consumption.

In addition, the transistor used in this embodiment can have relatively high field-effect mobility and thus is capable of high speed operation. For example, with such a transistor which can operate at high speed used for a display device, a switching transistor in a pixel portion and a driver transistor used in a driver circuit portion can be formed over one substrate. That is, a semiconductor device formed using a silicon wafer or the like is not additionally needed as a driver circuit, by which the number of components of the semiconductor device can be reduced. In addition, the transistor which can operate at high speed can be used also in the pixel portion, whereby a high-quality image can be provided.

Furthermore, a transistor using a semiconductor including silicon in a semiconductor layer where a channel is formed can also be used. For example, a transistor using amorphous silicon, microcrystalline silicon, polycrystalline silicon, or the like can be used. Amorphous silicon is particularly preferable because it can be formed over a large substrate with a high yield. When amorphous silicon is used, hydrogenated amorphous silicon (denoted by a-Si:H in some cases) in which dangling bonds are terminated by hydrogen is preferably used.

The capacitor 790 includes that is formed through a step of processing the same conductive film as a conductive film functioning as a first gate electrode of the transistor 750 and an upper electrode that is formed through a step of processing the same conductive film as a conductive film functioning as a source electrode or a drain electrode of the transistor 750. The upper electrode is formed through a step of processing a conductive film to be a conductive film functioning as a second gate electrode of the transistor 750. Between the lower electrode and the upper electrode, an insulating film formed through a step of forming an insulating film to be an insulating film functioning as a first gate insulating film of the transistor 750 and insulating films formed through a step of forming insulating films to be insulating films functioning as protective insulating films over the transistor 750 are provided. That is, the capacitor 790 has a stacked-layer structure in which the insulating films functioning as a dielectric film are positioned between a pair of electrodes.

In FIG. 18, a planarization insulating film 770 is provided over the transistor 750, the transistor 752, and the capacitor 790.

Although FIG. 18 each illustrate an example in which the transistor 750 included in the pixel portion 702 and the transistor 752 included in the source driver circuit portion 704 have the same structure, one embodiment of the present invention is not limited thereto. For example, the pixel portion 702 and the source driver circuit portion 704 may include different transistors. Specifically, a structure in which a top-gate transistor is used in the pixel portion 702 and a bottom-gate transistor is used in the source driver circuit portion 704, or a structure in which a bottom-gate transistor is used in the pixel portion 702 and a top-gate transistor is used in the source driver circuit portion 704 may be employed. Note that the term source driver circuit portion 704 can be replaced by the term gate driver circuit portion.

The signal line 710 is formed through the same process as the conductive films functioning as source electrodes and drain electrodes of the transistors 750 and 752. In the case where the signal line 710 is formed using a material including a copper element, signal delay or the like due to wiring resistance is reduced, which enables display on a large screen.

The FPC terminal portion 708 includes a connection electrode 760, an anisotropic conductive film 780, and the FPC 716. Note that the connection electrode 760 is formed through the same process as the conductive films functioning as source electrodes and drain electrodes of the transistors 750 and 752. The connection electrode 760 is electrically connected to a terminal included in the FPC 716 through the anisotropic conductive film 780.

For example, a glass substrate can be used as the first substrate 701 and the second substrate 705. A flexible substrate may be used as the first substrate 701 and the second substrate 705. Examples of the flexible substrate include a plastic substrate.

A structure body 778 is provided between the first substrate 701 and the second substrate 705. The structure body 778 is provided to control the thickness (cell gap) between the first substrate 701 and the second substrate 705. Note that a spherical spacer may be used as the structure body 778.

Furthermore, a light-blocking film 738 functioning as a black matrix, a coloring film 736 functioning as a color filter, and an insulating film 734 in contact with the light-blocking film 738 and the coloring film 736 are provided on the second substrate 705 side.

The display device 700 illustrated in FIG. 18 includes a light-emitting element 782. The light-emitting element 782 includes a conductive film 772, an EL layer 786, and a conductive film 788. The display device 700 illustrated in FIG. 18 can display an image by utilizing light emission from the EL layer 786 of the light-emitting element 782 provided in each pixel. Note that the EL layer 786 contains an organic compound or an inorganic compound such as a quantum dot.

Examples of materials that can be used for an organic compound include a fluorescent material and a phosphorescent material. Examples of materials that can be used for a quantum dot include a colloidal quantum dot material, an alloyed quantum dot material, a core-shell quantum dot material, and a core quantum dot material. The quantum dot containing elements belonging to Groups 12 and 16, elements belonging to Groups 13 and 15, or elements belonging to Groups 14 and 16, may be used. Alternatively, a quantum dot material containing an element such as cadmium (Cd), selenium (Se), zinc (Zn), sulfur (S), phosphorus (P), indium (In), tellurium (Te), lead (Pb), gallium (Ga), arsenic (As), or aluminum (Al) may be used.

In the display device 700 in FIG. 18, the insulating film 730 is provided over the planarization insulating film 770 and the conductive film 772. The insulating film 730 covers part of the conductive film 772. Note that the light-emitting element 782 has a top emission structure. Therefore, the conductive film 788 has a light-transmitting property and transmits light emitted from the EL layer 786. Although the top-emission structure is described as an example in this embodiment, one embodiment of the present invention is not limited thereto. A bottom-emission structure in which light is emitted to the conductive film 772 side, or a dual-emission structure in which light is emitted to both the conductive film 772 side and the conductive film 788 side may be employed.

The coloring film 736 is provided to overlap with the light-emitting element 782, and the light-blocking film 738 is provided to overlap with the insulating film 730 and to be included in the lead wiring portion 711 and in the source driver circuit portion 704. The coloring film 736 and the light-blocking film 738 are covered with the insulating film 734. A space between the light-emitting element 782 and the insulating film 734 is filled with a sealing film 732. The structure of the display device 700 is not limited to the example in FIG. 18, in which the coloring film 736 is provided. For example, a structure without the coloring film 736 may also be employed in the case where the EL layer 786 is formed by separate coloring, i.e., formed into an island shape per pixel.

Structure Example of Display Device Provided with Input/Output Device

An input/output device may be provided in the display device 700 illustrated in FIG. 18. As an example of the input/output device, a touch panel or the like can be given.

Figure 19:
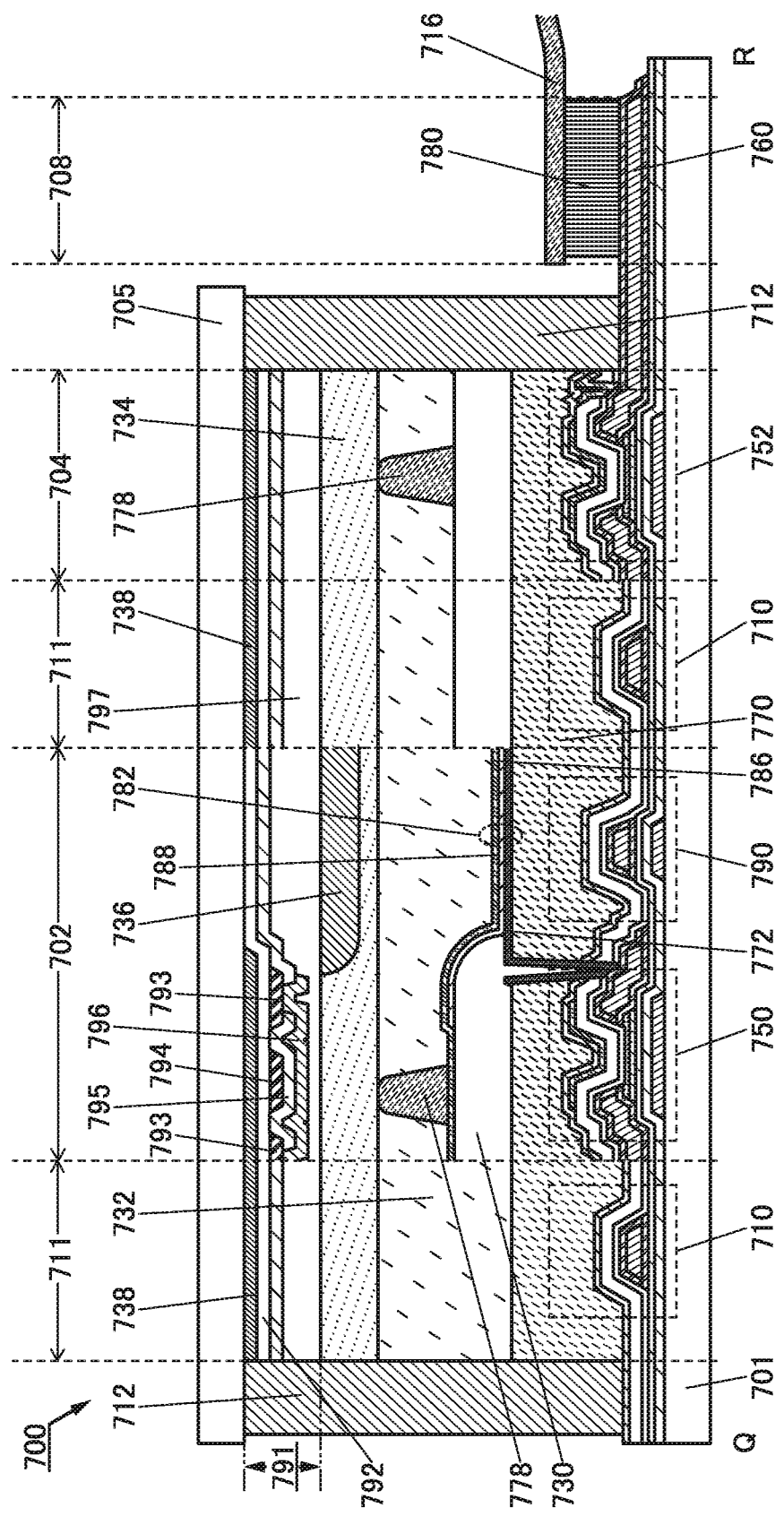
FIG. 19 illustrates a structure example of a display device.

FIG. 19 illustrates a structure in which the display device 700 illustrated in FIG. 18 includes the touch panel 791.

First, the touch panel 791 illustrated in FIG. 19 is described below.

The touch panel 791 illustrated in FIG. 19 is what is called an in-cell touch panel provided between the second substrate 705 and the coloring film 736. The touch panel 791 is formed on the second substrate 705 side before the coloring film 736 is formed.

The touch panel 791 includes the light-blocking film 738, an insulating film 792, an electrode 793, an electrode 794, an insulating film 795, an electrode 796, and an insulating film 797. A change in the capacitance between the electrodes 793 and 794 can be detected when an object such as a finger or a stylus approaches, for example.

A portion in which the electrode 793 intersects with the electrode 794 is illustrated in the upper portion of the transistor 750 illustrated in FIG. 19. Through openings in the insulating film 795, the electrode 796 is electrically connected to the two electrodes 793 between which the electrode 794 is positioned. Note that a structure in which a region where the electrode 796 is provided is provided in the pixel portion 702 is illustrated in FIG. 19 as an example; however, one embodiment of the present invention is not limited thereto. For example, the region where the electrode 796 is provided may be provided in the source driver circuit portion 704.

The electrodes 793 and 794 are provided in a region overlapping with the light-blocking film 738. As illustrated in FIG. 19, it is preferable that the electrode 793 not overlap with the light-emitting element 782. In other words, the electrode 793 has an opening in a region overlapping with the light-emitting element 782. That is, the electrode 793 has a mesh shape. With this structure, the electrode 793 does not block light emitted from the light-emitting element 782. Thus, since luminance is hardly reduced even when the touch panel 791 is placed, a display device with high visibility and low power consumption can be achieved. Note that the electrode 794 can have a similar structure.

In addition, since the electrodes 793 and 794 do not overlap with the light-emitting element 782, the electrodes 793 and 794 can be formed using a metal material with low visible light transmittance.

Accordingly, the resistance of the electrodes 793 and 794 can be reduced as compared with an electrode using an oxide material with high visible light transmittance, so that the sensitivity of the touch panel can be increased.

For example, conductive nanowires may be used for the electrodes 793, 794, and 796. The nanowires may have a mean diameter greater than or equal to 1 nm and less than or equal to 100 nm, preferably greater than or equal to 5 nm and less than or equal to 50 nm, further preferably greater than or equal to 5 nm and less than or equal to 25 nm. As the nanowire, a carbon nanotube or a metal nanowire such as an Ag nanowire, a Cu nanowire, or an Al nanowire may be used. For example, in the case where an Ag nanowire is used for any one of or all of the electrodes 793, 794, and 796, the transmittance of visible light can be greater than or equal to 89% and the sheet resistivity can be greater than or equal to 40 Ω/square and less than or equal to 100 Ω/square.

Although the structure of the in-cell touch panel is illustrated in FIG. 19, one embodiment of the present invention is not limited thereto. For example, a touch panel formed over the display device 700, what is called an on-cell touch panel, or a touch panel attached to the display device 700, what is called an out-cell touch panel may be used.

In this manner, the display device of one embodiment of the present invention can be combined with various types of touch panels.

At least part of this embodiment can be implemented in combination with any of the other embodiments described in this specification as appropriate.

Embodiment 5

In this embodiment, structure examples of a display device that can be used for the display panel described in the above embodiments are described. In particular, a display device including a liquid crystal element as a display element is described here.

Structure Example 1 of Display Device

Figure 20:
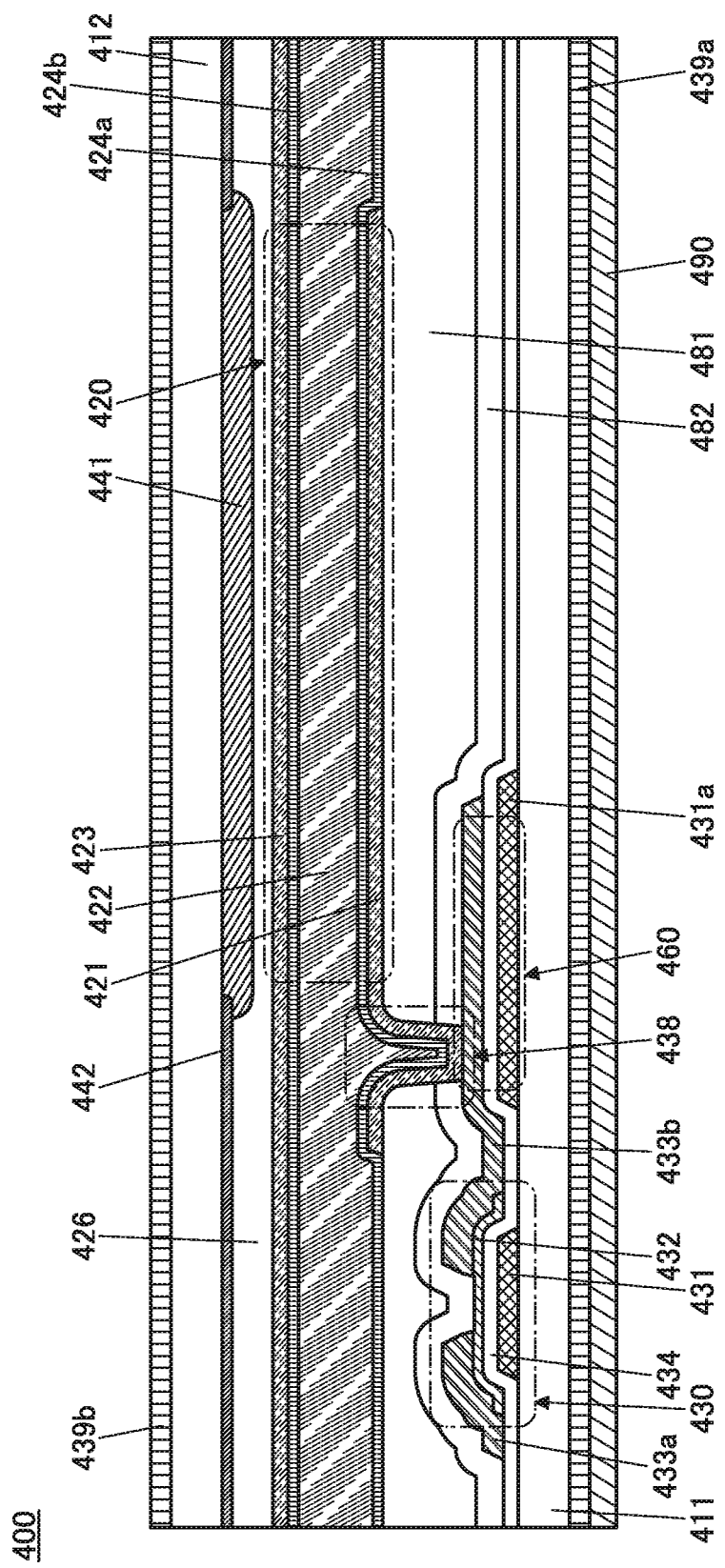
FIG. 20 illustrates a structure example of a display device.

FIG. 20 illustrates an example of a cross-sectional structure of a display device 400. Here, an example where a transmissive liquid crystal element 420 is used as a display element is shown. In FIG. 20, the substrate 412 side is the display surface side.

In the display device 400, a liquid crystal 422 is provided between a substrate 411 and the substrate 412. The liquid crystal element 420 includes a conductive layer 421 provided on the substrate 411 side, a conductive layer 423 provided on the substrate 412 side, and the liquid crystal 422 provided between the conductive layers 421 and 423. Furthermore, an alignment film 424a is provided between the liquid crystal 422 and the conductive layer 421 and an alignment film 424b is provided between the liquid crystal 422 and the conductive layer 423.

The conductive layer 421 functions as a pixel electrode. The conductive layer 423 functions as a common electrode or the like. The conductive layer 421 and the conductive layer 423 each have a function of transmitting visible light. Thus, the liquid crystal element 420 is a transmissive liquid crystal element.

A coloring layer 441 and a light-blocking layer 442 are provided on a surface of the substrate 412 on the substrate 411 side. An insulating layer 426 is provided to cover the coloring layer 441 and the light-blocking layer 442, and the conductive layer 423 is provided to cover the insulating layer 426. Furthermore, the coloring layer 441 is provided in a region overlapping with the conductive layer 421. The light-blocking layer 442 is provided to cover a transistor 430 and a connection portion 438.

A polarizing plate 439a is located outward from the substrate 411, and a polarizing plate 439b is located outward from the substrate 412. Furthermore, a backlight unit 490 is located outward from the polarizing plate 439a. The display surface of the display device 400 illustrated in FIG. 20 is on the substrate 412 side.

Over the substrate 411, the transistor 430, a capacitor 460, and the like are provided. The transistor 430 functions as a selection transistor for a pixel. The transistor 430 is connected to the liquid crystal element 420 through the connection portion 438.

The transistor 430 illustrated in FIG. 20 is what is called a channel-etched bottom-gate transistor. The transistor 430 includes a conductive layer 431 functioning as a gate electrode, an insulating layer 434 functioning as a gate insulating layer, a semiconductor layer 432, and a pair of conductive layers 433a and 433b functioning as a source electrode and a drain electrode. A region of the semiconductor layer 432 overlapping with the conductive layer 431 functions as a channel formation region. The semiconductor layer 432 is connected to the conductive layers 433a and 433b.

The capacitor 460 is formed of a conductive layer 431a, the insulating layer 434, and the conductive layer 433b.

An insulating layer 482 and an insulating layer 481 are stacked to cover the transistor 430 and the like. The conductive layer 421 functioning as a pixel electrode is provided over the insulating layer 481. In the connection portion 438, the conductive layer 421 is electrically connected to the conductive layer 433b through an opening in the insulating layers 481 and 482. The insulating layer 481 preferably functions as a planarization layer. The insulating layer 482 preferably functions as a protective film that inhibits diffusion of impurities or the like to the transistor 430 and the like. The insulating layer 482 can be formed using an inorganic insulating material, and the insulating layer 481 can be formed using an organic insulating material, for example.

Structure Example 2 of Display Device

Figure 21:
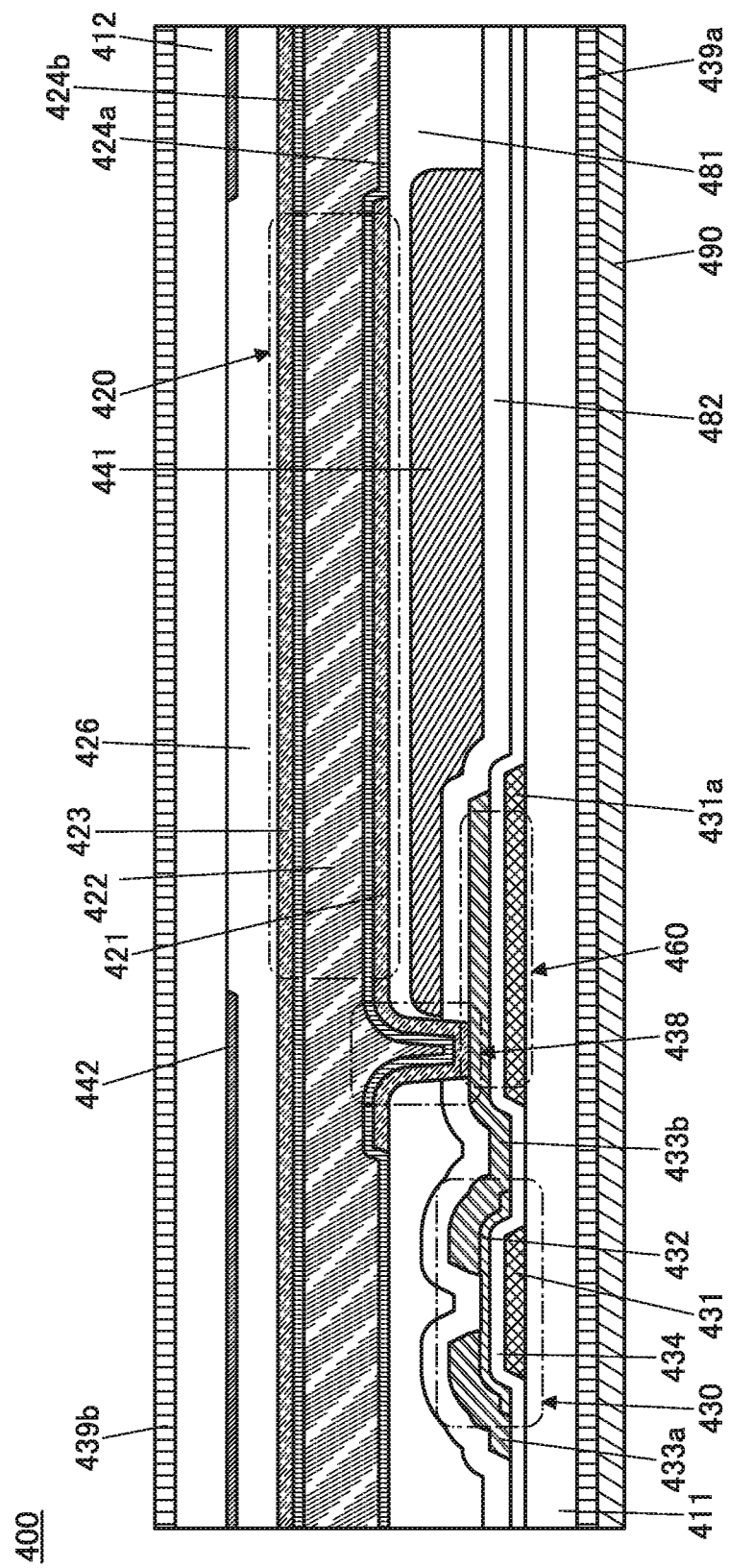
FIG. 21 illustrates a structure example of a display device.

FIG. 21 illustrates an example where the coloring layer 441 is provided on the substrate 411 side. Thus, the structure on the substrate 412 side can be simplified.

Note that in the case where the coloring layer 441 is used as a planarization film, the insulating layer 481 is not necessarily provided.

Structure Example 3 of Display Device

In each of the above examples, a vertical electric field mode liquid crystal element in which a pair of electrodes is provided over and under a liquid crystal layer is used as the liquid crystal element; the structure of the liquid crystal element is not limited thereto and any of a variety of liquid crystal elements can be used.

Figure 22:
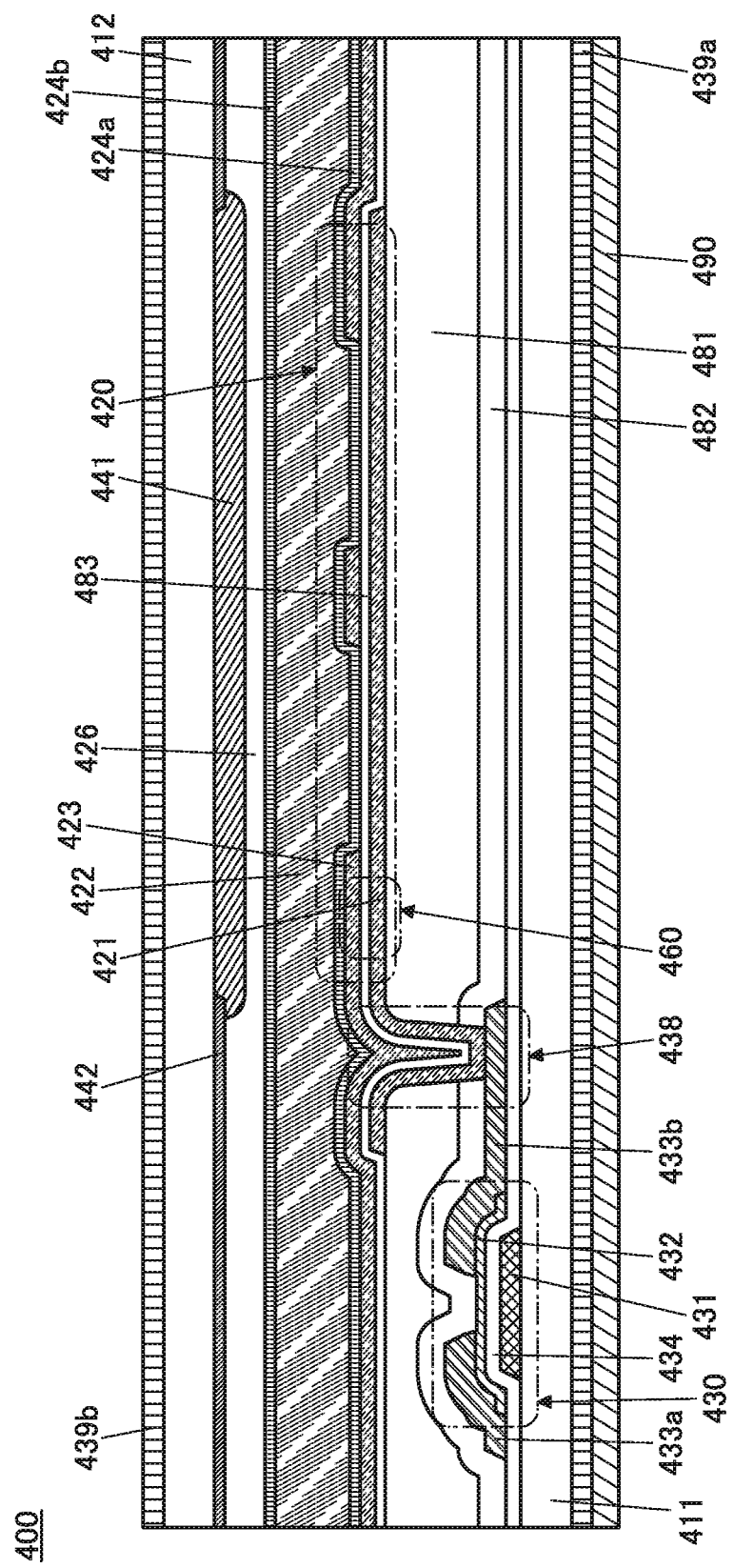
FIG. 22 illustrates a structure example of a display device.

FIG. 22 is a schematic cross-sectional view of a display device including a liquid crystal element using a fringe field switching (FFS) mode.

The liquid crystal element 420 includes the conductive layer 421 functioning as a pixel electrode and the conductive layer 423 overlapping with the conductive layer 421 with an insulating layer 483 provided therebetween. The conductive layer 423 has a slit-like or comb-like top surface.

In such a structure, a capacitor, which can be used as the capacitor 460, is formed in a region where the conductive layer 421 and the conductive layer 423 overlap with each other. Thus, the area occupied by the pixel can be reduced, leading to a high-resolution display device. Accordingly, the aperture ratio can be improved.

Figure 23:
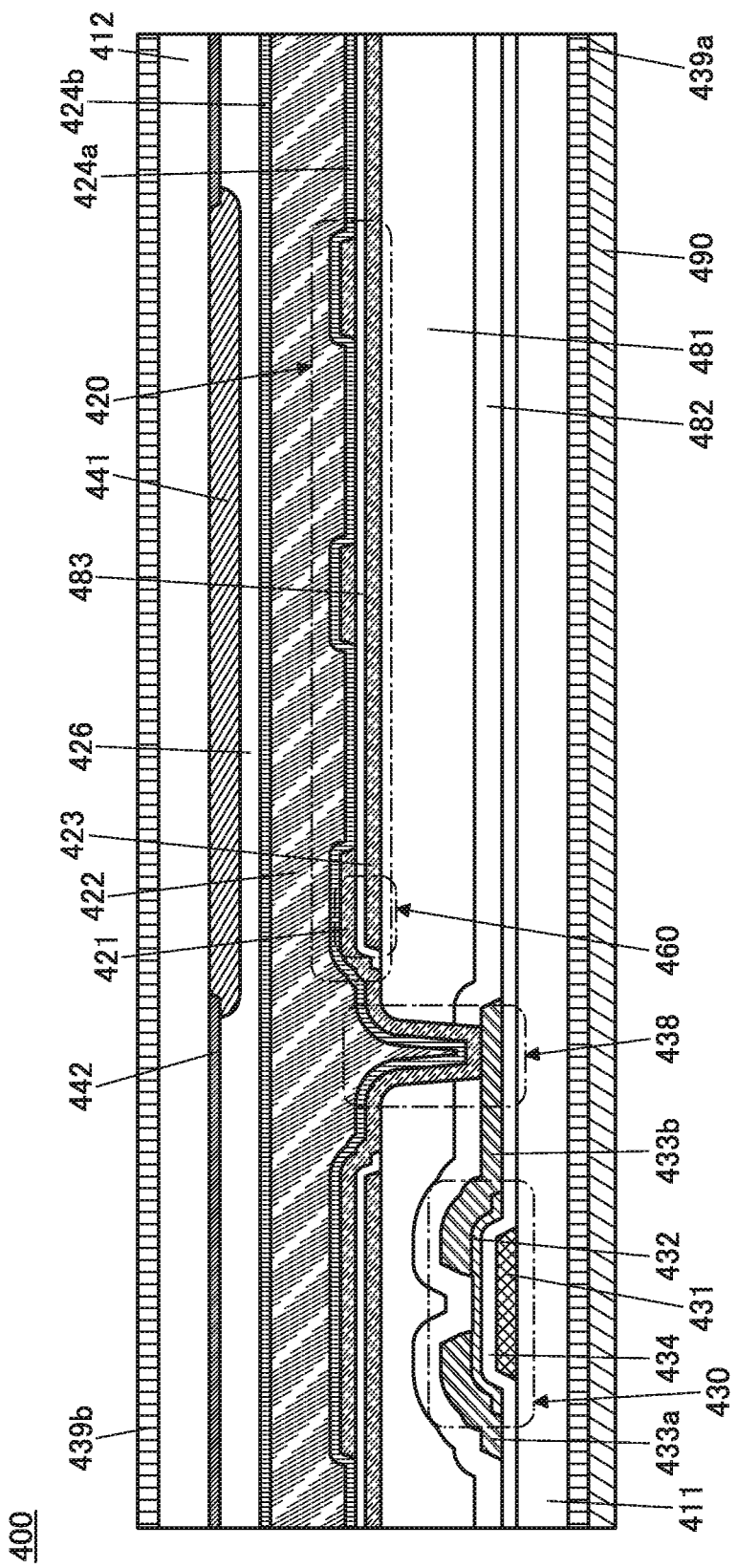
FIG. 23 illustrates a structure example of a display device.

Although FIG. 22 illustrates the structure in which the conductive layer 423 functioning as a common electrode is on the liquid crystal 422 side, a structure in which the conductive layer 421 functioning as a pixel electrode is on the liquid crystal 422 side may be employed as illustrated in FIG. 23. In this case, the conductive layer 421 has a slit-like or comb-like top surface.

Here, the smaller the number of photolithography steps in a manufacturing process of a display device is, i.e., the smaller the number of photomasks is, the lower the manufacturing cost can be.

For example, the display device having the structure illustrated in FIG. 20 can be manufactured through five photolithography steps, i.e., a formation step of the conductive layer 431 and the like, a formation step of the semiconductor layer 432, a formation step of the conductive layer 433a and the like, a formation step of the opening to be the connection portion 438, and a formation step of the conductive layer 421, among steps on the substrate 411 side. That is, a back plane substrate can be manufactured with five photomasks. On the substrate 412 (counter substrate) side, an ink-jet method, a screen printing method, or the like is preferably used as the formation methods of the coloring layer 441 and the light-blocking layer 442, in which case a photomask becomes unnecessary. For example, in the case where the three-color coloring layers 441 and the light-blocking layer 442 are provided, four photomasks can be reduced compared with the case where these are formed by a photolithography process.

Structure Example 1 of Transistor

Next, a specific structure example of the transistor 430 is described. A semiconductor containing silicon can be used for the semiconductor layer 432 of each of transistors illustrated in FIGS. 24A to 24G. For example, hydrogenated amorphous silicon, microcrystalline silicon, polycrystalline silicon, or the like can be used as the semiconductor containing silicon. Hydrogenated amorphous silicon is particularly preferable because it can be formed over a large substrate with a high yield. A display device of one embodiment of the present invention can perform favorable display even with a transistor including amorphous silicon having relatively low field-effect mobility.

Figure 24A:
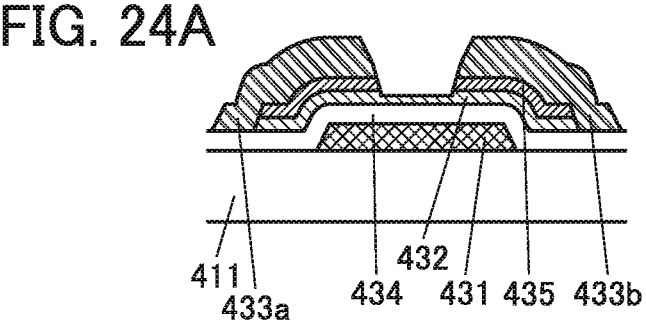
FIGS. 24A to 24G each illustrate a structure example of a transistor.

The transistor illustrated in FIG. 24A includes a pair of impurity semiconductor layers 435 functioning as a source region and a drain region. The impurity semiconductor layers 435 are provided between the semiconductor layer 432 and the conductive layer 433a and between the semiconductor layer 432 and the conductive layer 433b. The semiconductor layer 432 and the impurity semiconductor layers 435 are provided in contact with each other. The impurity semiconductor layer 435 is provided in contact with the conductive layer 433a or the conductive layer 433b.

The impurity semiconductor film to form the impurity semiconductor layer 435 is formed using a semiconductor to which an impurity element imparting one conductivity type is added. In the case where the transistor is an n-channel transistor, for example, silicon to which P or As is added is given as a semiconductor to which an impurity element imparting one conductivity type is added. In the case where the transistor is a p-channel transistor, for example, it is possible to add B as the impurity element imparting one conductivity type; however, it is preferable to use an n-channel transistor. Note that the impurity semiconductor layer may be formed using an amorphous semiconductor or a crystalline semiconductor such as a microcrystalline semiconductor.

Figure 24B:
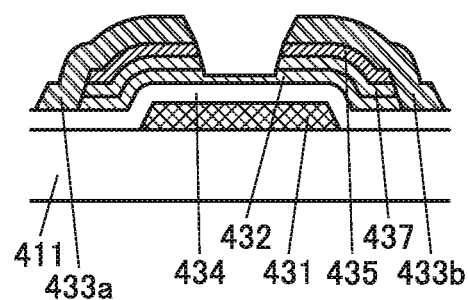

The transistor illustrated in FIG. 24B includes a semiconductor layer 437 between the semiconductor layer 432 and the impurity semiconductor layer 435.

The semiconductor layer 437 may be formed using the same semiconductor film as the semiconductor layer 432. The semiconductor layer 437 can function as an etching stopper for preventing the semiconductor layer 432 from being removed at the time of etching for forming the impurity semiconductor layer 435. Although FIG. 24A illustrates an example where the semiconductor layer 437 is divided into a right portion and a left portion, part of the semiconductor layer 437 may cover a channel formation region of the semiconductor layer 432.

Furthermore, the concentration of an impurity contained in the semiconductor layer 437 may be lower than that contained in the impurity semiconductor layer 435. Thus, the semiconductor layer 437 can function as a lightly doped drain (LDD) region and can suppress hot carrier degradation when the transistor is driven.

Figure 24C:
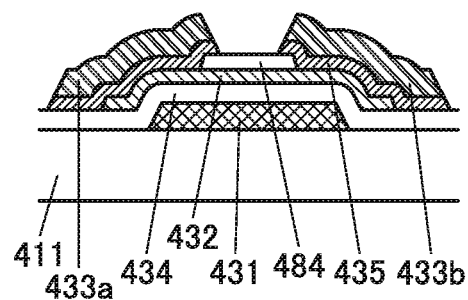

In the transistor illustrated in FIG. 24C, the insulating layer 484 is provided over a channel formation region of the semiconductor layer 432. The insulating layer 484 functions as an etching stopper at the time of etching for forming the impurity semiconductor layers 435.

Figure 24D:
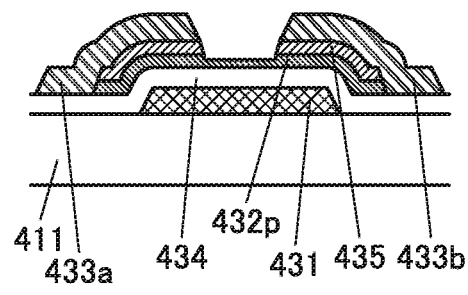

The transistor illustrated in FIG. 24D includes a semiconductor layer 432p instead of the semiconductor layer 432. The semiconductor layer 432p includes a semiconductor film having high crystallinity. For example, the semiconductor layer 432p includes a polycrystalline semiconductor or a single crystal semiconductor. Thus, a transistor having high field-effect mobility can be provided.

Figure 24E:
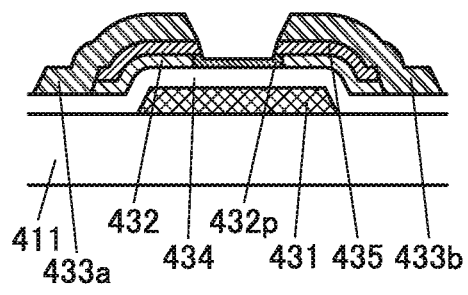

The transistor illustrated in FIG. 24E includes the semiconductor layer 432p in a channel formation region of the semiconductor layer 432. For example, the transistor illustrated in FIG. 24E can be formed by irradiating a semiconductor film to be the semiconductor layer 432 with laser light or the like so that the semiconductor film is crystallized locally. Thus, a transistor having high field-effect mobility can be provided.

Figure 24F:
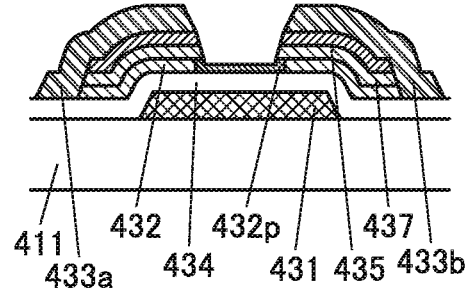

The transistor illustrated in FIG. 24F includes the semiconductor layer 432p having crystallinity in a channel formation region of the semiconductor layer 432 of the transistor illustrated in FIG. 24B.

Figure 24G:
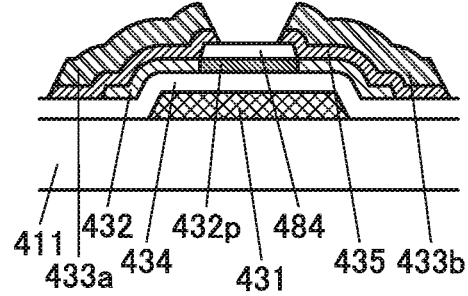

The transistor illustrated in FIG. 24G includes the semiconductor layer 432p having crystallinity in a channel formation region of the semiconductor layer 432 of the transistor illustrated in FIG. 24C.

Structure Example 2 of Transistor

Next, another modification structure example of the transistor 430 is described. An OS transistor can be formed by using a metal oxide as the semiconductor layer 432 of each of transistors illustrated in FIGS. 25A to 25E. When an OS transistor is used, the update frequency of a video signal can be set to be extremely low in a period when there is no change in the image or a period when the change is at a certain level or lower; accordingly, power consumption can be reduced.

Figure 25A:
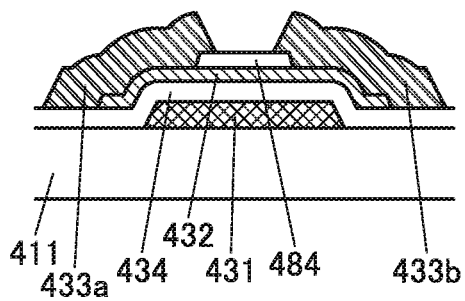
FIGS. 25A to 25E each illustrate a structure example of a transistor.

In the transistor illustrated in FIG. 25A, the insulating layer 484 is provided over a channel formation region of the semiconductor layer 432. The insulating layer 484 functions as an etching stopper at the time of etching the conductive layer 433a and the conductive layer 433b.

Figure 25B:
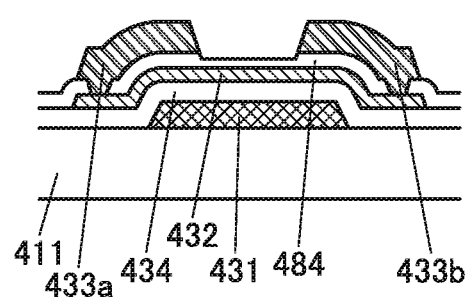

The transistor illustrated in FIG. 25B has a structure in which the insulating layer 484 is provided over the insulating layer 434 while covering the semiconductor layer 432. In this case, the conductive layer 433a and the conductive layer 433b are connected to the semiconductor layer 432 through openings provided in the insulating layer 484.

Figure 25C:
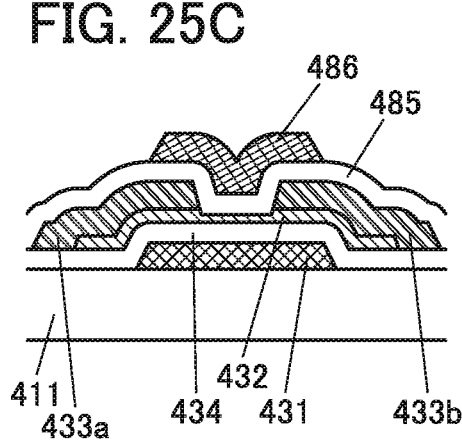

The transistor illustrated in FIG. 25C includes an insulating layer 485 and a conductive layer 486. The insulating layer 485 is provided so as to cover the semiconductor layer 432, the conductive layer 433a, and the conductive layer 433b. Furthermore, the conductive layer 486 is provided over the insulating layer 485 and has a region overlapping with the semiconductor layer 432.

The conductive layer 486 is positioned to face the conductive layer 431 with the semiconductor layer 432 therebetween. In the case where the conductive layer 431 is used as a first gate electrode, the conductive layer 486 can serve as a second gate electrode. By supplying the same potential to the conductive layers 431 and 486, the on-state current of the transistor can be increased. When a potential for controlling the threshold voltage is supplied to one of the conductive layers 431 and 486 and a potential for driving is supplied to the other, the threshold voltage of the transistor can be controlled.

Figure 25D:
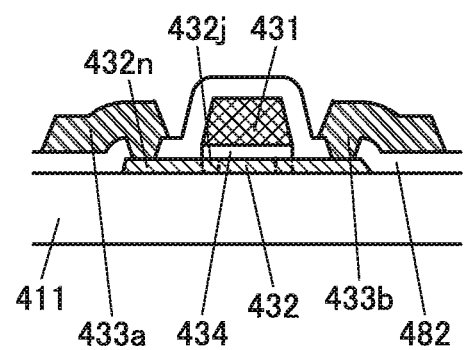

The transistor illustrated in FIG. 25D is a top-gate transistor, and the conductive layer 431 serving as a gate electrode is provided on the top side of the semiconductor layer 432 (on the side opposite to the formation surface side). The insulating layer 434 and the conductive layer 431 are stacked over the semiconductor layer 432. The insulating layer 482 is provided so as to cover the conductive layer 431 and a top surface and an edge portion of the semiconductor layer 432. The conductive layers 433a and 433b are provided over the insulating layer 482. The conductive layers 433a and 433b are connected to the semiconductor layer 432 through openings provided in the insulating layer 482.

Note that although the insulating layer 434 is not present in a portion that does not overlap with the conductive layer 431 in this example, the insulating layer 434 may be provided to cover the top surface and the edge portion of the semiconductor layer 432.

In the transistor illustrated in FIG. 25D, the physical distance between the conductive layer 431 and the conductive layer 433a or 433b can be easily increased, so that the parasitic capacitance therebetween can be reduced.

Figure 25E:
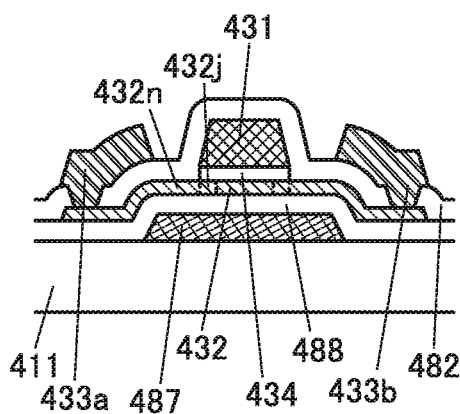

The transistor illustrated in FIG. 25E is different from the transistor illustrated in FIG. 25D in including a conductive layer 487 and an insulating layer 488. The conductive layer 487 includes a region overlapping with the semiconductor layer 432. The insulating layer 488 is provided so as to cover the conductive layer 487.

The conductive layer 487 serves as a second gate electrode. Thus, the on-state current can be increased and the threshold voltage can be controlled, for example.

Note that as illustrated in FIGS. 25D and 25E, the semiconductor layer 432 may include a region 432n. The region 432n includes a region in contact with the insulating layer 482 containing nitrogen or hydrogen. In addition, nitrogen or hydrogen in the insulating layer 482 is added to the region 432n, so that the region 432n becomes an n-type region. In this case, the region 432n functions as a source region or a drain region. Note that the concentration of nitrogen or hydrogen in the region 432n is higher than that in the channel formation region. In addition, the carrier density of the region 432n is higher than that of the channel formation region.

The semiconductor layer 432 may also include a region 432j. The region 432j has a function as a junction region between the channel formation region and the source region or the drain region. Note that the concentration of nitrogen or hydrogen in the region 432j is lower than that of the region 432n and higher than that in the channel formation region. In addition, the carrier density of the region 432j is lower than that of the region 432n and higher than that of the channel formation region.

[Components]

The above-described components are described below.

(Substrate)

A material having a flat surface can be used as the substrate included in the display device. The substrate through which light emitted from the display element is extracted is formed using a material that transmits the light. For example, a material such as glass, quartz, ceramics, sapphire, or an organic resin can be used.

The weight and thickness of the display panel can be decreased by using a thin substrate. Furthermore, a flexible display panel can be obtained by using a substrate that is thin enough to have flexibility. Alternatively, glass or the like that is thin enough to have flexibility can be used as the substrate. Alternatively, a composite material in which glass and a resin material are attached to each other with an adhesive layer may be used.

(Transistor)

The transistors each include a conductive layer functioning as the gate electrode, the semiconductor layer, a conductive layer functioning as the source electrode, a conductive layer functioning as the drain electrode, and an insulating layer functioning as the gate insulating layer.

Note that there is no particular limitation on the structure of the transistor included in the display device of one embodiment of the present invention. For example, a planar transistor, a staggered transistor, or an inverted staggered transistor may be used. A top-gate transistor or a bottom-gate transistor may be used. Gate electrodes may be provided above and below a channel.

There is no particular limitation on the crystallinity of a semiconductor material used for the transistor, and an amorphous semiconductor or a semiconductor having crystallinity (a microcrystalline semiconductor, a polycrystalline semiconductor, a single crystal semiconductor, or a semiconductor partly including crystal regions) may be used. A semiconductor having crystallinity is preferably used, in which case deterioration of the transistor characteristics can be suppressed.

As a semiconductor material used for the transistor, a Group 14 element (e.g., silicon or germanium) or a metal oxide can be used, for example. A semiconductor containing silicon, a semiconductor containing gallium arsenide, a metal oxide containing indium, or the like can be typically used. For example, hydrogenated amorphous silicon can be used as the semiconductor containing silicon.

A transistor with a metal oxide whose band gap is wider than that of silicon can hold charge stored in a capacitor that is series-connected to the transistor for a long time, owing to a low off-state current of the transistor. When such a transistor is used for the pixel, operation of the driver circuit can be stopped while gradations of the pixels are maintained. As a result, a display device with extremely low power consumption can be obtained.

The semiconductor layer preferably includes, for example, a film represented by an In-M-Zn-based oxide that contains at least indium, zinc, and M (a metal such as aluminum, titanium, gallium, germanium, yttrium, zirconium, lanthanum, cerium, tin, neodymium, or hafnium). In order to reduce variations in electric characteristics of the transistor including the semiconductor layer, the semiconductor layer preferably contains a stabilizer in addition to the above.

Examples of the stabilizer, including metals that can be used as M, are gallium, tin, hafnium, aluminum, and zirconium. As another stabilizer, lanthanoid such as lanthanum, cerium, praseodymium, neodymium, samarium, europium, gadolinium, terbium, dysprosium, holmium, erbium, thulium, ytterbium, or lutetium can be given.

As a metal oxide included in the semiconductor layer, any of the following can be used, for example: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

Note that here, for example, an "In—Ga—Zn-based oxide" means an oxide containing In, Ga, and Zn as its main components and there is no limitation on the ratio of In:Ga:Zn. Furthermore, a metal element in addition to In, Ga, and Zn may be contained.

The semiconductor layer and the conductive layer may include the same metal elements contained in the above oxides. The use of the same metal elements for the semiconductor layer and the conductive layer can reduce the manufacturing cost. For example, the use of metal oxide targets with the same metal composition can reduce the manufacturing cost. In addition, the same etching gas or the same etchant can be used in processing the semiconductor layer and the conductive layer. Note that even when the semiconductor layer and the conductive layer include the same metal elements, they have different compositions in some cases. For example, a metal element in a film is released during the manufacturing process of the transistor and the capacitor, which might result in different metal compositions.

The energy gap of the metal oxide included in the semiconductor layer is greater than or equal to 2 eV, preferably greater than or equal to 2.5 eV, further preferably greater than or equal to 3 eV. With the use of a metal oxide having such a wide energy gap, the off-state current of the transistor can be reduced.

In the case where the metal oxide contained in the semiconductor layer contains an In-M-Zn-based oxide, it is preferable that the atomic ratio of metal elements of a sputtering target used for forming a film of the In-M-Zn oxide satisfy In M and Zn M. As the atomic ratio of metal elements of such a sputtering target, In:M:Zn=1:1:1, In:M:Zn=1:1:1.2, In:M:Zn=3:1:2, In:M:Zn=4:2:3, In:M:Zn=4:2:4.1, In:M:Zn=5:1:6 and the like are preferable. Note that the atomic ratio of metal elements in the formed semiconductor layer varies from the above atomic ratio of metal elements of the sputtering target within a range of ±40% as an error.

A metal oxide with a low carrier density is preferably used for the semiconductor layer. For example, the semiconductor layer is a metal oxide whose carrier density is lower than or equal to $1\times10^{17}/cm^3$, preferably lower than or equal to $1\times10^{15}/cm^3$, further preferably lower than or equal to $1\times10^{13}/cm^3$, still further preferably lower than or equal to $1\times10^{11}/cm^3$, yet further preferably lower than $1\times10^{10}/cm^3$, and higher than or equal to $1\times10^{-9}/cm^3$. Such a semiconductor layer has a low impurity concentration and a low density of defect states and thus has stable characteristics.

Note that without limitation to the compositions and materials described above, a material with an appropriate composition can be used depending on required semiconductor characteristics and electric characteristics (e.g., field-effect mobility and threshold voltage) of a transistor. To obtain the required semiconductor characteristics of the transistor, it is preferable that the carrier density, the impurity concentration, the defect density, the atomic ratio between a metal element and oxygen, the interatomic distance, the density, and the like of the semiconductor layer be set to appropriate values.

When silicon or carbon that is one of elements belonging to Group 14 is contained in the metal oxide contained in the semiconductor layer, oxygen vacancies are increased in the semiconductor layer, and the semiconductor layer might become n-type. Thus, the concentration of silicon or carbon (measured by secondary ion mass spectrometry) in the semiconductor layer is preferably lower than or equal to $2\times10^{18}$ atoms/cm$^3$, further preferably lower than or equal to $2\times10^{17}$ atoms/cm$^3$.

An alkali metal and an alkaline earth metal might generate carriers when bonded to a metal oxide, in which case the off-state current of the transistor might be increased. Therefore, the concentration of an alkali metal or alkaline earth metal of the semiconductor layer, which is measured by secondary ion mass spectrometry, is preferably lower than or equal to $1\times10^{18}$ atoms/cm$^3$, further preferably lower than or equal to $2\times10^{16}$ atoms/cm$^3$.

The semiconductor layer may have a non-single-crystal structure, for example. Non-single-crystal structures include a polycrystalline structure, a microcrystalline structure, and an amorphous structure, for example. Among the non-single-crystal structures, the amorphous structure has the highest density of defect states.

A metal oxide having an amorphous structure has disordered atomic arrangement and no crystalline component, for example. Alternatively, an oxide film having an amorphous structure has, for example, an absolutely amorphous structure and no crystal part.

Note that the semiconductor layer may be a mixed film including two or more of the following: a region having an amorphous structure, a region having a microcrystalline structure, a region having a polycrystalline structure, and a region having a single crystal structure. The mixed film has, for example, a single-layer structure or a stacked-layer structure including two or more of the above regions in some cases.

(Conductive Layer)

As materials for a gate, a source, and a drain of a transistor, and a conductive layer such as a wiring or an electrode included in a display device, any of metals such as aluminum, titanium, chromium, nickel, copper, yttrium, zirconium, molybdenum, silver, tantalum, and tungsten, an alloy containing any of these metals as its main component, or the like can be used. A single layer structure or stacked-layer structure including a film containing any of these materials can be used. For example, the following structures can be given: a single-layer structure of an aluminum film containing silicon, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which a titanium film or a titanium nitride film, an aluminum film or a copper film, and a titanium film or a titanium nitride film are stacked in this order, and a three-layer structure in which a molybdenum film or a molybdenum nitride film, an aluminum film or a copper film, and a molybdenum film or a molybdenum nitride film are stacked in this order. Note that an oxide such as indium oxide, tin oxide, or zinc oxide may be used. Copper containing manganese is preferably used because controllability of the shape by etching is increased.

As a light-transmitting conductive material that can be used for the gate, source, and drain of the transistor and conductive layers such as wirings and electrodes included in the display device, a conductive oxide such as indium oxide, indium tin oxide, indium zinc oxide, zinc oxide, or zinc oxide to which gallium is added, or graphene can be used. It is also possible to use a metal material such as gold, silver, platinum, magnesium, nickel, tungsten, chromium, molybdenum, iron, cobalt, copper, palladium, or titanium; an alloy material containing any of these metal materials; or a nitride of the metal material (e.g., titanium nitride). In the case of using the metal material or the alloy material (or the nitride thereof), the film thickness is set small enough to transmit light. Alternatively, a stacked film of any of the above materials can be used for the conductive layers. For example, a stacked film of indium tin oxide and an alloy of silver and magnesium is preferably used because the conductivity can be increased. They can also be used for conductive layers such as a variety of wirings and electrodes included in a display device, and conductive layers (e.g., conductive layers serving as a pixel electrode or a common electrode) included in a display element.

(Insulating Layer)

Examples of an insulating material that can be used for the insulating layers include a resin such as an acrylic or epoxy resin, a resin having a siloxane bond such as silicone, and an inorganic insulating material such as silicon oxide, silicon oxynitride, silicon nitride oxide, silicon nitride, or aluminum oxide.

Examples of the insulating film with low water permeability include a film containing nitrogen and silicon (e.g., a silicon nitride film and a silicon nitride oxide film) and a film containing nitrogen and aluminum (e.g., an aluminum nitride film). Alternatively, a silicon oxide film, a silicon oxynitride film, an aluminum oxide film, or the like may be used.

(Liquid Crystal Element)

The liquid crystal element can employ, for example, a vertical alignment (VA) mode. Examples of the vertical alignment mode include a multi-domain vertical alignment (MVA) mode, a patterned vertical alignment (PVA) mode, and an advanced super view (ASV) mode.

The liquid crystal element can employ a variety of modes. For example, a liquid crystal element using, instead of a VA mode, a twisted nematic (TN) mode, an in-plane switching (IPS) mode, a fringe field switching (FFS) mode, an axially symmetric aligned micro-cell (ASM) mode, an optically compensated birefringence (OCB) mode, a ferroelectric liquid crystal (FLC) mode, an antiferroelectric liquid crystal (AFLC) mode, an electrically controlled birefringence (ECB) mode, or a guest-host mode, or the like can be used.

The liquid crystal element controls transmission or non-transmission of light utilizing an optical modulation action of liquid crystal. The optical modulation action of liquid crystal is controlled by an electric field applied to the liquid crystal (including a horizontal electric field, a vertical electric field, and a diagonal electric field). As the liquid crystal used for the liquid crystal element, thermotropic liquid crystal, low-molecular liquid crystal, high-molecular liquid crystal, polymer dispersed liquid crystal (PDLC), polymer network liquid crystal (PNLC), ferroelectric liquid crystal, anti-ferroelectric liquid crystal, or the like can be used. Such a liquid crystal material exhibits a cholesteric phase, a smectic phase, a cubic phase, a chiral nematic phase, an isotropic phase, or the like depending on conditions.

As the liquid crystal material, either a positive liquid crystal or a negative liquid crystal may be used, and an appropriate liquid crystal material can be used depending on the mode or design to be used.

An alignment film can be provided to adjust the alignment of liquid crystal. In the case where a horizontal electric field mode is employed, liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which a chiral material is mixed to account for several weight percent or more is used for the liquid crystal layer in order to improve the temperature range. The liquid crystal composition which includes liquid crystal exhibiting a blue phase and a chiral material has a short response time and optical isotropy. In addition, the liquid crystal composition that includes liquid crystal exhibiting a blue phase and a chiral material does not need alignment treatment and has small viewing angle dependence. An alignment film does not need to be provided and rubbing treatment is thus not necessary; accordingly, electrostatic discharge damage caused by the rubbing treatment can be prevented and defects and damage of the liquid crystal display device in the manufacturing process can be reduced.

The liquid crystal element may be a transmissive liquid crystal element, a reflective liquid crystal element, a transflective liquid crystal element, or the like.

In one embodiment of the present invention, in particular, a transmissive liquid crystal element can be suitably used.

In the case where a transmissive or transflective liquid crystal element is used, two polarizing plates are provided such that a pair of substrates is sandwiched therebetween. Furthermore, a backlight is provided on the outer side of the polarizing plate. As the backlight, a direct-below backlight or an edge-light type backlight may be used. The direct-below backlight including a light-emitting diode (LED) is preferably used because local dimming is easily performed to improve the contrast. The edge-light type backlight is preferably used because the thickness of a module including the backlight can be reduced.

When an edge-light type backlight is off, see-through display can be performed.

(Coloring Layer)

As examples of a material that can be used for the coloring layers, a metal material, a resin material, and a resin material containing a pigment or dye can be given.

(Light-Blocking Layer)

Examples of a material that can be used for the light-blocking layer include carbon black, titanium black, a metal, a metal oxide, and a composite oxide containing a solid solution of a plurality of metal oxides. The light-blocking layer may be a film containing a resin material or a thin film of an inorganic material such as a metal. Stacked films containing the material of the coloring layer can also be used for the light-blocking layer. For example, a stacked-layer structure of a film containing a material of a coloring layer which transmits light of a certain color and a film containing a material of a coloring layer which transmits light of another color can be employed. It is preferable that the coloring layer and the light-blocking layer be formed using the same material because the same manufacturing apparatus can be used and the process can be simplified.

The display device in which the liquid crystal element is used as a display element is described in this embodiment; however, a light-emitting element can also be used as a display element.

At least part of this embodiment can be implemented in combination with any of the other embodiments described in this specification as appropriate.

Embodiment 6

Described in this embodiment is a metal oxide applicable to an OS transistor described in the above embodiment. In particular, the details of a metal oxide and a cloud-aligned composite (CAC)-OS will be described below.

A CAC-OS or a CAC metal oxide has a conducting function in a part of the material and has an insulating function in another part of the material; as a whole, the CAC-OS or the CAC metal oxide has a function of a semiconductor. In the case where the CAC-OS or the CAC metal oxide is used in a channel formation region of a transistor, the conducting function is to allow electrons (or holes) serving as carriers to flow, and the insulating function is to not allow electrons serving as carriers to flow. By the complementary action of the conducting function and the insulating function, the CAC-OS or the CAC metal oxide can have a switching function (on/off function). In the CAC-OS or CAC metal oxide, separation of the functions can maximize each function.

The CAC-OS or the CAC metal oxide includes conductive regions and insulating regions. The conductive regions have the above-described conducting function, and the insulating regions have the above-described insulating function. In some cases, the conductive regions and the insulating regions in the material are separated at the nanoparticle level. In some cases, the conductive regions and the insulating regions are unevenly distributed in the material. The conductive regions are observed to be coupled in a cloud-like manner with their boundaries blurred, in some cases.

Furthermore, in the CAC-OS or the CAC metal oxide, the conductive regions and the insulating regions each have a size of more than or equal to 0.5 nm and less than or equal to 10 nm, preferably more than or equal to 0.5 nm and less than or equal to 3 nm and are dispersed in the material, in some cases.

The CAC-OS or the CAC metal oxide includes components having different bandgaps. For example, the CAC-OS or the CAC metal oxide includes a component having a wide gap due to the insulating region and a component having a narrow gap due to the conductive region. In the case of such a composition, carriers mainly flow in the component having a narrow gap. The component having a narrow gap complements the component having a wide gap, and carriers also flow in the component having a wide gap in conjunction with the component having a narrow gap. Therefore, in the case where the above-described CAC-OS or the CAC metal oxide is used in a channel formation region of a transistor, high current drive capability in the on state of the transistor, that is, a high on-state current and high field-effect mobility, can be obtained.

In other words, a CAC-OS or a CAC metal oxide can be called a matrix composite or a metal matrix composite.

The CAC-OS has, for example, a composition in which elements included in a metal oxide are unevenly distributed. Materials including unevenly distributed elements each have a size of greater than or equal to 0.5 nm and less than or equal to 10 nm, preferably greater than or equal to 1 nm and less than or equal to 2 nm, or a similar size. Note that in the following description of a metal oxide, a state in which one or more metal elements are unevenly distributed and regions including the metal element(s) are mixed is referred to as a mosaic pattern or a patch-like pattern. The regions each have a size of greater than or equal to 0.5 nm and less than or equal to 10 nm, preferably greater than or equal to 1 nm and less than or equal to 2 nm, or a similar size.

Note that a metal oxide preferably contains at least indium. In particular, indium and zinc are preferably contained. In addition, aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, of the CAC-OS, an In—Ga—Zn oxide with the CAC composition (such an In—Ga—Zn oxide may be particularly referred to as CAC-IGZO) has a composition in which materials are separated into indium oxide ($InOx_1$, where $X_1$ is a real number greater than 0) or indium zinc oxide ($InX_2Zn_{Y2}O_{Z2}$, where $X_2$, Y2, and Z2 are real numbers greater than 0), and gallium oxide ($GaO_{X3}$, where X3 is a real number greater than 0), or gallium zinc oxide ($Ga_{X4}Zn_{Y4}O_{Z4}$, where X4, Y4, and Z4 are real numbers greater than 0), and a mosaic pattern is formed. Then, $InOx_1$ or $In_{X2}Zn_{Y2}O_{Z2}$ forming the mosaic pattern is evenly distributed in the film. This composition is also referred to as a cloud-like composition.

That is, the CAC-OS is a composite metal oxide with a composition in which a region including $GaO_{X3}$ as a main component and a region including $In_{X2}Zn_{Y2}O_{Z2}$ or $InOx_1$ as a main component are mixed. Note that in this specification, for example, when the atomic ratio of In to an element M in a first region is greater than the atomic ratio of In to an element M in a second region, the first region has higher In concentration than the second region.

Note that a compound including In, Ga, Zn, and O is also known as IGZO. Typical examples of IGZO include a crystalline compound represented by $InGaO_3(ZnO)_{m1}$ (m1 is a natural number) and a crystalline compound represented by $In_{(1+x0)}Ga_{(1-x0)}O_3(ZnO)_{m0}$ ($-1 \leq x0 \leq 1$; m0 is a given number).

The above crystalline compounds have a single crystal structure, a polycrystalline structure, or a c-axis-aligned crystal (CAAC) structure. Note that the CAAC structure is a crystal structure in which a plurality of IGZO nanocrystals have c-axis alignment and are connected in the a-b plane direction without alignment.

On the other hand, the CAC-OS relates to the material composition of a metal oxide. In a material composition of a CAC-OS including In, Ga, Zn, and O, nanoparticle regions including Ga as a main component are observed in part of the CAC-OS and nanoparticle regions including In as a main component are observed in part thereof. These nanoparticle regions are randomly dispersed to form a mosaic pattern. Therefore, the crystal structure is a secondary element for the CAC-OS.

Note that in the CAC-OS, a stacked-layer structure including two or more films with different atomic ratios is not included. For example, a two-layer structure of a film including In as a main component and a film including Ga as a main component is not included.

A boundary between the region including $GaO_{X3}$ as a main component and the region including $In_{X2}Zn_{Y2}O_{Z2}$ or $InOx_1$ as a main component is not clearly observed in some cases.

In the case where one or more of aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium in a CAC-OS, nanoparticle regions including the selected metal element(s) as a main component(s) are observed in part of the CAC-OS and nanoparticle regions including In as a main component are observed in part thereof, and these nanoparticle regions are randomly dispersed to form a mosaic pattern in the CAC-OS.

The CAC-OS can be formed by a sputtering method under conditions where a substrate is not heated intentionally, for example. In the case of forming the CAC-OS by a sputtering method, one or more selected from an inert gas (typically, argon), an oxygen gas, and a nitrogen gas may be used as a deposition gas. The ratio of the flow rate of an oxygen gas to the total flow rate of the deposition gas at the time of deposition is preferably as low as possible, and for example, the flow ratio of an oxygen gas is preferably higher than or equal to 0% and less than 30%, further preferably higher than or equal to 0% and less than or equal to 10%.

The CAC-OS is characterized in that no clear peak is observed in measurement using θ/2θ scan by an out-of-plane method, which is an X-ray diffraction (XRD) measurement method. That is, X-ray diffraction shows no alignment in the a-b plane direction and the c-axis direction in a measured region.

In an electron diffraction pattern of the CAC-OS which is obtained by irradiation with an electron beam with a probe diameter of 1 nm (also referred to as a nanometer-sized electron beam), a ring-like region with high luminance and a plurality of bright spots in the ring-like region are observed. Therefore, the electron diffraction pattern indicates that the crystal structure of the CAC-OS includes a nanocrystal (nc) structure with no alignment in plan-view and cross-sectional directions.

For example, an energy dispersive X-ray spectroscopy (EDX) mapping image confirms that an In—Ga—Zn oxide with the CAC composition has a structure in which a region including $GaO_{X3}$ as a main component and a region including $In_{X2}Zn_{Y2}O_{Z2}$ or $InOx_1$ as a main component are unevenly distributed and mixed.

The CAC-OS has a structure different from that of an IGZO compound in which metal elements are evenly distributed, and has characteristics different from those of the IGZO compound. That is, in the CAC-OS, regions including $GaO_{X3}$ or the like as a main component and regions including $In_{X2}Zn_{Y2}O_{Z2}$ or $InOx_1$ as a main component are separated to form a mosaic pattern.

The conductivity of a region including $In_{X2}Zn_{Y2}O_{Z2}$ or $InOx_1$ as a main component is higher than that of a region including $GaO_{X3}$ or the like as a main component. In other words, when carriers flow through regions including $In_{X2}Zn_{Y2}O_{Z2}$ or $InOx_1$ as a main component, the conductivity of an oxide semiconductor is exhibited. Accordingly, when regions including $In_{X2}Zn_{Y2}O_{Z2}$ or $InOx_1$ as a main component are distributed in an oxide semiconductor like a cloud, high field-effect mobility (μ) can be achieved.

By contrast, the insulating property of a region including $GaO_{X3}$ or the like as a main component is higher than that of a region including $In_{X2}Zn_{Y2}O_{Z2}$ or $InOx_1$ as a main component. In other words, when regions including $GaO_{X3}$ or the like as a main component are distributed in an oxide semiconductor, leakage current can be suppressed and favorable switching operation can be achieved.

Accordingly, when a CAC-OS is used for a semiconductor element, the insulating property derived from $GaO_{X3}$ or the like and the conductivity derived from $In_{X2}Zn_{Y2}O_{Z2}$ or $InOx_1$ complement each other, whereby high on-state current (Ion) and high field-effect mobility (μ) can be achieved.

A semiconductor element including a CAC-OS has high reliability. Thus, the CAC-OS is suitably used in a variety of semiconductor devices.

At least part of this embodiment can be implemented in combination with any of the other embodiments described in this specification as appropriate.

Embodiment 7

In this embodiment, electronic devices of one embodiment of the present invention are described with reference to drawings.

The display system described in the above embodiment can be installed in any of the electronic devices illustrated as examples below. Thus, an electronic device which can display a high-quality picture can be provided.

Furthermore, the display portion described in the above embodiment can be used as the display portion of the electronic device illustrated as an example below. Thus, an electronic device having a function of displaying a picture using a plurality of display panels can be formed. In addition, the display panel according to one embodiment of the present invention may have flexibility. In this case, a display portion having a curved surface can be provided in the electronic device illustrated as an example below.

Examples of electronic devices include electronic devices having relatively large screens such as a television set, a desktop or laptop personal computer, a monitor of a computer, digital signage, and a large game machine (e.g., a pachinko machine); a digital camera; a digital video camera; a digital photo frame; a mobile phone; a portable game console; a portable information terminal; an audio reproducing device; and the like.

The electronic device of one embodiment of the present invention may include an antenna. When a signal is received by the antenna, the electronic device can display an image, data, or the like on a display portion. When the electronic device includes the antenna and a secondary battery, the antenna may be used for contactless power transmission.

The electronic device of one embodiment of the present invention may include a sensor (a sensor having a function of measuring force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays).

The electronic device of one embodiment of the present invention can have a variety of functions such as a function of displaying a variety of information (e.g., a still image, a moving image, and a text image) on the display portion, a touch panel function, a function of displaying a calendar, date, time, and the like, a function of executing a variety of software (programs), a wireless communication function, and a function of reading out a program or data stored in a recording medium.

Figure 26A:
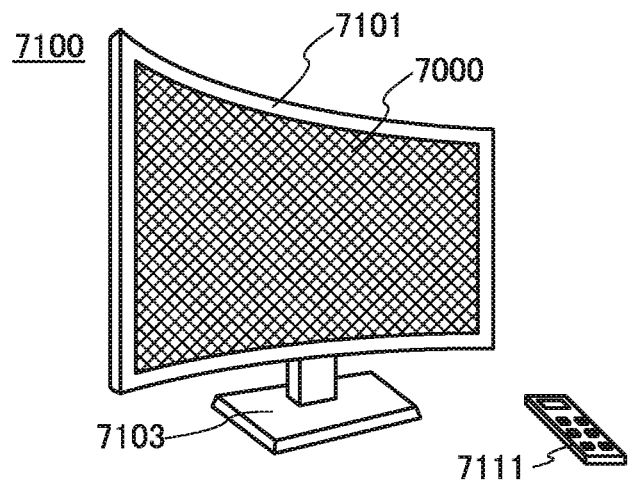
FIGS. 26A and 26B each illustrate a structure example of an electronic device.

FIG. 26A illustrates an example of a television device. In a television device 7100, a display portion 7000 is incorporated in a housing 7101. In addition, here, the housing 7101 is supported by a stand 7103.

The display portion of one embodiment of the present invention can be used in the display portion 7000.

The television device 7100 illustrated in FIG. 26A can be operated with an operation switch provided in the housing 7101 or a separate remote controller 7111. Furthermore, the display portion 7000 may include a touch sensor. The television device 7100 can be operated by touching the display portion 7000 with a finger or the like. Furthermore, the remote controller 7111 may be provided with a display portion for displaying data output from the remote controller 7111. With operation keys or a touch panel of the remote controller 7111, channels and volume can be controlled and images displayed on the display portion 7000 can be controlled.

Note that the television device 7100 is provided with a receiver, a modem, and the like. With use of the receiver, general television broadcasting can be received. When the television device is connected to a communication network with or without wires via the modem, one-way (from a transmitter to a receiver) or two-way (between a transmitter and a receiver or between receivers) data communication can be performed.

Figure 26B:
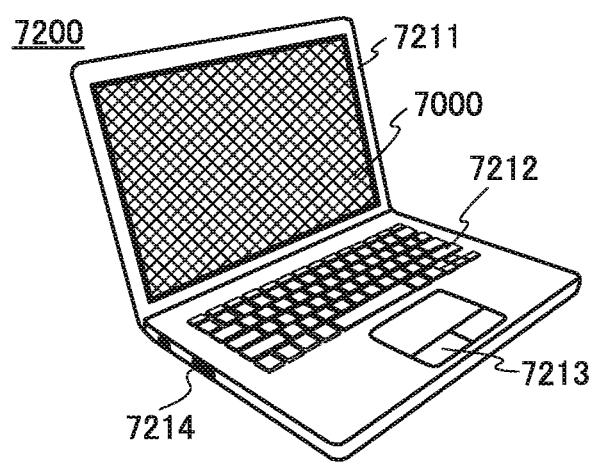

FIG. 26B illustrates a laptop personal computer 7200. The laptop personal computer 7200 includes a housing 7211, a keyboard 7212, a pointing device 7213, an external connection port 7214, and the like. In the housing 7211, the display portion 7000 is incorporated.

The semiconductor device of one embodiment of the present invention can be used in the display portion 7000.

Figure 27A:
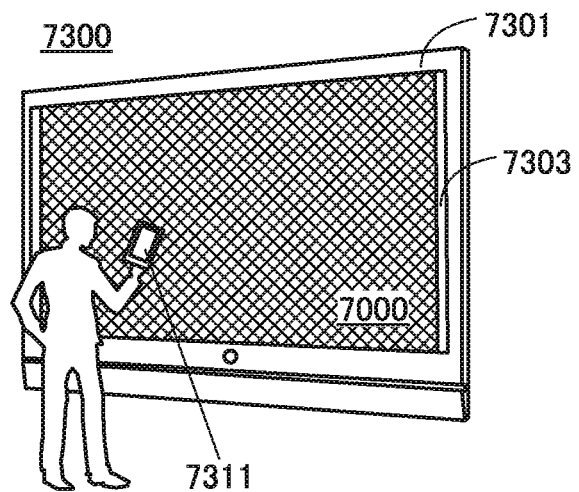
FIGS. 27A and 27B each illustrate a structure example of an electronic device.
Figure 27B:
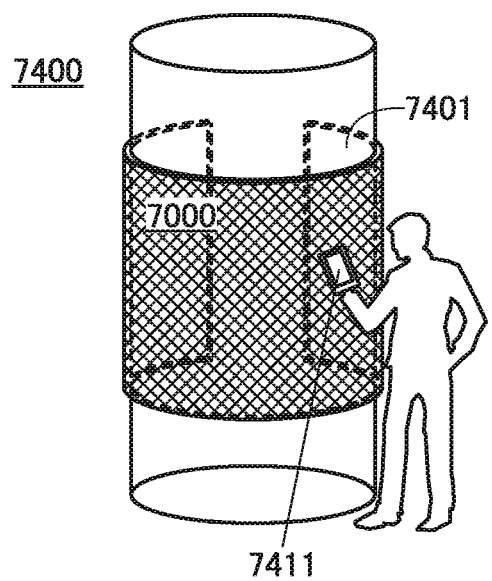

FIGS. 27A and 27B illustrate examples of digital signages.

A digital signage 7300 illustrated in FIG. 27A includes a housing 7301, the display portion 7000, a speaker 7303, and the like. Also, the digital signage can include an LED lamp, operation keys (including a power switch or an operation switch), a connection terminal, a variety of sensors, a microphone, and the like.

FIG. 27B illustrates a digital signage 7400 mounted on a pillar 7401. The digital signage 7400 includes the display portion 7000 provided along a curved surface of the pillar 7401.

The display portion of one embodiment of the present invention can be used for each of the display portions 7000 illustrated in FIGS. 27A and 27B.

A larger area of the display portion 7000 can provide more information at a time. In addition, the larger display portion 7000 attracts more attention, so that the effectiveness of the advertisement can be increased, for example.

It is preferable to use a touch panel in the display portion 7000 because a device with such a structure does not just display a still or moving image on the display portion 7000, but can be operated by users intuitively. Alternatively, in the case where the display device of one embodiment of the present invention is used for providing information such as route information or traffic information, usability can be enhanced by intuitive operation.

Furthermore, as illustrated in FIGS. 27A and 27B, it is preferable that the digital signage 7300 or the digital signage 7400 work with an information terminal 7311 or an information terminal 7411 such as a smartphone a user has through wireless communication. For example, information of an advertisement displayed on the display portion 7000 can be displayed on a screen of the portable information terminal 7311 or 7411. Moreover, by operation of the portable information terminal 7311 or 7411, a displayed image on the display portion 7000 can be switched.

Furthermore, it is possible to make the digital signage 7300 or 7400 execute a game with use of the screen of the portable information terminal 7311 or 7411 as an operation means (controller). Thus, an unspecified number of people can join in and enjoy the game concurrently.

Figure 28:
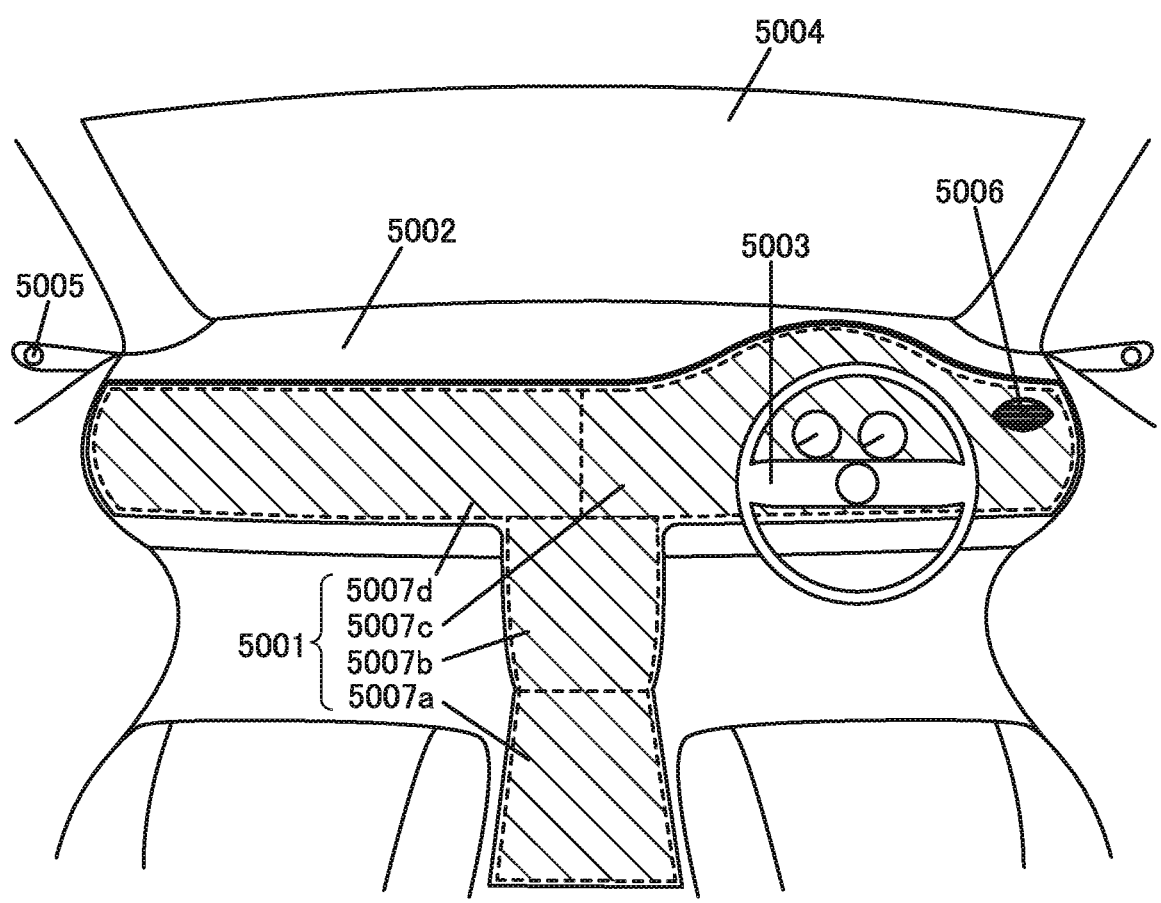
FIG. 28 illustrates a structure example of a vehicle.

The display system according to one embodiment of the present invention can be incorporated along a curved inside/outside wall surface of a house or a building or a curved interior/exterior surface of a vehicle. FIG. 28 illustrates an example of installation of the display device according to one embodiment of the present invention in a vehicle.

FIG. 28 illustrates a structure example of a vehicle equipped with a display portion 5001. As the display portion 5001, a display portion in the display system according to one embodiment of the present invention can be used. Note that although in the example illustrated in FIG. 28, the display portion 5001 is installed in, but not limited to, a right-hand drive vehicle; installation in a left-hand drive vehicle is possible and in this case the left and right of the components arranged in FIG. 28 are reversed.

FIG. 28 illustrates a dashboard 5002, a steering wheel 5003, a windshield 5004, and the like which are arranged around a driver's seat and a front passenger's seat. The display portion 5001 is placed in a predetermined position in the dashboard 5002, specifically, around the driver, and has a substantially T shape. Although one display portion 5001 formed of a plurality of display panels 5007 (display panels 5007a, 5007b, 5007c, and 5007d) is provided along the dashboard 5002 in the example illustrated in FIG. 28, the display portion 5001 may be divided and placed in a plurality of portions.

Note that the plurality of display panels 5007 may have flexibility. In this case, the display portion 5001 can be formed into a complicated shape; for example, a structure in which the display portion 5001 is provided along a curved surface of the dashboard 5002 or the like or a structure in which a display region of the display portion 5001 is not provided at a connection portion of the steering wheel, a display portion of a meter, the ventilation duct 5006, or the like can easily be achieved.

In addition, a camera 5005 which takes pictures of the situations at the rear and on each side may be provided outside the vehicle. Although the camera 5005 is set instead of a side mirror in the example in FIG. 28, both the side mirror and the camera may be set.

As the camera 5005, a CCD camera, a CMOS camera, or the like can be used. In addition, an infrared camera may be used in combination with such a camera. The infrared camera, the output level of which increases as the temperature of the object increases, can detect or extract a living body such as a human or an animal.

An image captured with the camera 5005 can be output to any one or more of the plurality of display panels 5007. This display portion 5001 is mainly used for drive support. The situation on the rear side is taken at a wide angle of view by the camera 5005, and the image is displayed on the display panels 5007 so that the driver can see a blind area for avoiding an accident.

Furthermore, the use of the display system according to one embodiment of the present invention can compensate for the discontinuity of the picture at junctions between the display panels 5007a, 5007b, 5007c, and 5007d. This makes it possible to display a picture with an inconspicuous seam, so that the visibility of the display portion 5001 during driving can be improved.

Furthermore, a distance image sensor may be provided over a roof of the vehicle, for example, so that an image obtained by the distance image sensor may be displayed on the portion 5001. For the distance image sensor, an image sensor, light detection and ranging (LIDAR), or the like can be used. An image obtained by the image sensor and the image obtained by the distance image sensor are displayed on the display portion 5001, whereby more information can be provided to the driver to assist driving.

The display portion 5001 may also have a function of displaying map information, traffic information, television pictures, DVD pictures, and the like. For example, map information can be displayed on the display panels 5007a, 5007b, 5007c, and 5007d as one display screen. Note that the number of the display panels 5007 can be increased depending on the picture to be displayed.

Furthermore, the picture displayed on the display panels 5007a, 5007b, 5007c, and 5007d can be freely changed to meet the driver's preference. For example, television pictures or DVD pictures are displayed on the display panel 5007d on the left, map information is displayed on the display panel 5007b at the center position, meters are displayed on the display panel 5007c on the right, and audio information and the like are displayed on the display panel 5007a near a transmission gear (between the driver's seat and the front passenger's seat). In addition, a combination of the plurality of display panels 5007 can add a fail-safe function to the display portion 5001. For example, even when any one of the display panels 5007 is broken for any reason, a display region can be changed so that display can be performed using another display panel 5007.

REFERENCE NUMERALS

DP: display panel, FE: front end portion, DEC: decoder, PC: processing circuit, RCV: receiver portion, IF: interface, CTRL: control circuit, DIV: divider circuit, CC: correction circuit, 10: display system, 20: display device, 21: pixel portion, 22: pixel, 23: driver circuit, 24: driver circuit, 30: signal generation portion, 40: arithmetic processing device, 51: display region, 51a: display region, 51b: display region, 51c: display region, 51d: display region, 52: region, 52b: region, 52c: region, 52d: region, 53: region, 54: FPC, 54a: FPC, 55: display region, 60: machine learning system, 61: control portion, 62: data generation portion, 63: arithmetic portion, 64: memory portion, 64a: memory portion, 64b: memory portion, 64c: memory portion, 65: imaging device, 70: processing device, 71: divider circuit, 400: display device, 411: substrate, 412: substrate, 420: liquid crystal element, 421: conductive layer, 422: liquid crystal, 423: conductive layer, 424a: alignment film, 424b: alignment film, 426: insulating layer, 430: transistor, 431: conductive layer, 431a: conductive layer, 432: semiconductor layer, 432j: region, 432n: region, 432p: semiconductor layer, 433a: conductive layer, 433b: conductive layer, 434: insulating layer, 435: impurity semiconductor layer, 437: semiconductor layer, 438: connection portion, 439a: polarizing plate, 439b: polarizing plate, 441: coloring layer, 442: light-blocking layer, 460: capacitor, 481: insulating layer, 482: insulating layer, 483: insulating layer, 484: insulating layer, 485: insulating layer, 486: conductive layer, 487: conductive layer, 488: insulating layer, 490: backlight unit, 700: display device, 700A: display device, 701: substrate, 702: pixel portion, 704: source driver circuit portion, 705: substrate, 706: gate driver circuit portion, 708: FPC terminal portion, 710: signal line, 711: wiring portion, 712: sealant, 716: FPC, 721: source driver IC, 722: gate driver circuit, 723: FPC, 724: printed board, 730: insulating film, 732: sealing film, 734: insulating film, 736: coloring film, 738: light-blocking film, 750: transistor, 752: transistor, 760: connection electrode, 770: planarization insulating film, 772: conductive film, 778: structure body, 780: anisotropic conductive film, 782: light-emitting element, 786: EL layer, 788: conductive film, 790: capacitor, 791: touch panel, 792: insulating film, 793: electrode, 794: electrode, 795: insulating film, 796: electrode, 797: insulating film, 5001: display portion, 5002: dashboard, 5003: steering wheel, 5004: windshield, 5005: camera, 5006: ventilation duct, 5007: display panel, 5007a: display panel, 5007b: display panel, 5007c: display panel, 5007d: display panel, 7000: display portion, 7100: television device, 7101: housing, 7103: stand, 7111: remote controller, 7200: laptop personal computer, 7211: housing, 7212: keyboard, 7213: pointing device, 7214: external connection port, 7300: digital signage, 7301: housing, 7303: speaker, 7311: information terminal, 7400: digital signage, 7401: pillar, 7411: information terminal.

This application is based on Japanese Patent Application Serial No. 2017-099397 filed with Japan Patent Office on May 19, 2017, the entire contents of which are hereby incorporated by reference.

The invention claimed is:

1. A machine learning system comprising:
an imaging device;
a data generation portion; and
an arithmetic portion comprising a neural network,
wherein the imaging device is configured to capture an image displayed on a display device by input of first image data to the display device and to output captured data as second image data,
wherein the data generation portion is configured to generate third image data by obtaining a difference between the first image data and the second image data and to generate fourth image data by adding the first image data and the third image data, and
wherein the arithmetic portion is configured to update a weight coefficient so that output data obtained by input of the first image data to the neural network is close to the fourth image data.

2. The machine learning system according to claim 1,
wherein the display device comprises a plurality of display panels, and
wherein the machine learning system further comprises an image divider portion configured to divide the first image data into pieces the number of which is the same as the number of the plurality of display panels.

3. The machine learning system according to claim 1,
wherein the neural network comprises one or more convolutional layers between an input layer and an output layer, and
wherein the data generation portion is configured to perform padding processing on the first image data.

4. The machine learning system according to claim 1,
wherein the display device comprises a first display panel and a second display panel,
wherein the first display panel comprises a first region comprising a plurality of pixels, and
wherein the second display panel comprises a second region being configured to transmit visible light and overlapping with the first region of the first display panel.

5. A machine learning system comprising:
an imaging device;
a data generation portion; and
an arithmetic portion comprising a neural network,
wherein the imaging device is configured to capture an image displayed on a display device by input of first image data to the display device and to output captured data as second image data,
wherein the data generation portion is configured to generate third image data by obtaining a difference between the first image data and the second image data, to generate fifth image data by inverting gray levels in the third image data using a maximum value of all gray levels in the third image data as a reference value, and to generate sixth image data by obtaining a difference between the first image data and the fifth image data, and
wherein the arithmetic portion is configured to update a weight coefficient so that output data obtained by input of the first image data to the neural network is close to the sixth image data.

6. The machine learning system according to claim 5,
wherein the display device comprises a plurality of display panels, and
wherein the machine learning system further comprises an image divider portion configured to divide the first image data into pieces the number of which is the same as the number of the plurality of display panels.

7. The machine learning system according to claim 5,
wherein the neural network comprises one or more convolutional layers between an input layer and an output layer, and
wherein the data generation portion is configured to perform padding processing on the first image data.

8. The machine learning system according to claim 5,
wherein the display device comprises a first display panel and a second display panel,
wherein the first display panel comprises a first region comprising a plurality of pixels, and
wherein the second display panel comprises a second region being configured to transmit visible light and overlapping with the first region of the first display panel.

9. A machine learning method for a neural network, the method comprising the steps of:
obtaining second image data based on an image that is displayed on a display device by input of first image data to the display device;
generating third image data by obtaining a difference between the first image data and the second image data;
generating fourth image data by adding the first image data and the third image data; and
updating a weight coefficient so that output data obtained by input of the first image data to the neural network is close to the fourth image data.

10. The machine learning method according to claim 9,
wherein the display device comprises a plurality of display panels, and
wherein the method further comprises the step of dividing the first image data into pieces the number of which is the same as the number of the plurality of display panels.

11. The machine learning method according to claim 9,
wherein the neural network comprises one or more convolutional layers between an input layer and an output layer, and
wherein data obtained by performing padding processing on the first image data is used as data input to the input layer.

12. The machine learning method according to claim 9,
wherein the display device comprises a first display panel and a second display panel,
wherein the first display panel comprises a first region comprising a plurality of pixels, and
wherein the second display panel comprises a second region being configured to transmit visible light and overlapping with the first region of the first display panel.

13. A machine learning method for a neural network, the method comprising the steps of:

obtaining second image data based on an image that is displayed on a display device by input of first image data to the display device;

generating third image data by obtaining a difference between the first image data and the second image data;

generating fifth image data by inverting gray levels in the third image data using a maximum value of all gray levels in the third image data as a reference value;

generating sixth image data by obtaining a difference between the first image data and the fifth image data; and updating a weight coefficient so that output data obtained by input of the first image data to the neural network is close to the sixth image data.

14. The machine learning method according to claim 13, wherein the display device comprises a plurality of display panels, and wherein the method further comprises the step of dividing the first image data into pieces the number of which is the same as the number of the plurality of display panels.

15. The machine learning method according to claim 13, wherein the neural network comprises one or more convolutional layers between an input layer and an output layer, and wherein data obtained by performing padding processing on the first image data is used as data input to the input layer.

16. The machine learning method according to claim 13, wherein the display device comprises a first display panel and a second display panel, wherein the first display panel comprises a first region comprising a plurality of pixels, and wherein the second display panel comprises a second region being configured to transmit visible light and overlapping with the first region of the first display panel.

* * * * *